US012775430B2

(12) United States Patent
Yamazaki et al.

(10) Patent No.: US 12,775,430 B2
(45) Date of Patent: Oct. 27, 2026

(54) METHOD FOR OPERATING DISPLAY SYSTEM

(71) Applicant: Semiconductor Energy Laboratory Co., Ltd., Atsugi (JP)

(72) Inventors: Shunpei Yamazaki, Setagaya (JP); Hajime Kimura, Atsugi (JP); Yoshiaki Oikawa, Atsugi (JP); Kensuke Yoshizumi, Atsugi (JP)

(73) Assignee: Semiconductor Energy Laboratory Co., Ltd., Atsugi (JP)

(*) Notice: Subject to any disclaimer, the term of this patent is extended or adjusted under 35 U.S.C. 154(b) by 0 days.

(21) Appl. No.: 19/028,622

(22) Filed: Jan. 17, 2025

(65) Prior Publication Data

US 2025/0238183 A1 Jul. 24, 2025

Related U.S. Application Data

(63) Continuation of application No. 18/038,250, filed as application No. PCT/IB2021/061039 on Nov. 29, 2021, now Pat. No. 12,229,461.

(30) Foreign Application Priority Data

Dec. 11, 2020 (JP) ................................ 2020-206007
Dec. 11, 2020 (JP) ................................ 2020-206009

(51) Int. Cl.
*G06F 3/14* (2006.01)
*G02B 27/01* (2006.01)
(Continued)

(52) U.S. Cl.
CPC ........... *G06F 3/14* (2013.01); *G02B 27/0172* (2013.01); *G06F 3/04815* (2013.01); *G06T 17/00* (2013.01)

(58) Field of Classification Search
CPC .. G06F 3/04815; G02B 27/0172; G06T 17/00
See application file for complete search history.

(56) References Cited

U.S. PATENT DOCUMENTS 6,867,752 B1 3/2005 Yamazaki et al.
7,158,098 B2 1/2007 Yamazaki et al.
(Continued)

FOREIGN PATENT DOCUMENTS

CN 107743604 A 2/2018
CN 110045935 A 7/2019
(Continued)

OTHER PUBLICATIONS

International Search Report (Application No. PCT/IB2021/061039) Dated Mar. 1, 2022.
(Continued)

*Primary Examiner* — Lisa S Landis
(74) *Attorney, Agent, or Firm* — Eric J. Robinson; Robinson Intellectual Property Law Office, P.C.

(57) ABSTRACT

A display device with a novel structure, a display system with a novel structure, or operation methods of them is/are provided. The operation method of the display system including a first display device and a second display device includes the following steps: a first step of connecting the first display device and the second display device by wireless communication; a second step of transmitting first image data displayed on the first display device to the second display device; a third step of displaying, on the second display device, second image data obtained by processing at least part of the first image data; a fourth step of stopping display on the first display device; and a fifth step of processing the second image data in accordance with a manipulation with the second display device.

11 Claims, 23 Drawing Sheets

(51) Int. Cl.
*G06F 3/04815* (2022.01)
*G06T 17/00* (2006.01)

(56) References Cited

U.S. PATENT DOCUMENTS

| | | | | |
|---|---|---|---|---|
| 7,248,232 | B1 | 7/2007 | Yamazaki et al. | |
| 8,605,010 | B2 | 12/2013 | Yamazaki et al. | |
| 9,414,029 | B2 | 8/2016 | Miyazaki et al. | |
| 9,836,199 | B2 | 12/2017 | Ishino et al. | |
| 10,338,673 | B2 | 7/2019 | Chen et al. | |
| 10,341,642 | B2 | 7/2019 | Ueno et al. | |
| 10,466,880 | B2 | 11/2019 | Ishino et al. | |
| 10,823,962 | B2 | 11/2020 | Kimura | |
| 11,077,360 | B2 | 8/2021 | Ohashi | |
| 11,260,287 | B2 | 3/2022 | Ohashi | |
| 11,617,942 | B2 | 4/2023 | Ohashi | |
| 2005/0195129 | A1 | 9/2005 | Yamazaki et al. | |
| 2007/0097021 | A1 | 5/2007 | Yamazaki et al. | |
| 2013/0162502 | A1 | 6/2013 | Lee et al. | |
| 2017/0076502 | A1* | 3/2017 | Chen | G06F 3/011 |
| 2017/0160812 | A1* | 6/2017 | Park | G06F 3/013 |
| 2019/0020869 | A1* | 1/2019 | Perreault | H04N 13/383 |
| 2019/0196185 | A1 | 6/2019 | Kimura | |
| 2020/0129850 | A1 | 4/2020 | Ohashi | |
| 2022/0137409 | A1 | 5/2022 | Yamazaki et al. | |
| 2022/0270548 | A1 | 8/2022 | Kurokawa et al. | |
| 2022/0351509 | A1 | 11/2022 | Kanemura et al. | |

FOREIGN PATENT DOCUMENTS

| | | | |
|---|---|---|---|
| EP | 0984347 | A | 3/2000 |
| EP | 2128740 | A | 12/2009 |
| EP | 2903265 | A | 8/2015 |
| JP | 2000-002856 | A | 1/2000 |
| JP | 2000-347596 | A | 12/2000 |
| JP | 2004-191628 | A | 7/2004 |
| JP | 2011-186856 | A | 9/2011 |
| JP | 2012-073350 | A | 4/2012 |
| JP | 2014-071520 | A | 4/2014 |
| JP | 2015-075781 | A | 4/2015 |
| JP | 2018-534643 | | 11/2018 |
| JP | 2019-074917 | A | 5/2019 |
| JP | 2019-114050 | A | 7/2019 |
| JP | 2020-034646 | A | 3/2020 |
| JP | 2020-198108 | A | 12/2020 |
| KR | 2013-0073262 | A | 7/2013 |
| KR | 2017-0130602 | A | 11/2017 |
| WO | WO-2014/207971 | | 12/2014 |
| WO | WO-2017/048519 | | 3/2017 |
| WO | WO-2018/198910 | | 11/2018 |

OTHER PUBLICATIONS

Written Opinion (Application No. PCT/IB2021/061039) Dated Mar. 1, 2022.

* cited by examiner

FIG. 21A
| Amorphous | Crystalline (Intermediate state / New crystalline phase) | Crystal |
|---|---|---|
| ・completely amorphous | ・CAAC<br>・nc<br>・CAC<br>excluding single crystal and poly crystal | ・single crystal<br>・poly crystal |
FIG. 21B
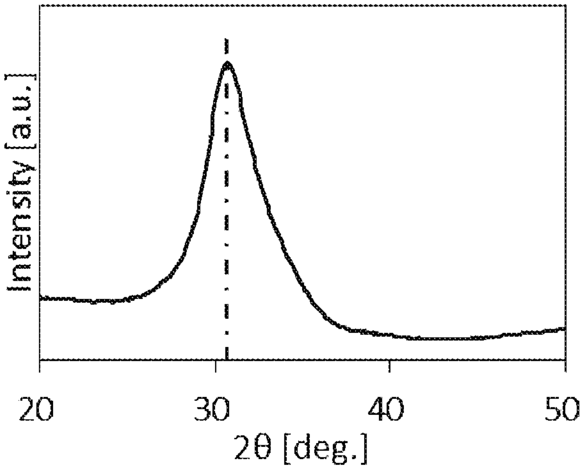
FIG. 21C
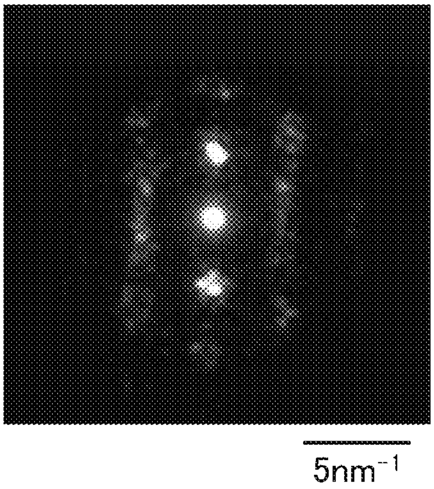

METHOD FOR OPERATING DISPLAY SYSTEM

TECHNICAL FIELD

One embodiment of the present invention relates to a display device and a display system. One embodiment of the present invention relates to a method for operating a display system.

Note that one embodiment of the present invention is not limited to the above technical field. Examples of the technical field of one embodiment of the present invention disclosed in this specification and the like include a semiconductor device, an imaging device, a display device, a light-emitting apparatus, a power storage device, a memory device, a display system, an electronic device, a lighting device, an input device, an input/output device, a driving method thereof, and a manufacturing method thereof.

In this specification and the like, a semiconductor device refers to every device that can function by utilizing semiconductor characteristics. A display device (a liquid crystal display device, a light-emitting display device, and the like), a projection device, a lighting device, an electro-optical device, a power storage device, a memory device, a semiconductor circuit, an imaging device, an electronic device, and the like can sometimes be regarded as a semiconductor device. Alternatively, they can sometimes be regarded as including a semiconductor device.

BACKGROUND ART

As electronic devices with display devices for augmented reality (AR) or virtual reality (VR), wearable electronic devices, stationary electronic devices, and the like are becoming widespread. Examples of wearable electronic devices include a head-mounted display (HMD) and an eyeglass-type electronic device. Examples of stationary electronic devices include a head-up display (HUD).

When using an electronic device such as an HMD with a short distance between a display portion and a user, the user is likely to perceive pixels and strongly feels granularity, whereby the sense of immersion and realistic sensation of AR or VR might be diminished. Thus, an HMD is preferably provided with a display device that has minute pixels so that the pixels are not perceived by the user. Patent Document 1 discloses a method in which an HMD including minute pixels is achieved by using transistors capable of high-speed operation.

REFERENCE

Patent Document

[Patent Document 1] Japanese Published Patent Application No. 2000-2856

SUMMARY OF THE INVENTION

Problems to be Solved by the Invention

Reducing the size of a pixel included in a display device can increase the pixel density. Accordingly, more pixels can be provided in the display device to enhance the sense of immersion or realistic sensation. Defects in pixels (bright spots, dark spots, or the like) are preferably reduced to further enhance the sense of immersion or realistic sensation.

A plurality of display devices are used as a display device (or an electronic device) in some cases. In this case, each of the plurality of display devices needs to be operated, and there is a problem in that the manipulation method is extremely complicated.

An object of one embodiment of the present invention is to provide a display device with a novel structure or a display system with a novel structure. Another object of one embodiment of the present invention is to provide a manipulation method of the display device with a novel structure or a manipulation method of the display system with a novel structure.

Note that the description of a plurality of objects does not preclude the existence of each object. One embodiment of the present invention does not necessarily achieve all of these objects. Objects other than those listed above will be apparent from the description of the specification, the drawings, the claims, and the like, and such objects could be objects of one embodiment of the present invention.

Means for Solving the Problems

One embodiment of the present invention is a method for operating a display system including a first display device and a second display device and includes the following steps. That is, one embodiment of the present invention includes a first step of connecting the first display device and the second display device by wireless communication; a second step of transmitting first image data displayed on the first display device to the second display device; a third step of displaying, on the second display device, second image data obtained by processing at least part of the first image data; a fourth step of stopping display on the first display device; and a fifth step of processing the second image data in accordance with a manipulation with the second display device.

Another embodiment of the present invention is a method for operating a display system including a first display device and a second display device and includes the following steps. That is, one embodiment of the present invention includes a first step of connecting the first display device and the second display device by wireless communication; a second step of transmitting first image data displayed on the first display device to the second display device; a third step of displaying, on the second display device, second image data obtained by processing at least part of the first image data; a fourth step of stopping display on the first display device; and a fifth step of moving a position of the second image data in accordance with a manipulation with the second display device.

Another embodiment of the present invention is a method for operating a display system including a first display device and a second display device and includes the following steps. That is, one embodiment of the present invention includes a first step of connecting the first display device and the second display device by wireless communication; a second step of transmitting first image data displayed on the first display device to the second display device; a third step of displaying, on the second display device, second image data obtained by processing at least part of the first image data; a fourth step of stopping display on the first display device; and a fifth step of changing a size of the second image data in accordance with a manipulation with the second display device.

In any of the above embodiments, the fifth step is preferably performed with a plurality of pieces of input data.

In any of the above embodiments, the first display device preferably has one or both of a telephone function and a time display function. Furthermore, the second display device preferably has one or both of an augmented reality display function and a virtual reality display function.

In any of the above embodiments, the second display device preferably has a function of obtaining information on any one or more of a sense of sight, a sense of hearing, a sense of touch, a sense of taste, a sense of smell, and a brain wave of a user.

In any of the above embodiments, the second display device preferably includes a sensing portion. In that case, the fourth step is preferably performed in accordance with a manipulation with the sensing portion.

In any of the above embodiments, the second display device preferably includes a plurality of sensing portions. In that case, the fifth step is preferably performed in accordance with a manipulation with the plurality of sensing portions.

Note that other embodiments of the present invention are shown in the description of the following embodiments and the drawings.

Effect of the Invention

According to one embodiment of the present invention, a display device with a novel structure or a display system with a novel structure can be provided. According to one embodiment of the present invention, a manipulation method of the display device with a novel structure or a manipulation method of the display system with a novel structure can be provided.

Note that the description of these effects does not preclude the existence of other effects. One embodiment of the present invention does not have to have all of these effects. Other effects will be apparent from the description of the specification, the drawings, the claims, and the like, and other effects can be derived from the description of the specification, the drawings, the claims, and the like.

BRIEF DESCRIPTION OF THE DRAWINGS

FIG. 21A is a diagram showing classification of crystal structures of IGZO. FIG. 21B is a diagram showing an XRD spectrum of a CAAC-IGZO film. FIG. 21C is a diagram showing a nanobeam electron diffraction pattern of the CAAC-IGZO film.

MODE FOR CARRYING OUT THE INVENTION

Figure 1A:
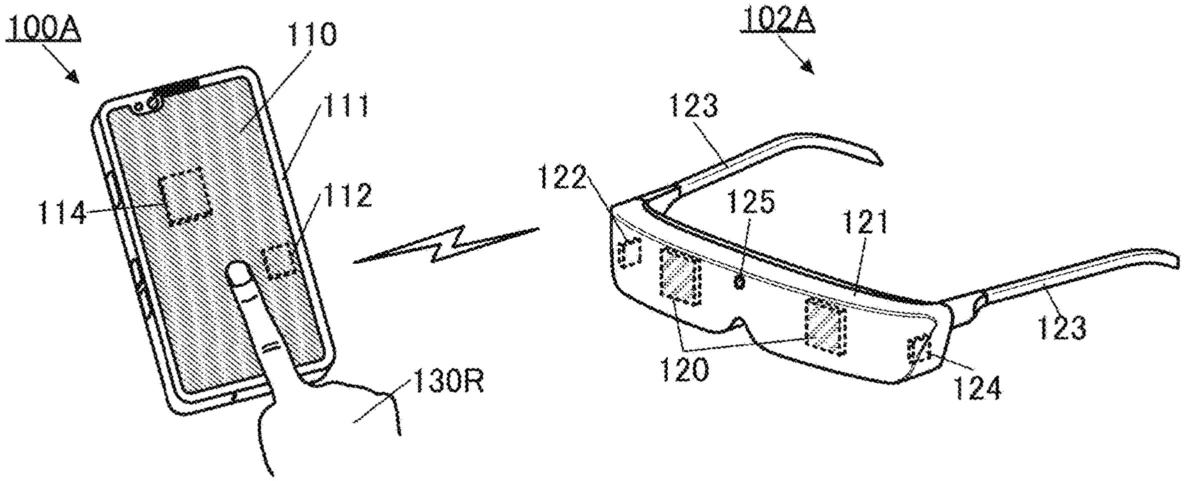
FIG. 1A to FIG. 1C are diagrams illustrating structure examples of display devices and display systems.

Hereinafter, embodiments will be described with reference to the drawings. However, the embodiments can be implemented with various modes, and it will be readily appreciated by those skilled in the art that modes and details can be changed in various ways without departing from the spirit and scope of the present invention. Thus, the present invention should not be construed as being limited to the following description of the embodiments.

In the drawings, the size, the layer thickness, or the region is exaggerated for clarity in some cases. Therefore, the size, the layer thickness, or the region is not limited to the illustrated scale. Note that the drawings schematically show ideal examples, and embodiments of the present invention are not limited to shapes, values, or the like shown in the drawings.

Furthermore, unless otherwise specified, an off-state current in this specification and the like refers to a drain current of a transistor in an off state (also referred to as a non-conduction state or a cutoff state). Unless otherwise specified, an off state of an n-channel transistor refers to a state where a voltage $V_{gs}$ between its gate and source is lower than a threshold voltage $V_{th}$ (higher than $V_{th}$ in a p-channel transistor).

In this specification and the like, a metal oxide is an oxide of metal in a broad sense. Metal oxides are classified into an oxide insulator, an oxide conductor (including a transparent oxide conductor), an oxide semiconductor (also simply referred to as an OS), and the like. For example, in the case where a metal oxide is used in an active layer of a transistor, the metal oxide is referred to as an oxide semiconductor in some cases. That is, when an OS transistor is mentioned, the OS transistor can also be called a transistor including an oxide or an oxide semiconductor.

In this specification and the like, a display device may be rephrased as an electronic device.

Embodiment 1

In this embodiment, display devices and display systems of one embodiment of the present invention will be described with reference to FIG. 1 to FIG. 6.

<Structure Example of Display Device and Display System>

Figure 1B:
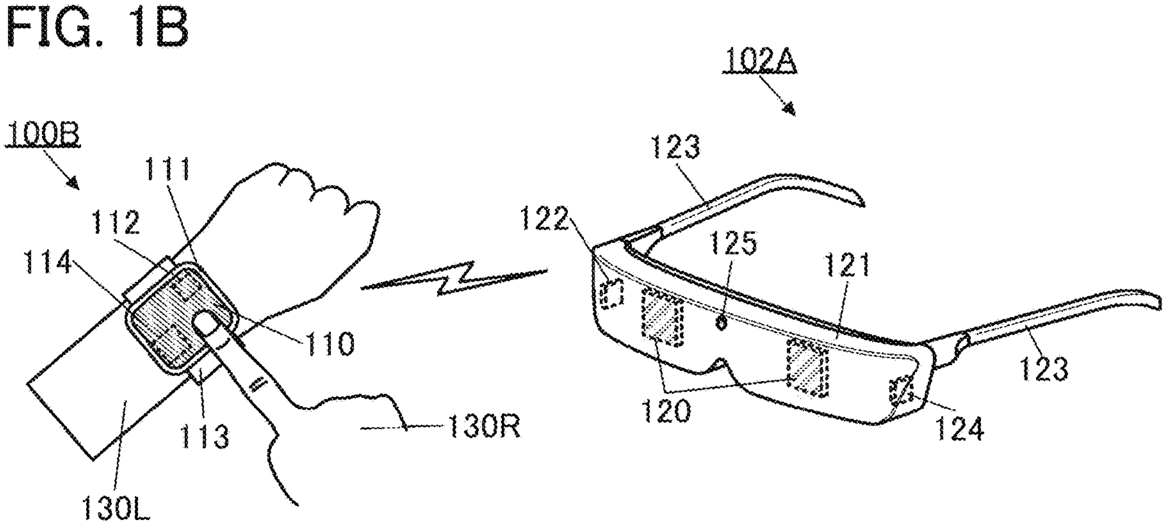
Figure 1C:
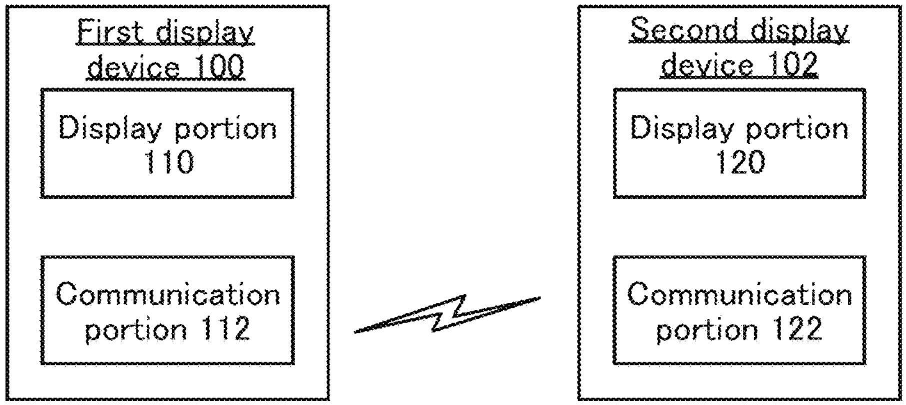

FIG. 1A to FIG. 1C are diagrams illustrating structure examples of display devices and display systems of one embodiment of the present invention.

As illustrated in FIG. 1A, a display system of one embodiment of the present invention includes a first display device 100A and a second display device 102A. The first display device 100A and the second display device 102A each have a wireless communication function. The second display device 102A includes a region having a pixel density (also referred to as resolution) higher than that of the first display device 100A. With the use of the above wireless communication function, a screen of the first display device 100A or part of the screen can be displayed on the second display device 102A.

As illustrated in FIG. 1A, the display system of one embodiment of the present invention includes a plurality of display devices. The plurality of display devices perform data communication using a wireless communication function and image data displayed on a screen of one display device can be partly processed by a processing method such as up-conversion or down-conversion of the data, so that the processed data can be displayed on another display device. Such a display system offers greater user convenience, enables an image to be displayed with an optimal image quality for each of the display devices, or can lower the power consumption of the display devices.

The first display device 100A includes a display portion 110, a housing 111, a communication portion 112, and a control portion 114. Note that FIG. 1A illustrates a right hand 130R of the user. The second display device 102A includes a display portion 120, a housing 121, a communication portion 122, a wearing portion 123, a control portion 124, and a camera portion 125. Wireless communication between the first display device 100A and the second display device 102A can be performed between the communication portion 112 and the communication portion 122, as illustrated in FIG. 1A. The communication portion 112 has a function of transmitting information to the second display device 102A in accordance with the manipulation with the first display device 100A. The communication portion 122 has a function of transmitting information to the first display device 100A in accordance with the manipulation with the second display device 102A.

The camera portion 125 included in the second display device 102A has a function of obtaining external information. Data obtained by the camera portion 125 can be output to the display portion 120 or the display portion 110 included in the first display device 100A, for example. The wearing portion 123 included in the second display device 102A enables the user to put the second display device 102A on the head. FIG. 1A illustrates an example in which the wearing portion 123 has a shape like a temple (also referred to as a joint or the like) of glasses; however, one embodiment of the present invention is not limited thereto. The wearing portion 123 can have any shape with which the user can wear and can have a shape of a helmet or a band, for example.

Although an example in which the camera portion 125 is provided is described here, a range sensor (hereinafter, also referred to as a sensing portion) that is capable of measuring a distance from an object may be provided. That is, the camera portion 125 is one embodiment of the sensing portion. As the sensing portion, an image sensor or a distance image sensor such as LIDAR (Light Detection and Ranging) can be used, for example. With the use of images obtained by the camera and images obtained by the distance image sensor, more pieces of information can be obtained and a gesture operation with higher accuracy is possible.

The user can manipulate an image (also referred to as data or an object) displayed on the display portion 120 of the second display device 102A with an intuitive gesture operation as if the image is an actual object. For example, the user can pinch an image that is displayed to have a plate-like shape and be floating with the hand. The pinched image can be removed by being thrown like a Frisbee. The pinched image can be moved up, down, left, and right. The pinched image can be moved back and forth, so that the image can be enlarged and downsized. The pinched image can be reversed. At this time, a rotation axis can be in the vertical direction, the horizontal direction, or the oblique direction. When the edge of the field of view where nothing is displayed is pinched and dragged, the plate-like image can be drawn out. When the plate-like image is pushed to the direction apart from the user, the image can be removed. In addition, the user can remove the image by putting the hand on the edge of the plate-like image and then moving the hand left or right. After such an image removing movement, another image may be displayed. The user may register specific information in the first display device 102A in advance. For example, movements from a movement of spreading a palm to a movement of putting a thumb and an index finger together (a movement of making a circle with a thumb and an index finger) can be registered as first processing information, and second processing information can be executed on the basis of the first processing information. Note that as the second processing information, for example, data on an operation such as image removal, display of a specific image, or display of a shortcut icon can be registered freely by the user.

It is preferable to provide a plurality of sensing portions in a display device or an electronic device so that a highly accurate gesture operation by the user using a plurality of actions such as a movement using both hands can be provided for the operation of the display device or the electronic device. This enables three-dimensional positional information on a plurality of objects to be detected with higher accuracy, so that input with a complicated gesture operation is possible.

The user can manipulate an image (also referred to as data or an object) displayed on the display portion 120 of the second display device 102A with a gesture operation using both hands, for example, as if the image is an actual object. For example, the user can pinch an image that is displayed to have a plate-like shape and be floating by its two portions (e.g., upper and bottom portions, left and right portions, or diagonally opposite portions). The image that the user is pinching with both hands can be enlarged by being stretched. The image that the user is pinching with both hands can be downsized by being shrunk. The user can remove the image by pinching the image with both hands or putting the hands on both edges of the image and then squeezing the image with both hands. The user can remove the image by pinching the image by its upper side with both hands and then tearing up the image from side to side. The user can remove the image by pinching the image with both hands and then folding the image. The user can pinch the image with one hand and perform a gesture operation (e.g., tapping, swiping, pinching in, or pinching out) on the image with the other hand. As described above, the user can register a specific movement and processing information associated with the movement in the second display device 102A in advance.

Each of the first display device 100A and the second display device 102A is preferably capable of being connected to a network in the display system of one embodiment of the present invention. In that case, the first display device 100A and the second display device 102A can be used separately as a communication tool. For example, an image or part of an image displayed on the second display device 102A worn by a first user can be displayed on the second display device 102A worn by a second user. Alternatively, an image or part of an image displayed on the second display device 102A worn by the first user can be displayed on the first display device 100A possessed by the second user. With such a display system, the same image data can be shared between a plurality of users, so that communicability can be increased. With the use of the display system of one embodiment of the present invention, a highly convenient display system or a method for operating the display system can be provided.

Note that the processing that can be executed by the first display device 100A and the second display device 102A in this embodiment is merely an example, and various types of processing can be executed in accordance with application software incorporated in the first display device 100A or the second display device 102A.

Next, a structure example different from that illustrated in FIG. 1A will be described with reference to FIG. 1B.

A first display device 100B illustrated in FIG. 1B includes the display portion 110, the housing 111, the communication portion 112, a band 113, and the control portion 114. FIG. 1B illustrates the user's right hand 130R and a user's left hand 130L. The structure of the second display device 102A illustrated in FIG. 1B is similar to the structure illustrated in FIG. 1A; thus, the description thereof is omitted here.

The first display device 100A illustrated in FIG. 1A has a function of what is called a portable information terminal (typically, a smartphone and the like), and the first display device 100B illustrated in FIG. 1B has a function of what is called a watch-type portable information terminal. Note that the first display device 100A and the first display device 100B each have at least one or both of a telephone function and a time display function. The second display device 102A has one or both of a function of displaying a content of augmented reality (AR) and a function of displaying a content of virtual reality (VR). Note that the second display device 102A may have a function of displaying a content of substitutional reality (SR) or a content of mixed reality (MR), in addition to contents of AR and VR. The second display device 102A having a function of displaying contents of AR, VR, SR, MR, or the like enables the user to reach a higher level of immersion.

Next, display devices and display systems of one embodiment of the present invention will be described with reference to FIG. 1C, FIG. 2A, and FIG. 2B.

FIG. 1C is a diagram illustrating display devices and a display system of one embodiment of the present invention. As illustrated in FIG. 1C, a first display device 100 includes at least the display portion 110 and the communication portion 112, and a second display device 102 includes the display portion 120 and the communication portion 122.

Figure 2A:
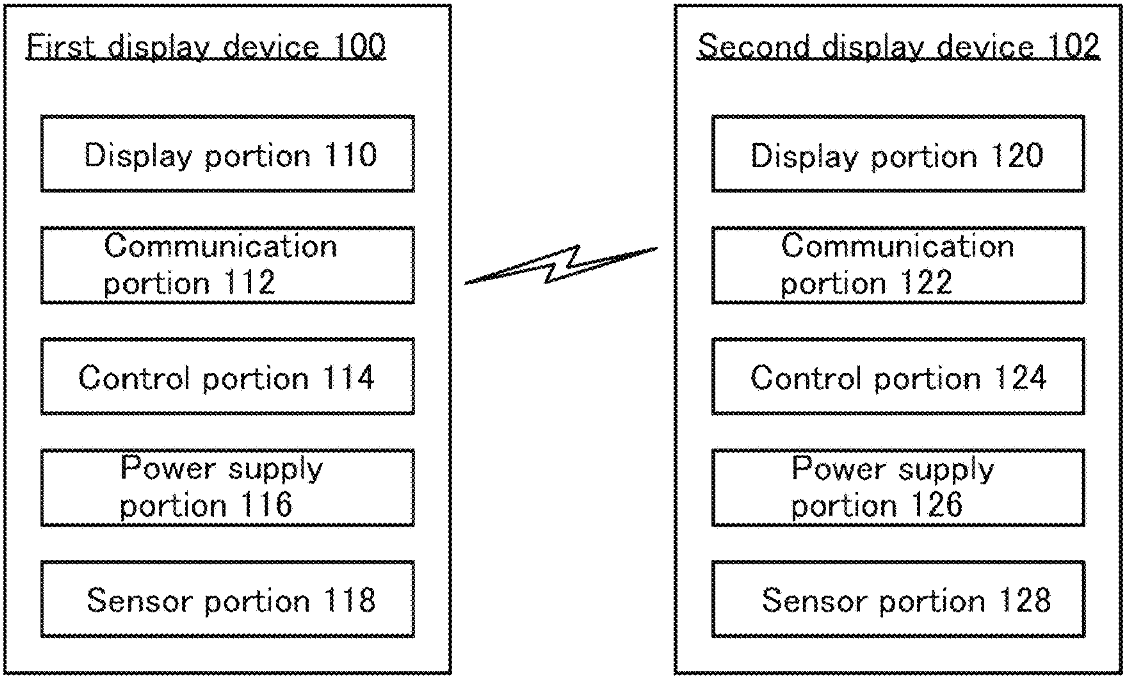
FIG. 2A and FIG. 2B are diagrams illustrating structure examples of display devices and display systems.

As illustrated in FIG. 2A, the first display device 100 includes the display portion 110, the communication portion 112, the control portion 114, a power supply portion 116, and a sensor portion 118. As illustrated in FIG. 2A, the second display device 102 includes the display portion 120, the communication portion 122, the control portion 124, a power supply portion 126, and a sensor portion 128.

Note that although FIG. 1C and FIG. 2A illustrate a structure in which the first display device 100 and the second display device 102 have the same functions, the structure is not limited thereto. For example, as illustrated in FIG. 2B, the first display device 100 and the second display device 102 may have different functions.

Figure 2B:
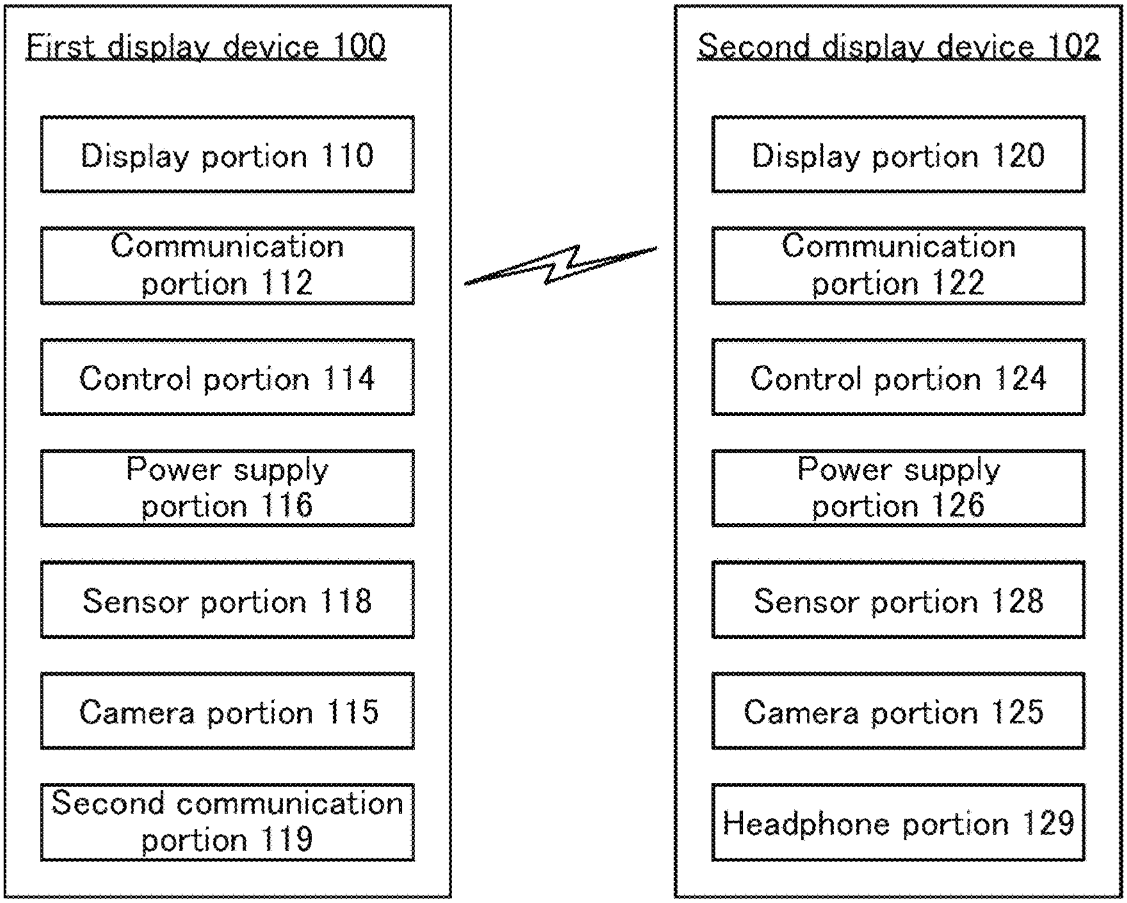

In FIG. 2B, the first display device 100 includes a camera portion 115 (also referred to as a sensing portion) and a second communication portion 119 in addition to the components illustrated in FIG. 2A. The second display device 102 includes the camera portion 125 and a headphone portion 129 in addition to the components illustrated in FIG. 2A. The camera portion 115 includes an imaging portion such as an image sensor. Moreover, a plurality of cameras may be provided so as to support a plurality of fields of view, such as a telescope field of view and a wide field of view. The second communication portion 119 can have a communication function different from that of the communication portion 112. For example, the communication portion 112 has a function of performing communication with the communication portion 122, and the second communication portion 119 has a function capable of audio call or a communication means capable of electronic payment or the like, utilizing the third-generation mobile communication system (3G), the fourth-generation mobile communication system (4G), the fifth-generation mobile communication system (5G), or the like.

It is preferable that the definition of the display portion 120 be higher than that of the display portion 110 in FIG. 1A, FIG. 1B, FIG. 1C, FIG. 2A, and FIG. 2B. The definition of the display portion 110 can be HD (pixel count: 1280×720), FHD (pixel count: 1920×1080), or WQHD (pixel count: 2560×1440), for example. The definition of the display portion 120 is preferably as high as WQXGA (pixel count: 2560×1600), 4K2K (pixel count: 3840×2160), or 8K4K (pixel count: 7680×4320). In particular, a definition of 4K2K, 8K4K, or higher is preferable.

The display portion 120 preferably has a higher pixel density (resolution) than the display portion 110. For example, the pixel density of the display portion 110 can be higher than or equal to 100 ppi and lower than 1000 ppi, preferably higher than or equal to 300 ppi and lower than or equal to 800 ppi. The pixel density of the display portion 120 can be higher than or equal to 1000 ppi and lower than or equal to 10000 ppi, preferably higher than or equal to 2000 ppi and lower than or equal to 6000 ppi, further preferably higher than or equal to 3000 ppi and lower than or equal to 5000 ppi.

Note that there is no particular limitation on the screen ratio (aspect ratio) of each of the display portion 110 and the display portion 120. For example, the display portion 110 and the display portion 120 can each be compatible with a variety of screen ratios such as 1:1 (a square), 3:4, 16:9, and 16:10.

Note that it is preferable that the display portion 110 be formed over a glass substrate and the display portion 120 be formed over a silicon substrate. Forming the display portion 110 over a glass substrate can reduce the manufacturing costs. However, in the case where the display portion 110 is formed over a glass substrate, it is sometimes difficult to increase the pixel density of the display portion 110 (to typically higher than or equal to 1000 ppi) because of the manufacturing apparatus. Thus, in the display device and the display system of one embodiment of the present invention, the pixel density of the display portion 120 can be increased (to typically higher than or equal to 1000 ppi) by forming the display portion 120 over a silicon substrate. In other words, an image with a resolution with which the display portion 110 is incompatible can be displayed on the display portion 120 complementarily.

The display system of one embodiment of the present invention includes two display devices having different definitions or different pixel densities. In order for one of the display devices to have image data that can be suitably displayed on the other display device, a part or the whole of image data can be compressed or extended.

By increasing the definition or resolution of the display portion 120, the pixels can be imperceptible (e.g., lines that might be caused between pixels can be invisible) to the user and accordingly the user can reach a higher level of immersion, realistic sensation, and sense of depth.

As illustrated in FIG. 1A, the first display device 100A has a period during which display is not performed by the display portion, and functions as an input/output means (e.g., a controller) of the second display device 102A in that period. Such a function can extend the usage period of the power supply portion 116 included in the first display device 100A. That is, the display system of one embodiment of the present invention can achieve power saving. Note that a lithium-ion secondary battery can be used as the power supply portion 116, for example.

Next, the components of the display devices and the display systems of one embodiment of the present invention illustrated in FIG. 1A, FIG. 1B, FIG. 1C, FIG. 2A, and FIG. 2B will be described below.

<Display Portion>

The display portion 110 and the display portion 120 each have a function of performing display. For the display portion 110 and the display portion 120, one or more selected from a liquid crystal display device, a light-emitting device including organic EL, and a light-emitting device including a light-emitting diode such as a micro LED can be used, for example. In consideration of productivity and emission efficiency, a light-emitting device including organic EL is suitably used for the display portion 110 and the display portion 120.

<Communication Portion>

The communication portion 112 and the communication portion 122 each have a wireless or wired communication function. It is particularly suitable that the communication portion 112 and the communication portion 122 each have a wireless communication function, in which case the number of components such as a cable for connection can be reduced.

When the communication portion 112 and the communication portion 122 each have a wireless communication function, the communication portion 112 and the communication portion 122 can communicate through an antenna. As for the communication means (communication method) between the communication portion 112 and the communication portion 122, for example, the communication can be performed in such a manner that each device is connected to a computer network such as the Internet, which is the infrastructure of the World Wide Web (WWW), an intranet, an extranet, a PAN (Personal Area Network), a LAN (Local Area Network), a CAN (Campus Area Network), a MAN (Metropolitan Area Network), a WAN (Wide Area Network), or a GAN (Global Area Network). In the case of performing wireless communication, it is possible to use, as a communication protocol or a communication technology, a communications standard such as LTE (Long Term Evolution), GSM (Global System for Mobile Communication: registered trademark), EDGE (Enhanced Data Rates for GSM Evolution), CDMA 2000 (Code Division Multiple Access 2000), or W-CDMA (registered trademark), or a communications standard developed by IEEE such as Wi-Fi (registered trademark), Bluetooth (registered trademark), or ZigBee (registered trademark).

<Control Portion>

The control portion 114 and the control portion 124 each have a function of controlling the display portion. The control portion 114 and the control portion 124 each include a pixel circuit, a backup circuit, and an image conversion circuit, for example. Note that the image conversion circuit can perform amp-conversion processing or down-conversion processing of image data. Thus, image data with low definition can be up-converted or image data with high definition can be down-converted according to the definition of the display portion, which enables the display portion to display an image with high display quality. Note that the pixel circuit and the backup circuit will be described in detail in Embodiment 2.

<Power Supply Portion>

The power supply portion 116 and the power supply portion 126 each have a function of supplying electric power to the display portion. As the power supply portion 116 and the power supply portion 126, a primary battery or a secondary battery can be used, for example. Note that a lithium-ion secondary battery can be suitably used as the secondary battery, for example.

<Sensor Portion>

The sensor portion 118 and the sensor portion 128 each have a function of obtaining information on any one or more of the sense of sight, the sense of hearing, the sense of touch, the sense of taste, and the sense of smell of the user. Specifically, the sensor portion 118 and the sensor portion 128 each have a function of measuring at least one of force, displacement, position, speed, acceleration, angular velocity, rotational frequency, distance, light, magnetism, temperature, sound, time, electric field, current, voltage, electric power, radiation, humidity, gradient, oscillation, smell, and infrared rays.

The sensor portion 128 preferably has a function of measuring brain waves in addition to the above function. For example, the sensor portion 128, which has a plurality of electrodes in contact with the user's head, can have a mechanism of measuring brain waves from weak current flowing through the electrodes. When the sensor portion 128 has a function of measuring brain waves, an image of the display portion 110 or part of the image of the display portion 110 can be displayed on the user's intended area of the display portion 120. In this case, since the user does not use both hands to operate the display device, an input operation or the like can be performed with holding nothing in both hands (in a state where both hands are free).

EXAMPLE 1 OF IMAGE

Next, examples of the display devices and an image of the display system of one embodiment of the present invention will be described with reference to FIG. 3A, FIG. 3B, FIG. 3C, and FIG. 3D.

Hereinafter, examples of a manipulation method that a user can experience with the display system of one embodiment of the present invention and examples of an image that can be presented to the user will be described.

Figure 3A:
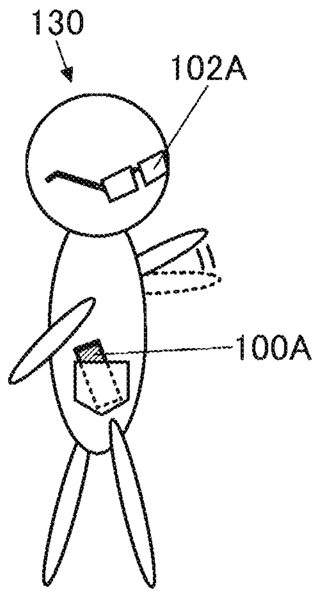
FIG. 3A to FIG. 3D are diagrams illustrating examples of display devices and an image of a display system.

FIG. 3A illustrates a state where a user 130 wearing the second display device 102A with an eyeglass-like shape performs a gesture operation. At this time, the display portion of the first display device 100A is off, so that the power consumption of the first display device 100A can be reduced. In addition, the first display device 100A is in a pocket of the clothes of the user 130; thus, the user 130 can operate the display system with both hands being free.

Figure 3B:
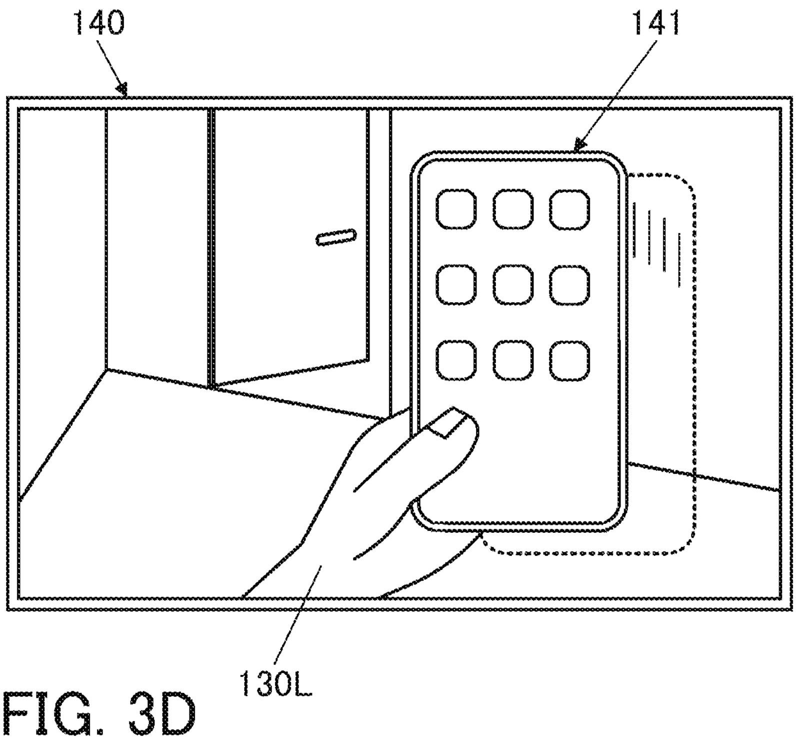

FIG. 3B illustrates an example of an image 140 in the field of view of the user 130 illustrated in FIG. 3A in a room. In the image 140 illustrated in FIG. 3B, image information 141 is superimposed on a captured image of a real-world indoor scenery including a floor, a wall, a door, and the like. Here, the image information 141 is part of an image displayed on the display portion of the first display device 100A. The user 130 wearing the second display device 102A can operate the first display device 100A (e.g., a smartphone) that is paired with the second display device 102A.

When the user 130 performs a movement of holding a space where the image information 141 is shown with the left hand 130L, the display device 102A recognizes this movement as a gesture operation and makes the position of the image information 141 changeable. The movement of the left hand 130L of the user 130 in this state can change the position of the image information 141 in accordance with the movement of the left hand 130L, as illustrated in FIG. 3B. At this time, the image information 141 can be not only moved left and right, up and down, and back and forth but also rotated in accordance with the movement of the left hand 130L.

Figure 3C:
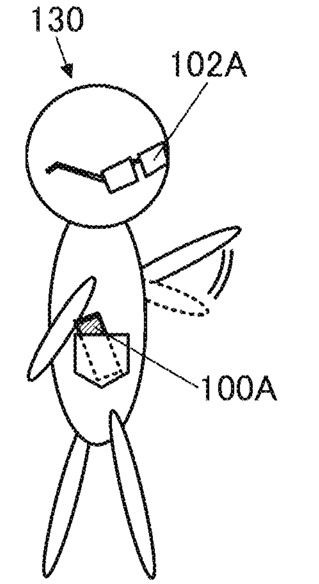

FIG. 3C illustrates a state where the user 130 performs a gesture operation with a movement different from that in FIG. 3A. The first display device 100A whose display portion is off is put in the pocket of the clothes of the user 130 as described above.

Figure 3D:
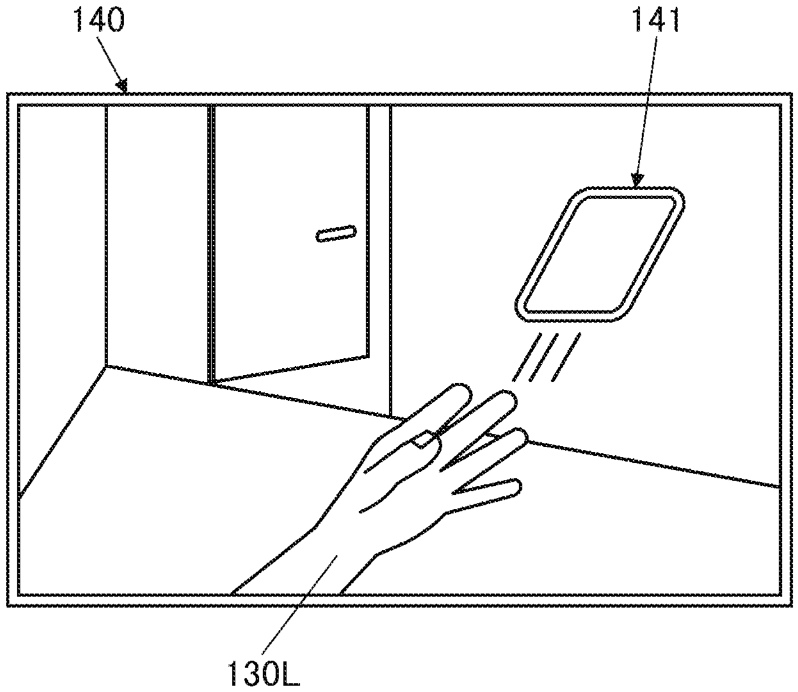

FIG. 3D illustrates the image 140 in the field of view of the user 130 illustrated in FIG. 3C in a room. The user 130 performs a movement of holding the space where the image information 141 is shown and then performs a movement of throwing an object like a Frisbee, whereby the image information 141 can be abandoned. At this time, the image information 141 moves in the direction apart from the user 130, and is displayed to disappear at a certain point or ejected to the outside of the field of view. In this manner, a content image displayed in the field of view can be abandoned (closed) with a gesture operation of the user 130.

As described above, the display devices and the display system of one embodiment of the present invention can be operated by a new manipulation method or operation method.

Next, an example of an operation method of the display system of one embodiment of the present invention will be described with reference to FIG. 4.

[Operation Method Example 1 of Display System]

An example of an operation method of the display system will be described below. FIG. 4 is a flowchart for the operation method of the display system.

In Step S01, the operation starts. At this time, the first display device 100A is in a start-up state (a state where a manipulation is possible), and the second display device 102A is in a power-on state.

In Step S02, the second display device 102A is worn. The second display device 102A recognizes being worn, and the system starts. In Step S02, for example, when the second display device 102A has a goggle-type shape, an image of the front view of a camera may be presented to the user or an image of other contents may be displayed.

In Step S03, pairing between the first display device 100A and the second display device 102A is executed. When the pairing is completed, the first display device 100A and the second display device 102A are in a state where two-way data communication is possible.

In Step S04, a first image displayed on the display portion 110 of the first display device 100A is displayed on the display portion 120 of the second display device 102A. Accordingly, the user can see information displayed on the second display device 102A without looking at the screen of the first display device 100A.

At this time, since the pixel density of the display portion differs between the first display device 100A and the second display device 102A, instead of displaying the first image as it is, a second image, which is obtained by performing image processing such as up-conversion or down-conversion on the first image so that the image can have an optimal size when displayed on the display portion 120 of the second display device 102A, is preferably displayed on the second display device 102A.

In Step S05, information is transmitted from the second display device 102A to the first display device 100A. The information includes, for example, a code that means the completion of display of the first image.

In Step S06, the display portion 110 of the first display device 100A is turned off on the basis of the received information. At this time, the first display device 100A maintains a touch sensor of the display portion 110 in an active state. Accordingly, the display portion 110 of the first display device 100A functions as an input means (a touch pad) or the like.

In Step S07, the second display device 102A senses a gesture operation of the user with the sensing portion included in the second display device 102A and obtains gesture information corresponding to the gesture operation.

In Step S08, the second display device 102A executes various types of processing on the basis of the gesture information. For example, image processing is performed on image information displayed on the display portion 120 of the second display device 102A, and the image information that has been subjected to the image processing can be displayed on the display portion 120.

In Step S09, the processing ends. Step S09 corresponds to detaching the second display device 102A, turning off the power of the first display device 100A or the second display device 102A, or canceling the pairing between the first display device 100A and the second display device 102A, for example.

The above is the description of the operation method example of the display system of one embodiment of the present invention.

EXAMPLE 2 OF IMAGE

Next, examples of a manipulation method that a user can experience with the display system of one embodiment of the present invention and examples of an image that can be presented to the user, which are different from those described above, will be described with reference to FIG. 5A, FIG. 5B, FIG. 5C, and FIG. 5D.

Figure 5A:
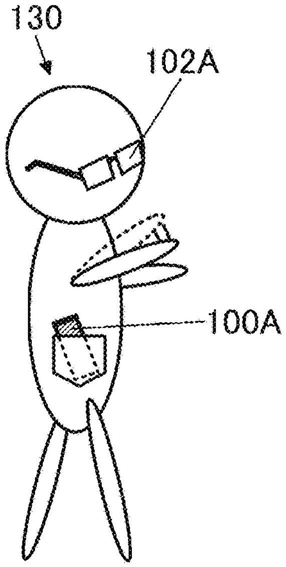
FIG. 5A to FIG. 5D are diagrams illustrating examples of display devices and an image of a display system.

FIG. 5A illustrates a state where the user 130 wearing the second display device 102A with an eyeglass-like shape performs a gesture operation. At this time, the display portion of the first display device 100A is off, so that the power consumption of the first display device 100A can be reduced. In addition, the first display device 100A is in the pocket of the clothes of the user 130; thus, the user 130 can operate the display system with both hands being free.

Figure 5B:
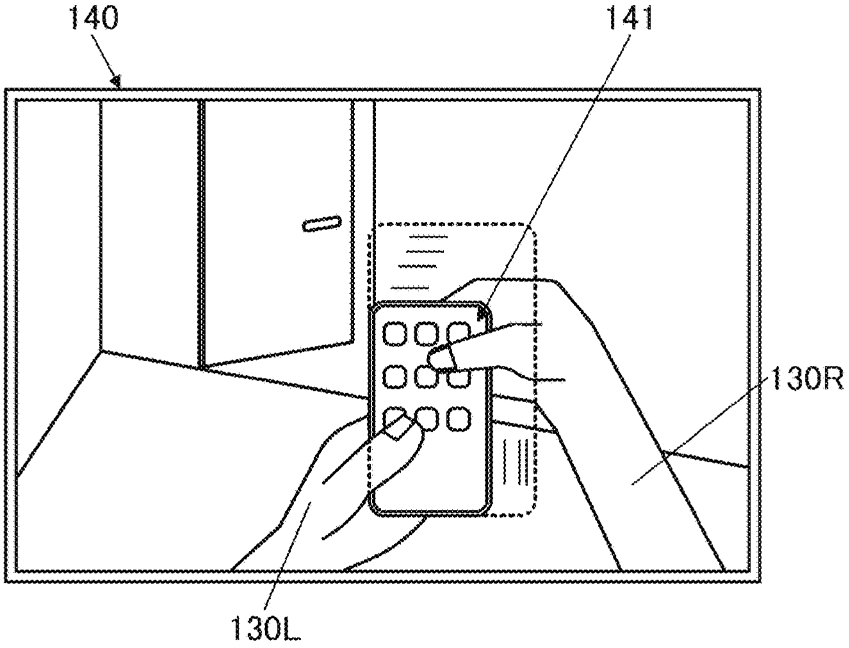

FIG. 5B illustrates an example of the image 140 in the field of view of the user 130 illustrated in FIG. 5A in a room. In the image 140 illustrated in FIG. 5B, the image information 141 is superimposed on a captured image of a real-world indoor scenery including a floor, a wall, a door, and the like. Here, the image information 141 is part of an image displayed on the display portion of the first display device 100A. The user 130 wearing the second display device 102A can operate the first display device 100A (e.g., a smartphone) that is paired with the second display device 102A.

When the user 130 performs a movement of holding the space where the image information 141 is shown with the left hand 130L and the right hand 130R as illustrated in FIG. 5B, the display device 102A recognizes this movement as a gesture operation and makes the shape of the image information 141 changeable. When the left hand 130L and the right hand 130R become close to each other in this state, the shape of the image information 141 is changed such that the image information 141 is downsized as illustrated in FIG. 5B. By contrast, when the left hand 130L and the right hand 130R become apart from each other, the image information 141 can be enlarged. At this time, the image information 141 can be moved or rotated in accordance with the movements of the left hand 130L and the right hand 130R.

Figure 5C:
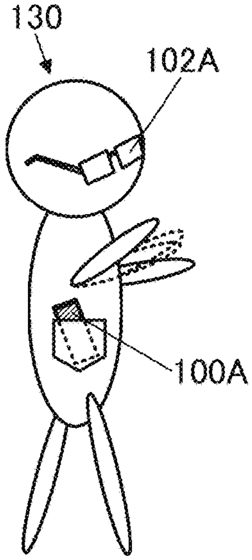

FIG. 5C illustrates a state where the user 130 performs a gesture operation with a movement different from that in FIG. 5A. The first display device 100A whose display portion is off is put in the pocket of the clothes of the user 130 as described above.

Figure 5D:
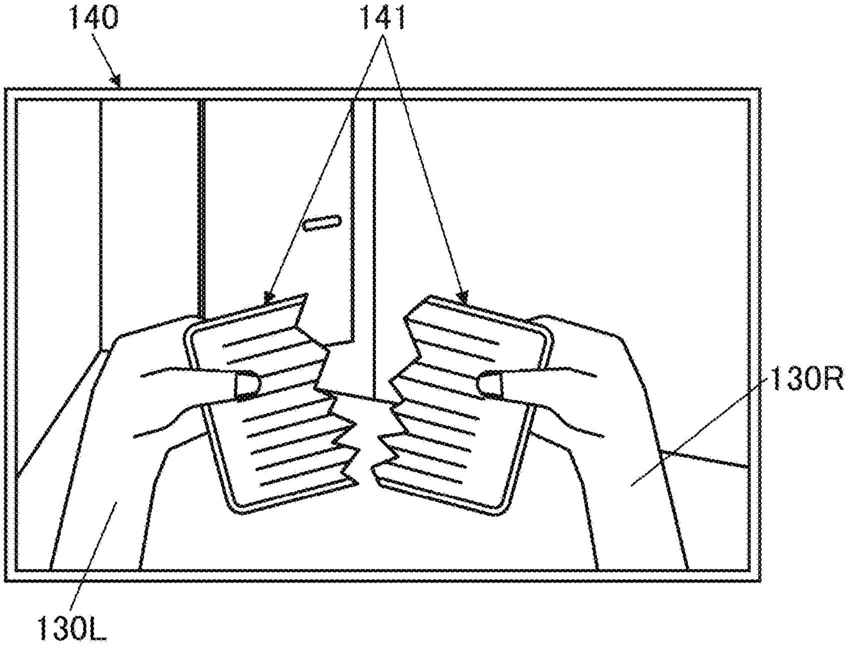

FIG. 5D illustrates the image 140 in the field of view of the user 130 illustrated in FIG. 5C in a room. The user 130 performs a movement of holding the space where the image information 141 is shown with the left hand 130L and the right hand 130R and then performs a movement of spreading the hands to left and right, whereby the image information 141 can be abandoned. At this time, the image information 141 is displayed to be teared up from side to side as illustrated in FIG. 5D. In this manner, a content image displayed in the field of view can be abandoned (closed) with a gesture operation of the user 130.

As described above, the display devices and the display system of one embodiment of the present invention can be operated by a new manipulation method.

[Operation Method Example 2 of Display System]

Figure 6:
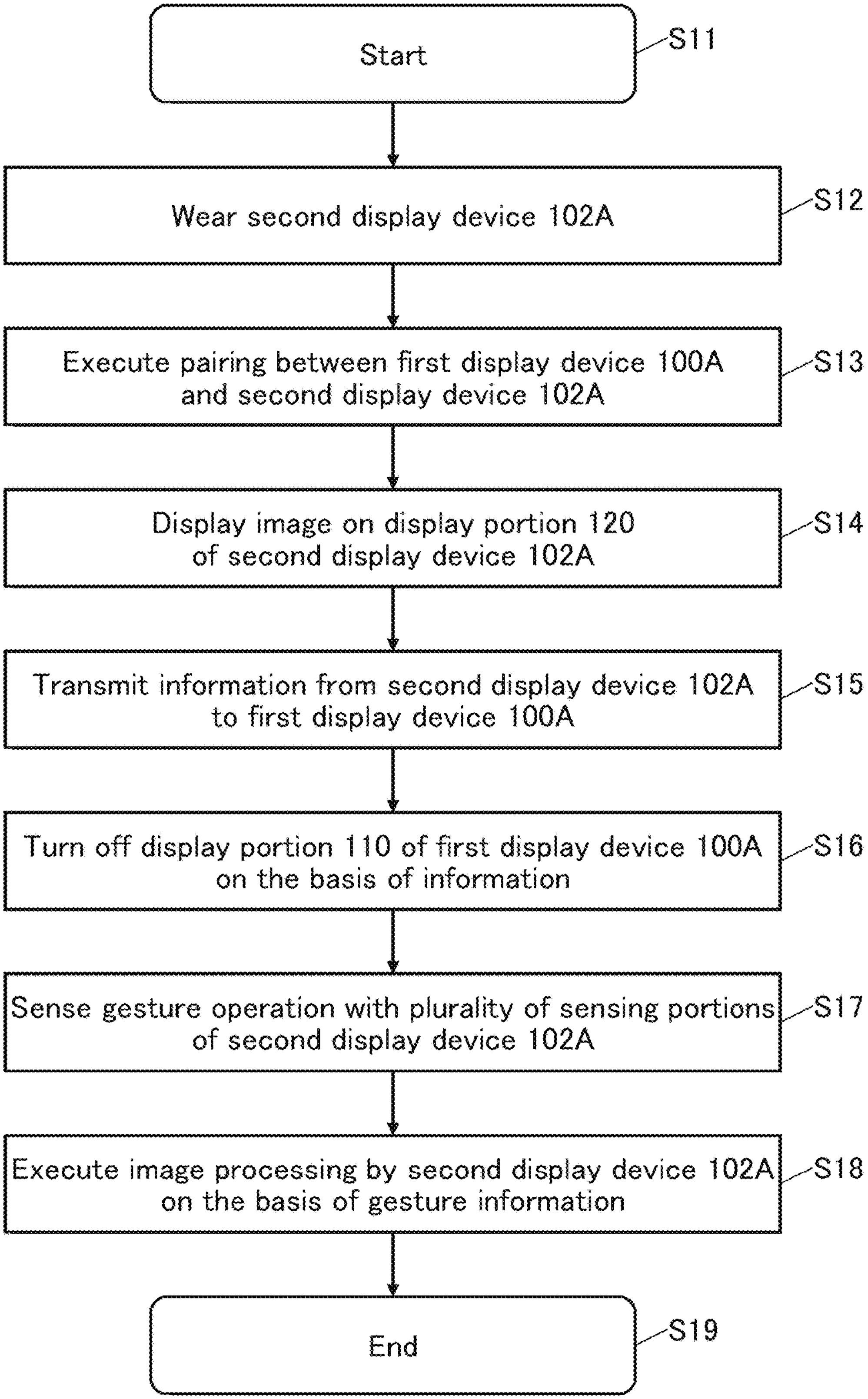
FIG. 6 is a diagram showing an example of an operation method of a display system.

An example of an operation method of the display system will be described below. FIG. 6 is a flowchart for the operation method of the display system.

Figure 4:
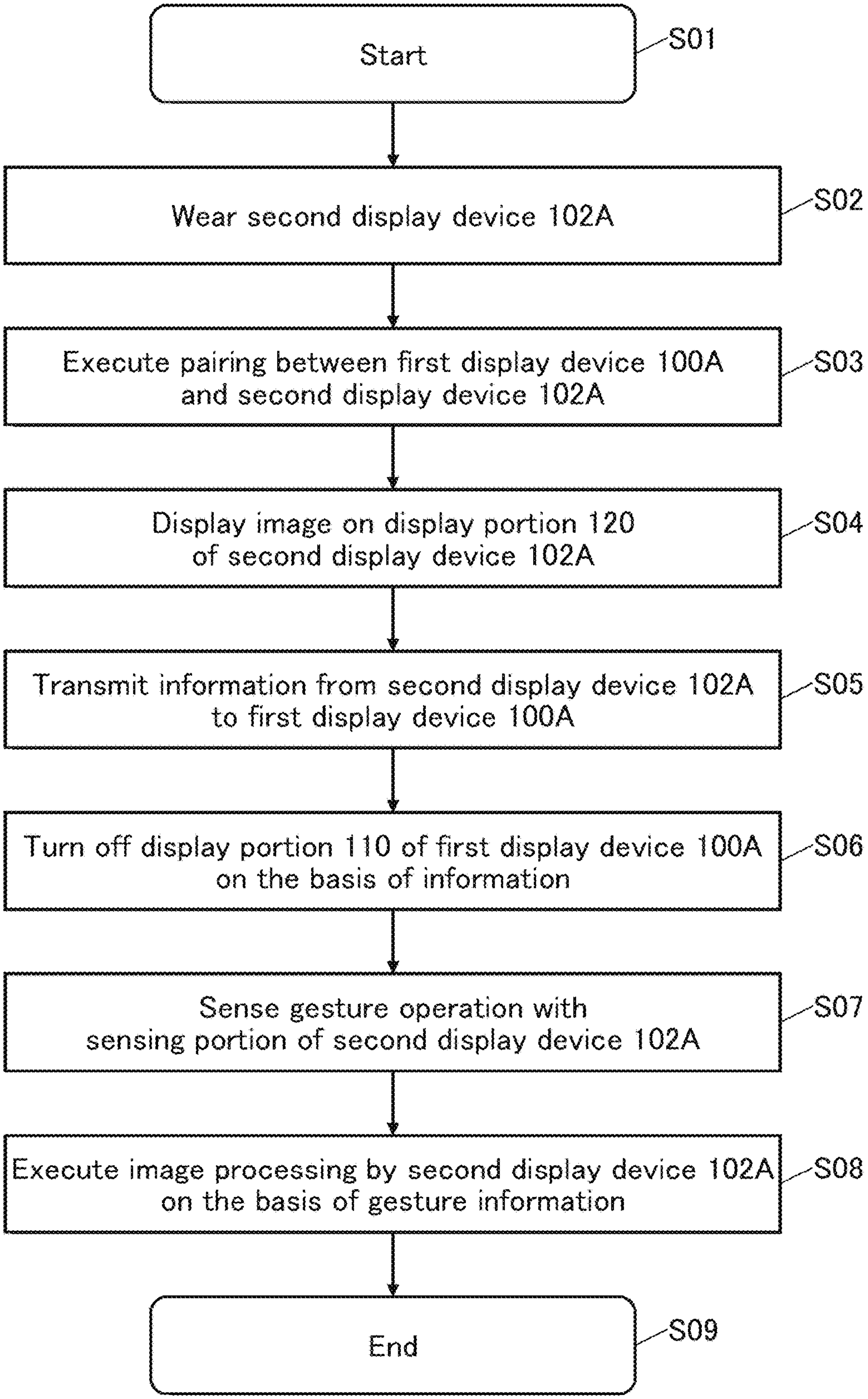
FIG. 4 is a diagram showing an example of an operation method of a display system.

Step S11 to Step S16 in FIG. 6 are equivalent to Step S01 to Step S06 in the flowchart exemplified in FIG. 4; thus, refer to the description of Step S01 to Step S06 for Step S11 to Step S16.

In Step S17, the second display device 102A senses a gesture operation of the user with a plurality of sensing portions included in the second display device 102A. The second display device 102A obtains gesture information corresponding to the gesture operation on the basis of information output from the plurality of sensing portions (such information is also referred to as input data).

In Step S18, the second display device 102A executes various types of processing on the basis of the gesture information. For example, image processing is performed on image information displayed on the display portion 120 of the second display device 102A, and the image information that has been subjected to the image processing can be displayed on the display portion 120.

In Step S19, the processing ends. Step S19 corresponds to detaching the second display device 102A, turning off the power of the first display device 100A or the second display device 102A, or canceling the pairing between the first display device 100A and the second display device 102A, for example.

The above is the description of the operation method example of the display system of one embodiment of the present invention.

As described above, with the use of the display devices and the display system of one embodiment of the present invention, a display device with a novel structure or a display system with a novel structure can be provided. With the use of the display devices and the display system of one embodiment of the present invention, a manipulation method for a display device with a novel structure or a manipulation method for a display system with a novel structure can be provided.

This embodiment can be combined with the description of the other embodiments as appropriate.

Embodiment 2

In this embodiment, a display device and a display system of one embodiment of the present invention will be described.

<Structure Example of Display Device>

Figure 7:
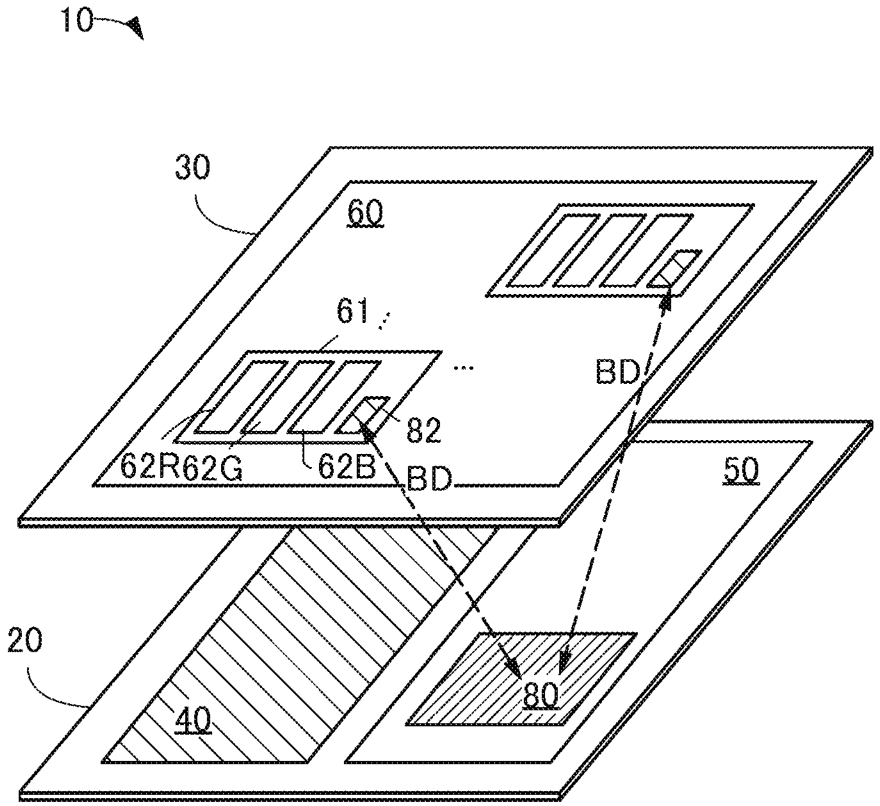
FIG. 7 is a block diagram illustrating a structure example of a display device.

FIG. 7 is a block diagram schematically illustrating a structure example of a display device 10 that is a display device of one embodiment of the present invention. The display device 10 includes a layer 20 and a layer 30, and the layer 30 can be stacked above the layer 20, for example. An interlayer insulator or a conductor for electrical connection between different layers can be provided between the layer 20 and the layer 30.

A transistor provided in the layer 20 can be a transistor containing silicon in a channel formation region (also referred to as a Si transistor), such as a transistor containing single crystal silicon in a channel formation region, for example. In particular, the use of a transistor containing single crystal silicon in a channel formation region as the transistor provided in the layer 20 can increase the on-state current of the transistor. This is preferable because circuits included in the layer 20 can be driven at high speed. The Si transistor can be formed by microfabrication to have a channel length of 3 nm to 10 nm, for example; thus, the display device 10 can be provided with a CPU, an accelerator such as a GPU, an application processor, or the like.

A transistor provided in the layer 30 can be an OS transistor, for example. It is particularly preferable to use, as the OS transistor, a transistor including an oxide containing at least one of indium, an element M (the element M is aluminum, gallium, yttrium, or tin), and zinc in a channel formation region. Such an OS transistor has a characteristic of an extremely low off-state current. Thus, it is particularly preferable to use the OS transistor as a transistor provided in a pixel circuit included in a display portion, in which case analog data written to the pixel circuit can be retained for a long period.

A driver circuit 40 and a functional circuit 50 are provided in the layer 20. Since the Si transistor with a high on-state current is provided in the layer 20, the circuits included in the layer 20 can be driven at high speed.

A display portion 60 including a plurality of pixels 61 is provided in the layer 30. Pixel circuits 62R, 62G, and 62B that control emission of red light, green light, and blue light are provided in the pixels 61. The pixel circuits 62R, 62G, and 62B function as subpixels of the pixels 61. Since the pixel circuits 62R, 62G, and 62B include OS transistors, analog data written to the pixel circuits can be retained for a long period. A backup circuit 82 is provided in each of the pixels 61 included in the layer 30. Note that the backup circuit is sometimes referred to as a storage circuit or a memory circuit.

The driver circuit 40 includes a gate line driver circuit, a source line driver circuit, and the like for driving the pixels 61 (the pixel circuits 62R, 62G, and 62B) in the display portion 60. With a structure in which the driver circuit 40 is provided not in the layer 30 where the display portion is provided but in the layer 20, an area occupied by the display portion in the layer 30 can be large. In addition, the driver circuit 40 may include an LVDS (Low Voltage Differential Signaling) circuit, a D/A (Digital to Analog) converter circuit, or the like functioning as an interface for receiving data such as image data from the outside of the display device 10. The Si transistor of the layer 20 can have a high on-state current. The channel length, the channel width, or the like of the Si transistor may be varied in accordance with the operation speed of each circuit.

The functional circuit 50 includes a processor (e.g., a CPU) used for arithmetic processing of data. The CPU includes a plurality of CPU cores. A flip-flop is included in each of the CPU cores. The flip-flop includes a plurality of scan flip-flops. A flip-flop 80 inputs and outputs data of the scan flip-flops (backup data) to/from the backup circuit 82. FIG. 7 illustrates backup data BD as a data signal retained in the backup circuit 82.

As the backup circuit 82, for example, a memory including an OS transistor is suitable. The use of an OS transistor with an extremely low off-state current in the backup circuit offers advantages such as long-time retention of the voltage of analog data written to the backup circuit and very little power consumption for data retention. The backup circuit 82 including the OS transistor can be provided in the display portion 60 in which the plurality of pixels 61 are placed. FIG. 7 illustrates a state where the backup circuit 82 is provided in each of the pixels 61.

The backup circuit 82 formed using the OS transistor can be stacked over the layer 20 including the Si transistor. The backup circuits 82 may be arranged in a matrix like the subpixels in the pixels 61; alternatively, one backup circuit 82 may be provided for every plurality of pixels. That is, the backup circuits 82 can be arranged in the layer 30 without being limited by the arrangement of the pixels 61. Therefore, the backup circuits 82 can be arranged without any increase in the circuit area and the degree of flexibility in the layout of the display portion or the circuits is enhanced, so that memory capacity of the backup circuits 82 required for arithmetic processing can be increased.

<Structure Examples of Pixel Circuit and Backup Circuit>

Figure 8:
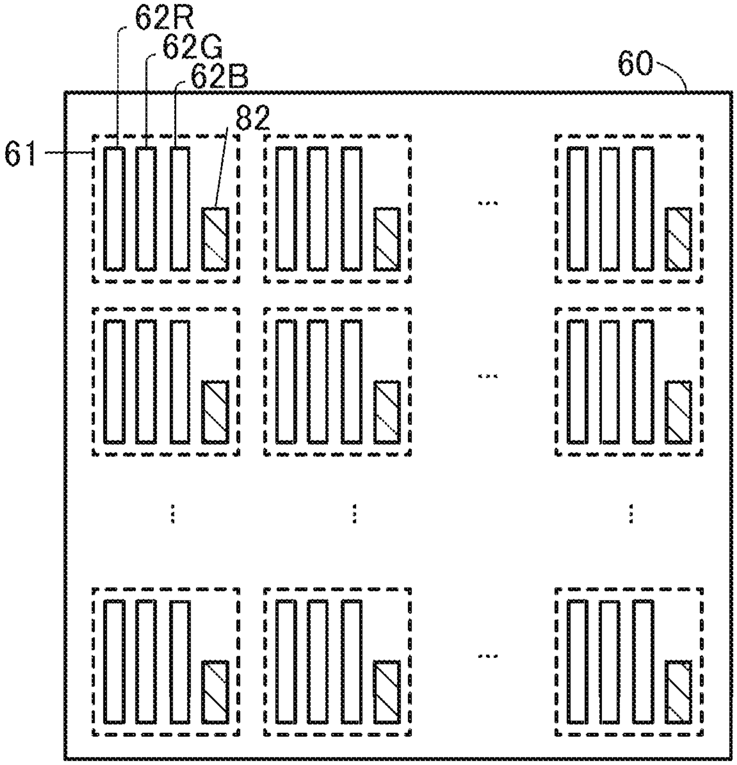
FIG. 8 is a block diagram illustrating a structure example of a display device.
Figure 9:
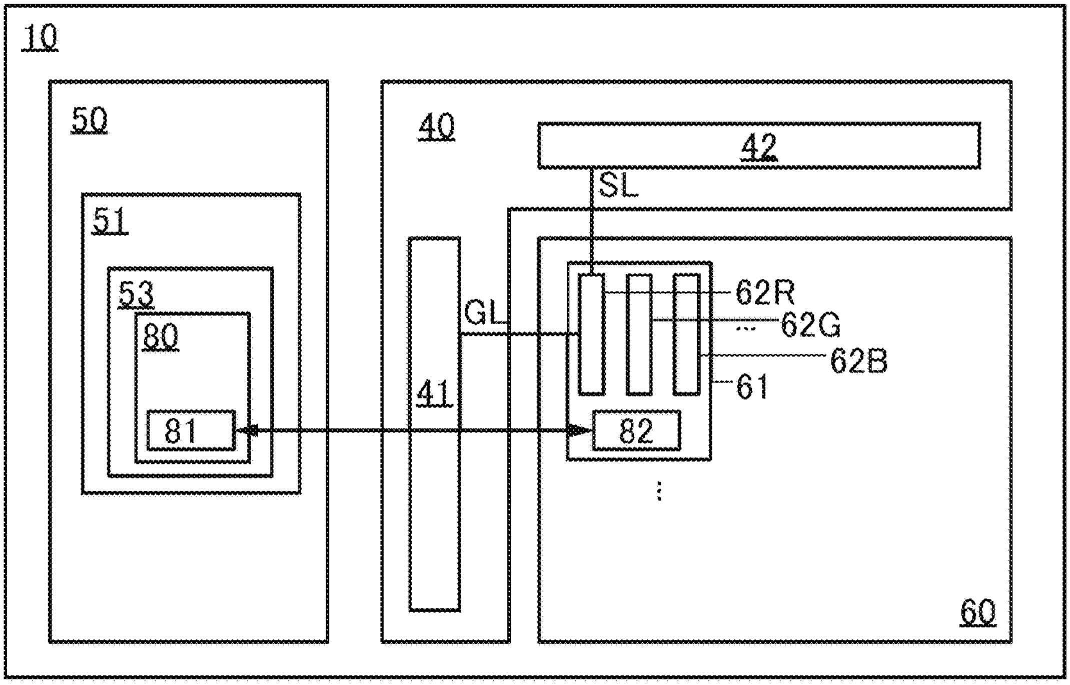
FIG. 9 is a block diagram illustrating a structure example of a display device.

FIG. 8 and FIG. 9 illustrate a structure example of the layout of the backup circuit 82 and the pixel circuits 62R, 62G, and 62B functioning as the subpixels in the display portion 60.

FIG. 8 illustrates a structure in which the plurality of pixels 61 are arranged in a matrix in the display portion 60. The pixels 61 each include the backup circuit 82 in addition to the pixel circuits 62R, 62G, and 62B. As described above, the backup circuit 82 and the pixel circuits 62R, 62G, and 62B can be formed using OS transistors and thus can be placed in the same pixel.

<Block Diagram of Display Device>

Next, FIG. 9 is a block diagram illustrating components included in the display device 10. The display device includes the driver circuit 40, the functional circuit 50, and the display portion 60.

The driver circuit 40 includes a gate driver 41 and a source driver 42, for example. The gate driver 41 has a function of driving a plurality of gate lines GL for outputting signals to the pixel circuits 62R, 62G, and 62B. The source driver 42 has a function of driving a plurality of source lines SL for outputting signals to the pixel circuits 62R, 62G, and 62B. The driver circuit 40 supplies voltage for performing display with the pixel circuits 62R, 62G, and 62B to the pixel circuits 62R, 62G, and 62B through a plurality of wirings.

The functional circuit 50 includes a CPU 51. The CPU 51 includes a CPU core 53. The CPU core 53 includes the flip-flop 80 for temporarily retaining data used for arithmetic processing. The flip-flop 80 includes a plurality of scan flip-flops 81, and each of the scan flip-flops 81 is electrically connected to the backup circuit 82 provided in the display portion 60.

The display portion 60 includes the plurality of pixels 61 each including the pixel circuits 62R, 62G, and 62B and the backup circuit 82. The backup circuit 82 is not necessarily placed in each of the pixels 61 that are repeating units, as described with reference to FIG. 8. The backup circuit 82 can be placed freely in accordance with the shape of the display portion 60, the shapes of the pixel circuits 62R, 62G, and 62B, and the like.

<Structure Example of Pixel Circuit>

Figure 10A:
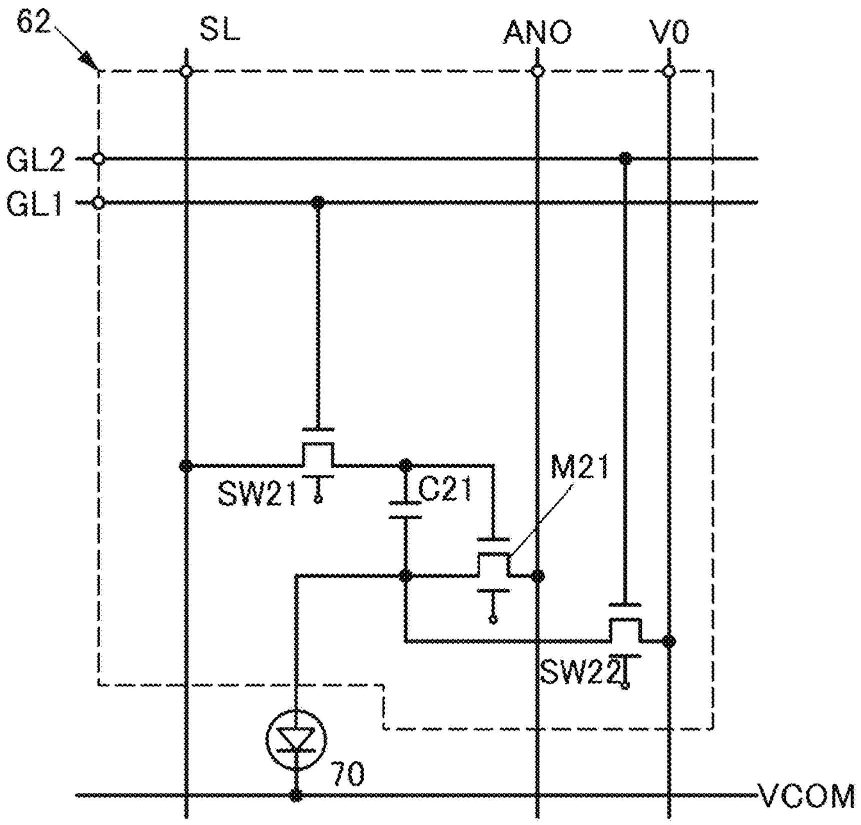
FIG. 10A and FIG. 10B are circuit diagrams illustrating a structure example of a display device.
Figure 10B:
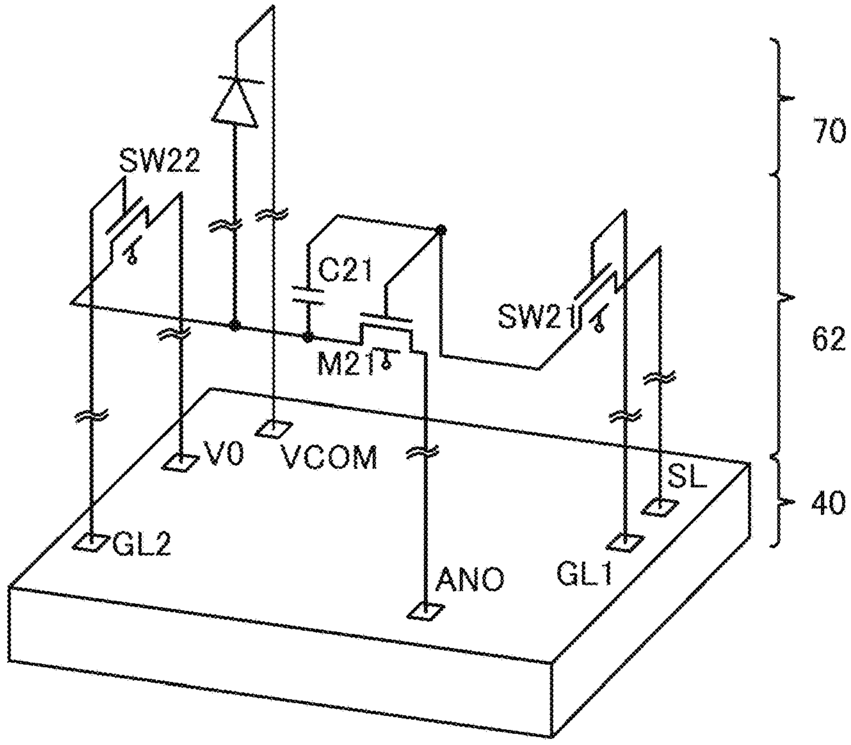

FIG. 10A and FIG. 10B illustrate a structure example of a pixel circuit 62 that can be used as the pixel circuits 62R, 62G, and 62B and a light-emitting element 70 connected to the pixel circuit 62. FIG. 10A is a diagram illustrating connection between elements, and FIG. 10B is a diagram schematically illustrating the vertical positional relationship of the driver circuit 40, the pixel circuit 62, and the light-emitting element 70.

In this specification and the like, the term "element" can be replaced with the term "device" in some cases. For example, a display element, a light-emitting element, and a liquid crystal element can be replaced with a display device, a light-emitting device, and a liquid crystal device, respectively.

The pixel circuit 62, which is illustrated as an example in FIG. 10A and FIG. 10B, includes a switch SW21, a switch SW22, a transistor M21, and a capacitor C21. The switch SW21, the switch SW22, and the transistor M21 can be formed of OS transistors. Each of the OS transistors of the switch SW21, the switch SW22, and the transistor M21 preferably includes a back gate electrode, in which case the back gate electrode can be supplied with the same signal as a gate electrode or the back gate electrode can be supplied with signals different from those of the gate electrode.

The transistor M21 includes a gate electrode electrically connected to the switch SW21, a first electrode electrically connected to the light-emitting element 70, and a second electrode electrically connected to a wiring ANO. The wiring ANO is a wiring for supplying a potential for supplying current to the light-emitting element 70.

The switch SW21 includes a first terminal electrically connected to the gate electrode of the transistor M21 and a second terminal electrically connected to the source line SL. The switch SW21 has a function of controlling a conduction state or a non-conduction state on the basis of a potential of a gate line GL1.

The switch SW22 includes a first terminal electrically connected to a wiring VO and a second terminal electrically connected to the light-emitting element 70. The switch SW22 has a function of controlling a conduction state or a non-conduction state on the basis of a potential of a gate line GL2. The wiring VO is a wiring for supplying a reference potential and a wiring for outputting current flowing through the pixel circuit 62 to the driver circuit 40 or the functional circuit 50.

The capacitor C21 includes a conductive film electrically connected to the gate electrode of the transistor M21 and a conductive film electrically connected to a second electrode of the switch SW22.

The light-emitting element 70 includes a first electrode electrically connected to the first electrode of the transistor M21 and a second electrode electrically connected to a wiring VCOM. A potential for supplying current to the light-emitting element 70 is supplied to the wiring VCOM.

Accordingly, the intensity of light emitted from the light-emitting element 70 can be controlled in accordance with an image signal supplied to the gate electrode of the transistor M21. Furthermore, the amount of current flowing to the light-emitting element 70 can be increased by the reference potential of the wiring V0 that is supplied through the switch SW22. Moreover, it is possible to estimate the amount of current flowing to the light-emitting element by monitoring the amount of current flowing through the wiring V0 with an external circuit. Thus, a defect of a pixel or the like can be detected.

Note that in the structure illustrated as an example in FIG. 10B, the wirings electrically connecting the pixel circuit 62 and the driver circuit 40 can be shortened, so that wiring resistance of the wirings can be reduced. Thus, data can be written at high speed, which enables high-speed driving of the display device 10. Accordingly, even when the number of pixels 61 included in the display device 10 is large, a sufficient frame period can be ensured, thereby increasing the pixel density of the display device 10. In addition, the increased pixel density of the display device 10 can increase the resolution of an image displayed by the display device 10. For example, the pixel density of the display device 10 can be higher than or equal to 1000 ppi, higher than or equal to 5000 ppi, or higher than or equal to 7000 ppi. Thus, the display device 10 can be, for example, a display apparatus for AR or VR and can be suitably used in an electronic device with a short distance between the display portion and the user, such as an HMD.

Although the gate line GL1, the gate line GL2, the wiring ANO, the wiring VCOM, the wiring VO, and the source line SL are supplied with signals and voltage from the driver circuit 40 below the pixel circuit 62 through the wirings in FIG. 10B, one embodiment of the present invention is not limited thereto. For example, wirings for supplying signals and voltage of the driver circuit 40 may be led to an outer region of the display portion 60 and electrically connected to the pixel circuits 62 arranged in a matrix in the layer 30. In this case, a structure in which the gate driver 41 included in the driver circuit 40 is provided in the layer 30 is effective. That is, a structure in which OS transistors are used as transistors of the gate driver 41 is effective. A structure in which part of the function of the source driver 42 included in the driver circuit 40 is provided in the layer 30 is effective. For example, a structure in which a demultiplexer distributing signals output from the source driver 42 to source lines is provided in the layer 30 is effective. A structure in which OS transistors are used as transistors of the demultiplexer is effective.

<Structure Example of Display Correction System>

The display system of one embodiment of the present invention may include a display correction system. The display correction system can reduce display defects based on defective pixels, such as bright spots and dark spots, by correcting current IEL flowing to the light-emitting element 70.

Figure 11A:
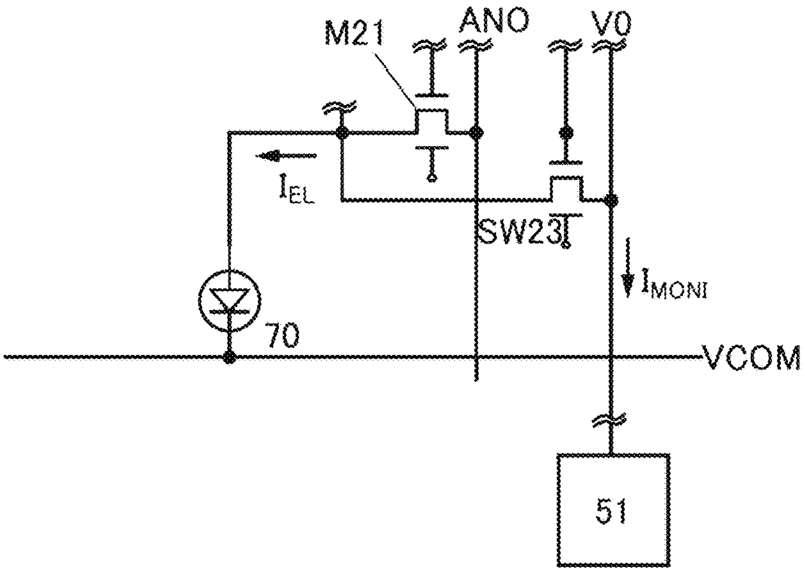
FIG. 11A to FIG. 11C are a circuit diagram and schematic diagrams illustrating a structure example of a display device.

A circuit diagram in FIG. 11A illustrates an extracted part of the pixel circuit 62 illustrated in FIG. 10A. In the case of a defective pixel causing a bright spot or a dark spot, the current IEL flowing to the light-emitting element 70 becomes extremely high or extremely low compared to the case of a normal display pixel.

Figure 11B:
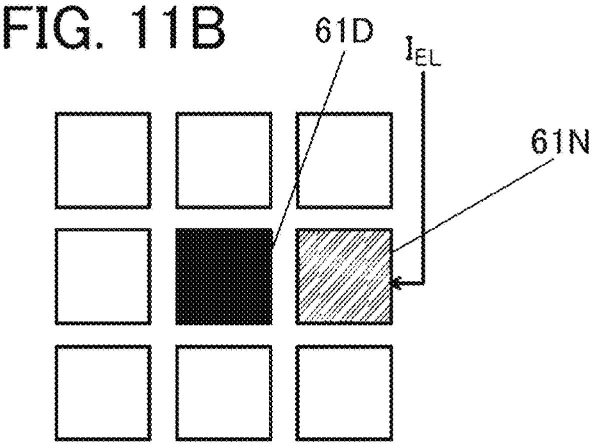

The CPU 51 periodically obtains data of monitor current IMONI that flows through a switch SW23. The amount of monitor current IMONI is converted into digital data that can be processed in the CPU 51 and arithmetic processing is performed with the digital data in the CPU 51. A defective pixel is estimated by the arithmetic processing in the CPU 51, and correction is performed in the CPU 51 so that a display defect due to the defective pixel is less likely to be seen. For example, in the case where a pixel 61D illustrated in FIG. 11B is a defective pixel, the current IEL that flows to the light-emitting element 70 of an adjacent pixel 61N is corrected.

The correction can estimated by executing an arithmetic operation based on an artificial neural network such as a deep neural network (DNN), a convolutional neural network (CNN), a recurrent neural network (RNN), an autoencoder, a deep Boltzmann machine (DBM), or a deep belief network (DBN).

Figure 11C:
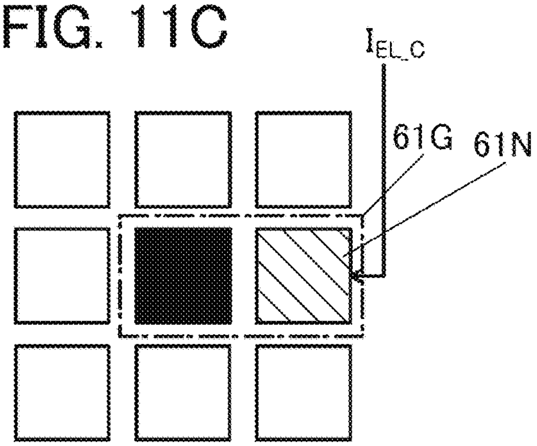

With the above correction, the current $I_{EL}$ flowing to the pixel 61N adjacent to the defective pixel is corrected to be current $I_{EL\_C}$ (see FIG. 11C). As illustrated in FIG. 11C, when a composited pixel 61G of the defective pixel and the pixel 61N performs display, a display defect due to the defective pixel, such as a bright spot and a dark spot, can be less likely to be seen, leading to normal display.

Note that during an arithmetic operation by the display correction system, which is performed for correcting current flowing to a pixel, data that is in the middle of the arithmetic operation can be retained as backup data. Therefore, the display correction system is particularly effective in arithmetic processing performed with an enormous amount of calculation, such as an arithmetic operation based on an artificial neural network. Note that it is also possible to reduce power consumption in addition to display defects by making the CPU 51 function as an application processor and combining an arithmetic operation with, for example, driving that makes a frame frequency changeable.

<Modification Example of Display Device>

Figure 12:
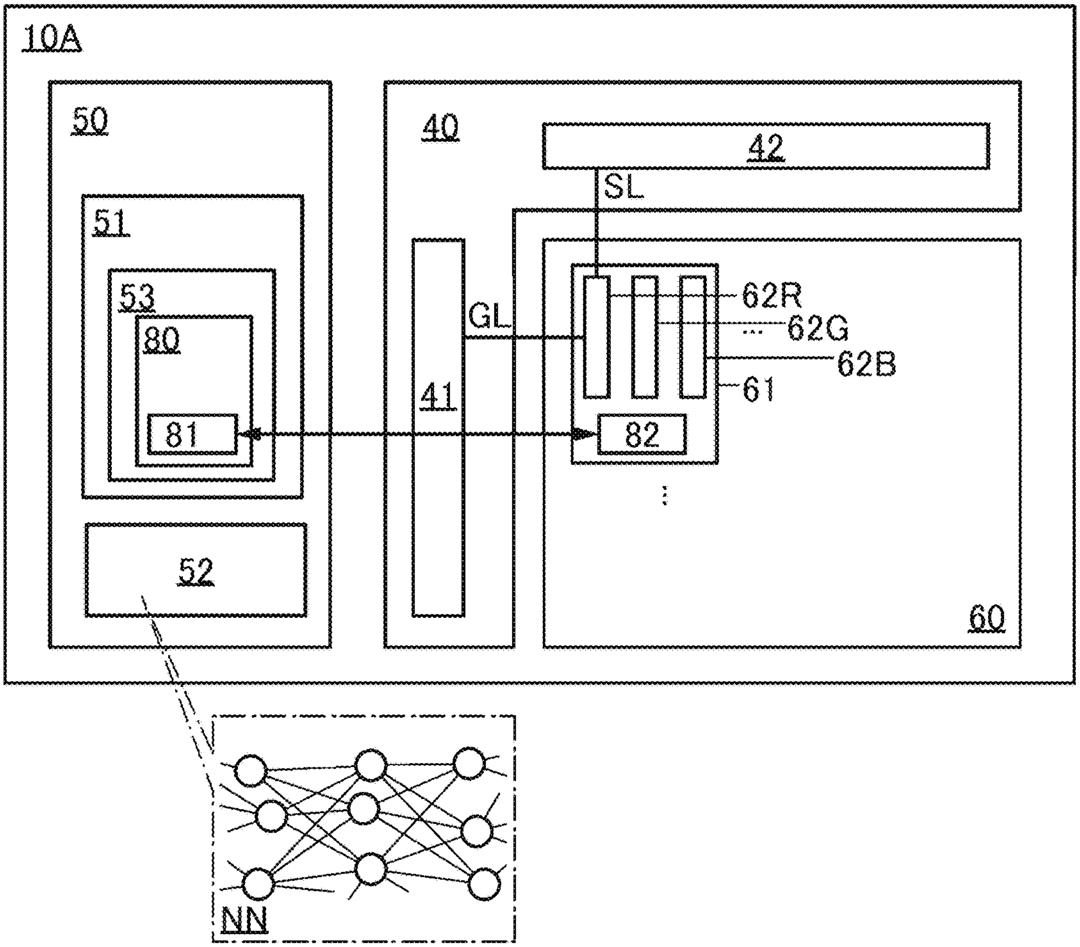
FIG. 12 is a block diagram illustrating a structure example of a display device.

FIG. 12 illustrates a modification example of the components included in the display device 10 described above.

A block diagram of a display device 10A illustrated in FIG. 12 corresponds to a structure in which an accelerator 52 is added to the functional circuit 50 in the display device 10 in FIG. 9.

In the case where an arithmetic operation based on an artificial neural network is performed in the above-described display correction system, a product-sum operation is repeatedly performed. The accelerator 52 functions as a dedicated arithmetic circuit to product-sum operation processing of an artificial neural network NN. In the arithmetic operation with the accelerator 52, the above-mentioned processing for correcting display defects or processing for correcting the outline of an image by up-conversion of display data or the like can be performed, for example. During the arithmetic processing with the accelerator 52, it is possible to reduce the power consumption by power gating control on the CPU 51.

This embodiment can be combined with the description of the other embodiments as appropriate.

Embodiment 3

In this embodiment, a light-emitting element (a light-emitting device) that can be used in the display device of one embodiment of the present invention will be described.

In this specification and the like, a device fabricated using a metal mask or an FMM (fine metal mask) may be referred to as a device having an MM (metal mask) structure. In this specification and the like, a device fabricated without using a metal mask or an FMM may be referred to as a device having an MML (metal maskless) structure.

In this specification and the like, a structure in which light-emitting layers in light-emitting devices of different colors (here, blue (B), green (G), and red (R)) are separately formed or separately patterned may be referred to as an SBS (Side By Side) structure. In this specification and the like, a light-emitting device capable of emitting white light may be referred to as a white-light-emitting device. Note that a combination of white-light-emitting devices with coloring layers (e.g., color filters) enables a full-color display device.

Structures of light-emitting devices can be classified roughly into a single structure and a tandem structure. A device with a single structure includes one light-emitting unit between a pair of electrodes, and the light-emitting unit preferably includes one or more light-emitting layers. To obtain white light emission, two or more light-emitting layers are selected such that emission colors of the light-emitting layers are complementary colors. For example, when emission colors of a first light-emitting layer and a second light-emitting layer are complementary colors, the light-emitting device can be configured to emit white light as a whole. The same applies to a light-emitting device including three or more light-emitting layers.

A device with a tandem structure includes two or more light-emitting units between a pair of electrodes, and each light-emitting unit preferably includes one or more light-emitting layers. To obtain white light emission, the structure is made such that light from light-emitting layers of the plurality of light-emitting units can be combined to be white light. Note that a structure for obtaining white light emission is similar to a structure in the case of a single structure. In the device with a tandem structure, it is suitable that an intermediate layer such as a charge-generation layer be provided between the plurality of light-emitting units.

When the white-light-emitting device (with a single structure or a tandem structure) and a light-emitting device with an SBS structure are compared to each other, the light-emitting device with an SBS structure can have lower power consumption than the white-light-emitting device. To reduce power consumption, a light-emitting device with an SBS structure is suitably used. Meanwhile, the white-light-emitting device is suitable in terms of lower manufacturing cost or higher manufacturing yield because the manufacturing process of the white-light-emitting device is simpler than that of a light-emitting device with an SBS structure.

<Structure Example of Light-Emitting Element 70>

Figure 13A:
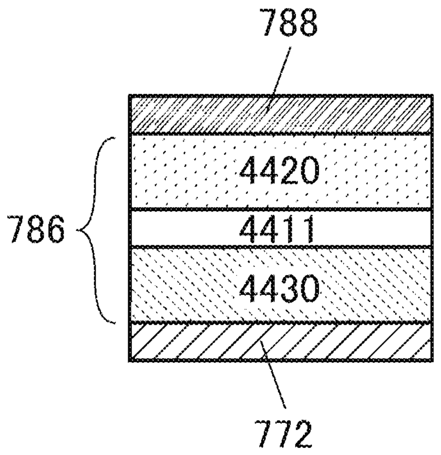
FIG. 13A to FIG. 13C are diagrams illustrating structure examples of a light-emitting device.

An EL layer 786 included in the light-emitting element 70 can be formed of a plurality of layers such as a layer 4420, a light-emitting layer 4411, and a layer 4430, as illustrated in FIG. 13A. The layer 4420 can include, for example, a layer containing a substance with a high electron-injection property (an electron-injection layer) and a layer containing a substance with a high electron-transport property (an electron-transport layer). The light-emitting layer 4411 contains a light-emitting compound, for example. The layer 4430 can include, for example, a layer containing a substance with a high hole-injection property (a hole-injection layer) and a layer containing a substance with a high hole-transport property (a hole-transport layer).

The structure including the layer 4420, the light-emitting layer 4411, and the layer 4430, which is provided between a pair of electrodes, can serve as a single light-emitting unit, and the structure in FIG. 13A is referred to as a single structure in this specification.

Figure 13B:
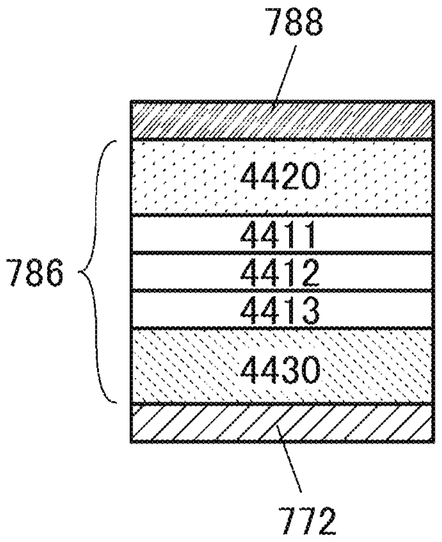

Note that a structure in which a plurality of light-emitting layers (light-emitting layers 4411, 4412, and 4413) are provided between the layer 4420 and the layer 4430 as illustrated in FIG. 13B is a variation of the single structure.

Figure 13C:
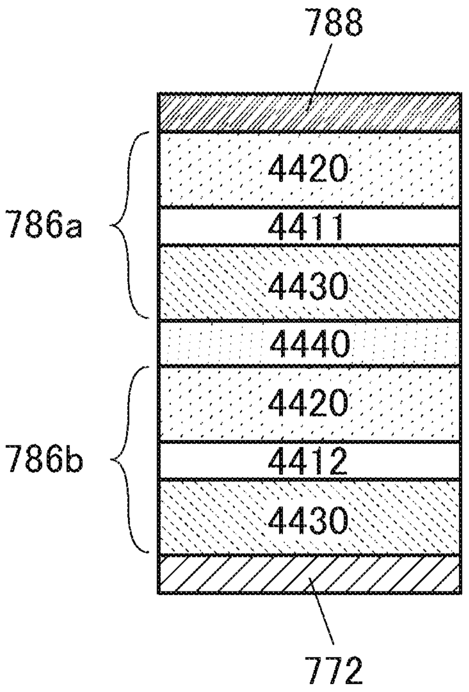

A structure in which a plurality of light-emitting units (EL layers 786*a* and 786*b*) are connected in series with an intermediate layer (a charge-generation layer) 4440 therebetween as illustrated in FIG. 13C is referred to as a tandem structure in this specification. In this specification and the like, the structure illustrated in FIG. 13C is referred to as a tandem structure; however, without being limited to this, a tandem structure may be referred to as a stack structure, for example. The tandem structure enables a light-emitting element to emit light at high luminance.

The emission color of the light-emitting element 70 can be red, green, blue, cyan, magenta, yellow, white, or the like depending on the material that constitutes the EL layer 786. Furthermore, the color purity can be further increased when the light-emitting element 70 has a microcavity structure.

The light-emitting element that emits white light preferably contains two or more kinds of light-emitting substances in the light-emitting layer. To obtain white light emission, two or more kinds of light-emitting substances are selected such that their emission colors are complementary colors. For example, when the emission color of a first light-emitting layer and the emission color of a second light-emitting layer have a relationship of complementary colors, it is possible to obtain the light-emitting element that emits white light as a whole. The same applies to a light-emitting element including three or more light-emitting layers.

The light-emitting layer preferably contains two or more selected from light-emitting substances that emit light of R (red), G (green), B (blue), Y (yellow), O (orange), and the like. Alternatively, the light-emitting layer preferably contains two or more light-emitting substances that emit light containing two or more of spectral components of R, G, and B.

<Formation Method of Light-Emitting Element 70>

A method for forming the light-emitting element 70 provided over the pixel circuit 62 will be described below.

Figure 14A:
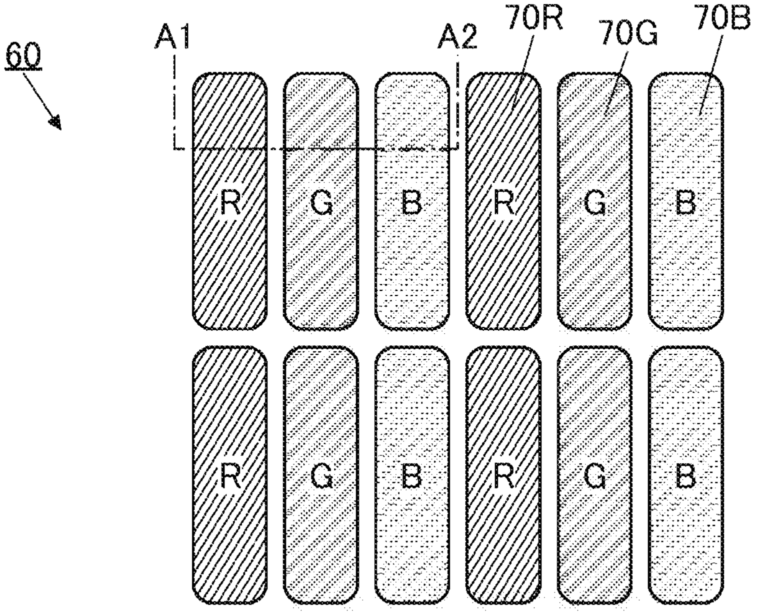
FIG. 14A to FIG. 14C are diagrams illustrating a structure example of a display device.

FIG. 14A illustrates a schematic top view of the display device of one embodiment of the present invention. The display portion 60 includes a plurality of light-emitting elements 70R exhibiting red, a plurality of light-emitting elements 70G exhibiting green, and a plurality of light-emitting elements 70B exhibiting blue. In FIG. 14A, light-emitting regions of the light-emitting elements are denoted by R, G, and B to easily differentiate the light-emitting elements. Note that the structure of the light-emitting element 70 illustrated in FIG. 14A may be referred to as an SBS (Side By Side) structure. Although the structure illustrated in FIG. 14A has three colors of red (R), green (G), and blue (B), one embodiment of the present invention is not limited thereto. For example, the structure may have four or more colors.

The light-emitting elements 70R, the light-emitting elements 70G, and the light-emitting elements 70B are arranged in a matrix. FIG. 14A illustrates what is called a stripe arrangement, in which the light-emitting elements of the same color are arranged in one direction. Note that the arrangement method of the light-emitting elements is not limited thereto; another arrangement method such as a delta arrangement, a zigzag arrangement, or a PenTile arrangement may also be used.

As the light-emitting element 70R, the light-emitting element 70G, and the light-emitting element 70B, an organic EL device such as an OLED (Organic Light Emitting Diode) or a QLED (Quantum-dot Light Emitting Diode) is preferably used. As a light-emitting substance contained in the EL element, a substance that emits fluorescent light (a fluorescent material), a substance that emits phosphorescent light (a phosphorescent material), a substance that exhibits thermally activated delayed fluorescence (a thermally activated delayed fluorescent (TADF) material), an inorganic compound (e.g., a quantum dot material), and the like can be given.

Figure 14B:
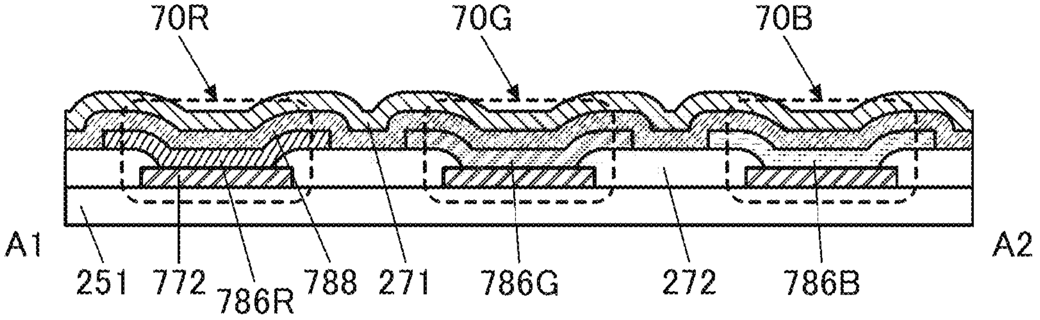

FIG. 14B is a cross-sectional schematic view taken along the dashed-dotted line A1-A2 in FIG. 14A.

FIG. 14B illustrates a cross section of the light-emitting element 70R, the light-emitting element 70G, and the light-emitting element 70B. Each of the light-emitting element 70R, the light-emitting element 70G, and the light-emitting element 70B is provided over a substrate 251 and includes a conductor 772 functioning as a pixel electrode and a conductor 788 functioning as a common electrode.

The light-emitting element 70R includes an EL layer 786R between the conductor 772 and the conductor 788. The EL layer 786R contains at least a light-emitting organic compound that emits light with a peak in a red wavelength range. An EL layer 786G included in the light-emitting element 70G contains at least a light-emitting organic compound that emits light with a peak in a green wavelength range. An EL layer 786B included in the light-emitting element 70B contains at least a light-emitting organic compound that emits light with a peak in a blue wavelength range The EL layer 786R, the EL layer 786G, and the EL layer 786B may each include one or more of an electron-injection layer, an electron-transport layer, a hole-injection layer, and a hole-transport layer in addition to the layer containing a light-emitting organic compound (the light-emitting layer).

The conductor 772 is provided for each of the light-emitting elements. The conductor 788 is provided as a continuous layer shared by the light-emitting elements. A conductive film that transmits visible light is used for one of the conductor 772 and the conductor 788, and a reflective conductive film is used for the other. The use of the light-transmitting conductor 772 and the reflective conductor 788 offers a bottom-emission display device, whereas the use of the reflective conductor 772 and the light-transmitting conductor 788 offers a top-emission display device. Note that when both the conductor 772 and the conductor 788 have a light-transmitting property, a dual-emission display device can be obtained.

An insulating layer 272 is provided to cover end portions of the conductor 772. End portions of the insulating layer 272 are preferably tapered.

The EL layer 786R, the EL layer 786G, and the EL layer 786B each include a region in contact with a top surface of the conductor 772 and a region in contact with a surface of the insulating layer 272. End portions of the EL layer 786R, the EL layer 786G, and the EL layer 786B are positioned over the insulating layer 272.

As illustrated in FIG. 14B, there is a gap between the two EL layers of the light-emitting elements that emit different colors. In this manner, the EL layer 786R, the EL layer 786G, and the EL layer 786G are preferably provided so as not to be in contact with each other. This can suitably prevent unintentional light emission (also referred to as crosstalk) from being caused by current flowing through two adjacent EL layers. As a result, the contrast can be increased to achieve a display device with high display quality.

The EL layer 786R, the EL layer 786G, and the EL layer 786G can be formed separately by a vacuum evaporation method or the like using a shadow mask such as a metal mask. Alternatively, these layers may be formed separately by a photolithography method. The use of the photolithography method achieves a display device with high resolution, which is difficult to obtain in the case of using a metal mask.

A protective layer 271 is provided over the conductor 788 so as to cover the light-emitting element 70R, the light-emitting element 70G, and the light-emitting element 70B. The protective layer 271 has a function of preventing diffusion of impurities such as water into the light-emitting elements from the above.

The protective layer 271 can have, for example, a single-layer structure or a stacked-layer structure at least including an inorganic insulating film. Examples of the inorganic insulating film include an oxide film and a nitride film such as a silicon oxide film, a silicon oxynitride film, a silicon nitride oxide film, a silicon nitride film, an aluminum oxide film, an aluminum oxynitride film, and a hafnium oxide film. Alternatively, a semiconductor material such as an indium gallium oxide or an indium gallium zinc oxide may be used for the protective layer 271. Note that the protective layer 271 may be formed by an ALD method, a CVD method, or a sputtering method. Although the protective layer 271 includes an inorganic insulating film in this example, one embodiment of the present invention is not limited thereto. For example, the protective layer 271 may have a stacked-layer structure of an inorganic insulating film and an organic insulating film.

Figure 14C:
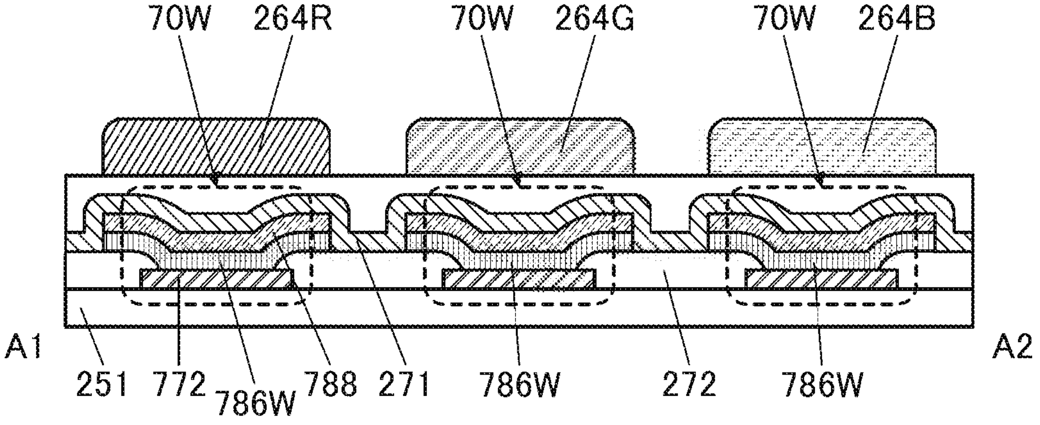

FIG. 14C illustrates an example different from the above example.

In FIG. 14C, a light-emitting element 70W emitting white light is provided. The light-emitting element 70W includes an EL layer 786W emitting white light between the conductor 772 and the conductor 788.

The EL layer 786W can have, for example, a structure in which two or more light-emitting layers that are selected so as to emit light of complementary colors are stacked. It is also possible to use a stacked EL layer in which a charge-generation layer is provided between light-emitting layers.

FIG. 14C illustrates three light-emitting elements 70W side by side. A coloring layer 264R is provided above the left light-emitting element 70W. The coloring layer 264R functions as a band path filter transmitting red light. Similarly, a coloring layer 264G transmitting green light is provided above the middle light-emitting element 70W, and a coloring layer 264B transmitting blue light is provided above the right light-emitting element 70W. Thus, the display device can display color images.

Here, the EL layer 786W and the conductor 788 are each separated between two adjacent light-emitting elements 70W. This can suitably prevent unintentional light emission from being caused by current flowing through the EL layers 786W of the two adjacent light-emitting elements 70W. In particular, when the EL layer 786W is a stacked EL element in which a charge-generation layer is provided between two light-emitting layers, the effect of crosstalk is more significant as the resolution increases, i.e., as the distance between adjacent pixels decreases, leading to lower contrast. Thus, the above structure can achieve a display device having both high resolution and high contrast.

A photolithography method is preferably used for the separation of the EL layer 786W and the separation of the conductor 788. This can reduce the distance between light-emitting elements, achieving a display device with a higher aperture ratio than that formed using, for example, a shadow mask such as a metal mask.

Note that in the case of a bottom-emission light-emitting element, a coloring layer is provided between the conductor 772 and the substrate 251.

The above is the description of the light-emitting element.

At least part of this embodiment can be implemented in combination with the other embodiments described in this specification as appropriate.

Embodiment 4

In this embodiment, an example of a cross-sectional structure of the display device 10 of one embodiment of the present invention will be described.

Figure 15:
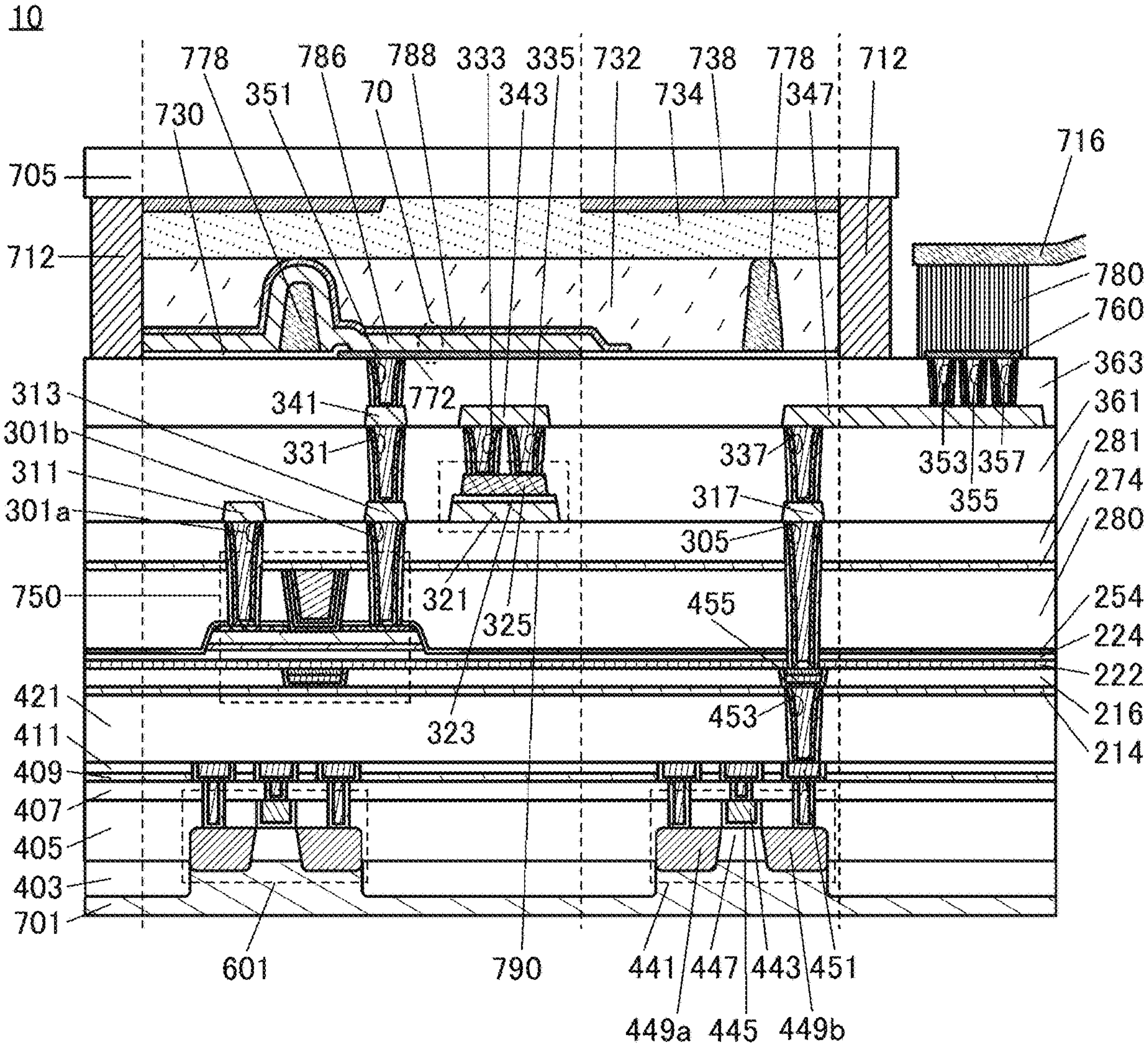
FIG. 15 is a cross-sectional view illustrating a structure example of a display device.

FIG. 15 is a cross-sectional view illustrating a structure example of the display device 10. The display device 10 includes a substrate 701 and a substrate 705, and the substrate 701 and the substrate 705 are attached to each other with a sealant 712.

As the substrate 701, a single crystal semiconductor substrate such as a single crystal silicon substrate can be used. Note that a semiconductor substrate other than a single crystal semiconductor substrate may be used as the substrate 701.

A transistor 441 and a transistor 601 are provided over the substrate 701. The transistor 441 and the transistor 601 can be the transistors provided in the layer 20 described in Embodiment 2.

The transistor 441 is formed of a conductor 443 having a function of a gate electrode, an insulator 445 having a function of a gate insulator, and part of the substrate 701 and includes a semiconductor region 447 including a channel formation region, a low-resistance region 449*a* having a function of one of a source region and a drain region, and a low-resistance region 449*b* having a function of the other of the source region and the drain region. The transistor 441 can be either a p-channel transistor or an n-channel transistor.

The transistor 441 is electrically isolated from other transistors by an element isolation layer 403. FIG. 15 illustrates the case where the transistor 441 and the transistor 601 are electrically isolated from each other by the element isolation layer 403. The element isolation layer 403 can be formed by a LOCOS (LOCal Oxidation of Silicon) method, an STI (Shallow Trench Isolation) method, or the like.

Here, in the transistor 441 illustrated in FIG. 15, the semiconductor region 447 has a projecting shape. Moreover, the conductor 443 is provided to cover the side surface and the top surface of the semiconductor region 447 with the insulator 445 therebetween. Note that FIG. 15 does not illustrate the state where the conductor 443 covers the side surface of the semiconductor region 447. A material adjusting the work function can be used for the conductor 443.

A transistor having a projecting semiconductor region, like the transistor 441, can be referred to as a fin-type transistor because a projecting portion of a semiconductor substrate is used. An insulator having a function of a mask for forming a projecting portion may be provided in contact with an upper portion of the projecting portion. Although FIG. 15 illustrates the structure in which the projecting portion is formed by processing part of the substrate 701, a semiconductor having a projecting shape may be formed by processing an SOI substrate.

Note that the structure of the transistor 441 illustrated in FIG. 15 is an example; the structure of the transistor 441 is not limited thereto and can be changed as appropriate in accordance with the circuit structure, an operation method for the circuit, or the like. For example, the transistor 441 may be a planar transistor.

The transistor 601 can have a structure similar to that of the transistor 441.

An insulator 405, an insulator 407, an insulator 409, and an insulator 411 are provided over the substrate 701, in addition to the element isolation layer 403, the transistor 441, and the transistor 601. A conductor 451 is embedded in the insulator 405, the insulator 407, the insulator 409, and the insulator 411. Here, the top surface of the conductor 451 and the top surface of the insulator 411 can be substantially level with each other.

An insulator 421 and an insulator 214 are provided over the conductor 451 and the insulator 411. A conductor 453 is embedded in the insulator 421 and the insulator 214. Here, the top surface of the conductor 453 and the top surface of the insulator 214 can be substantially level with each other.

An insulator 216 is provided over the conductor 453 and the insulator 214. A conductor 455 is embedded in the insulator 216. Here, the top surface of the conductor 455 and the top surface of the insulator 216 can be substantially level with each other.

An insulator 222, an insulator 224, an insulator 254, an insulator 280, an insulator 274, and an insulator 281 are provided over the conductor 455 and the insulator 216. A conductor 305 is embedded in the insulator 222, the insulator 224, the insulator 254, the insulator 280, the insulator 274, and the insulator 281. Here, the top surface of the conductor 305 and the top surface of the insulator 281 can be substantially level with each other.

An insulator 361 is provided over the conductor 305 and the insulator 281. A conductor 317 and a conductor 337 are embedded in the insulator 361. Here, the top surface of the conductor 337 and the top surface of the insulator 361 can be substantially level with each other.

An insulator 363 is provided over the conductor 337 and the insulator 361. A conductor 347, a conductor 353, a conductor 355, and a conductor 357 are embedded in the insulator 363. Here, the top surfaces of the conductor 353, the conductor 355, and the conductor 357 and the top surface of the insulator 363 can be substantially level with each other.

A connection electrode 760 is provided over the conductor 353, the conductor 355, the conductor 357, and the insulator 363. An anisotropic conductor 780 is provided to be electrically connected to the connection electrode 760, and an FPC (Flexible Printed Circuit) 716 is provided to be electrically connected to the anisotropic conductor 780. A variety of signals and the like are supplied to the display device 10 from the outside of the display device 10 through the FPC 716.

As illustrated in FIG. 15, the low-resistance region 449*b* having a function of the other of the source region and the drain region of the transistor 441 is electrically connected to the FPC 716 through the conductor 451, the conductor 453, the conductor 455, the conductor 305, the conductor 317, the conductor 337, the conductor 347, the conductor 353, the conductor 355, the conductor 357, the connection electrode 760, and the anisotropic conductor 780. Although FIG. 15 illustrates three conductors of the conductor 353, the conductor 355, and the conductor 357 as conductors having a function of electrically connecting the connection electrode 760 and the conductor 347, one embodiment of the present invention is not limited thereto. The number of conductors having a function of electrically connecting the connection electrode 760 and the conductor 347 may be one, two, or four or more. Providing a plurality of conductors having a function of electrically connecting the connection electrode 760 and the conductor 347 can reduce the contact resistance.

A transistor 750 is provided over the insulator 214. The transistor 750 can be the transistor provided in the layer 30 described in Embodiment 2. For example, the transistor 750 can be the transistor provided in the pixel circuit 62. An OS transistor can be suitably used as the transistor 750. The OS transistor has a feature of an extremely low off-state current. Thus, the retention time for image data or the like can be increased, so that the frequency of the refresh operation can be reduced. Accordingly, the power consumption of the display device 10 can be reduced.

The transistor 750 can be the transistor provided in the backup circuit 82. An OS transistor can be suitably used as the transistor 750. The OS transistor has a feature of an extremely low off-state current. Thus, data in the flip-flop can be retained even in a period during which the sharing of power supply voltage is stopped. Hence, a normally-off operation (the intermittent stop operation of the supply of the power supply voltage) of the CPU can be performed. Accordingly, the power consumption of the display device 10 can be reduced.

A conductor 301*a* and a conductor 301*b* are embedded in the insulator 254, the insulator 280, the insulator 274, and the insulator 281. The conductor 301*a* is electrically connected to one of a source and a drain of the transistor 750, and the conductor 301*b* is electrically connected to the other of the source and the drain of the transistor 750. Here, the top surfaces of the conductor 301*a* and the conductor 301*b* and the top surface of the insulator 281 can be substantially level with each other.

A conductor 311, a conductor 313, a conductor 331, a capacitor 790, a conductor 333, and a conductor 335 are embedded in the insulator 361. The conductor 311 and the conductor 313 are electrically connected to the transistor 750 and have a function of a wiring. The conductor 333 and the conductor 335 are electrically connected to the capacitor 790. Here, the top surfaces of the conductor 331, the conductor 333, and the conductor 335 and the top surface of the insulator 361 can be substantially level with each other.

A conductor 341, a conductor 343, and a conductor 351 are embedded in the insulator 363. Here, the top surface of the conductor 351 and the top surface of the insulator 363 can be substantially level with each other.

The insulator 405, the insulator 407, the insulator 409, the insulator 411, the insulator 421, the insulator 214, the insulator 280, the insulator 274, the insulator 281, the insulator 361, and the insulator 363 have a function of an interlayer film and may also have a function of a planarization film that covers unevenness thereunder. For example, the top surface of the insulator 363 may be planarized by planarization treatment using a chemical mechanical polishing (CMP) method or the like to have the increased planarity.

As illustrated in FIG. 15, the capacitor 790 includes a lower electrode 321 and an upper electrode 325. An insulator 323 is provided between the lower electrode 321 and the upper electrode 325. In other words, the capacitor 790 has a stacked-layer structure in which the insulator 323 functioning as a dielectric is provided between the pair of electrodes. Although FIG. 15 illustrates the example in which the capacitor 790 is provided over the insulator 281, the capacitor 790 may be provided over an insulator different from the insulator 281.

In the example illustrated in FIG. 15, the conductor 301*a*, the conductor 301*b*, and the conductor 305 are formed in the same layer. In the illustrated example, the conductor 311, the conductor 313, the conductor 317, and the lower electrode 321 are formed in the same layer. In the illustrated example, the conductor 331, the conductor 333, the conductor 335, and the conductor 337 are formed in the same layer. In the illustrated example, the conductor 341, the conductor 343, and the conductor 347 are formed in the same layer. In the illustrated example, the conductor 351, the conductor 353, the conductor 355, and the conductor 357 are formed in the same layer. Forming a plurality of conductors in the same layer simplifies the fabrication process of the display device 10 and thus the manufacturing cost of the display device 10 can be reduced. Note that these conductors may be formed in different layers or may contain different types of materials.

The display device 10 illustrated in FIG. 15 includes the light-emitting element 70. The light-emitting element 70 includes the conductor 772, the EL layer 786, and the conductor 788. The EL layer 786 contains an organic compound or an inorganic compound such as quantum dots.

Examples of materials that can be used as an organic compound include a fluorescent material and a phosphorescent material. Examples of materials that can be used as quantum dots include a colloidal quantum dot material, an alloyed quantum dot material, a core-shell quantum dot material, and a core quantum dot material.

The conductor 772 is electrically connected to the other of the source and the drain of the transistor 750 through the conductor 351, the conductor 341, the conductor 331, the conductor 313, and the conductor 301*b*. The conductor 772 is formed over the insulator 363 and has a function of a pixel electrode.

A material that transmits visible light or a material that reflects visible light can be used for the conductor 772. As a light-transmitting material, for example, an oxide material containing indium, zinc, tin, or the like is preferably used. As a reflective material, for example, a material containing aluminum, silver, or the like is preferably used.

Although not illustrated in FIG. 15, an optical member (an optical substrate) such as a polarizing member, a retardation member, or an anti-reflection member can be provided in the display device 10, for example.

On the substrate 705 side, a light-blocking layer 738 and an insulator 734 that is in contact with the light-blocking layer 738 are provided. The light-blocking layer 738 has a function of blocking light emitted from adjacent regions. Alternatively, the light-blocking layer 738 has a function of preventing external light from reaching the transistor 750 or the like.

In the display device 10 illustrated in FIG. 15, an insulator 730 is provided over the insulator 363. Here, the insulator 730 can cover part of the conductor 772. The light-emitting element 70 is a top-emission light-emitting element, which includes the conductor 788 having a light-transmitting property. Note that the light-emitting element 70 may have a bottom-emission structure in which light is emitted to the conductor 772 side or a dual-emission structure in which light is emitted towards both the conductor 772 and the conductor 788.

The light-blocking layer 738 is provided to have a region overlapping with the insulator 730. The light-blocking layer 738 is covered with the insulator 734. A space between the light-emitting element 70 and the insulator 734 is filled with a sealing layer 732.

A structure body 778 is provided between the insulator 730 and the EL layer 786. Moreover, the structure body 778 is provided between the insulator 730 and the insulator 734.

Figure 16:
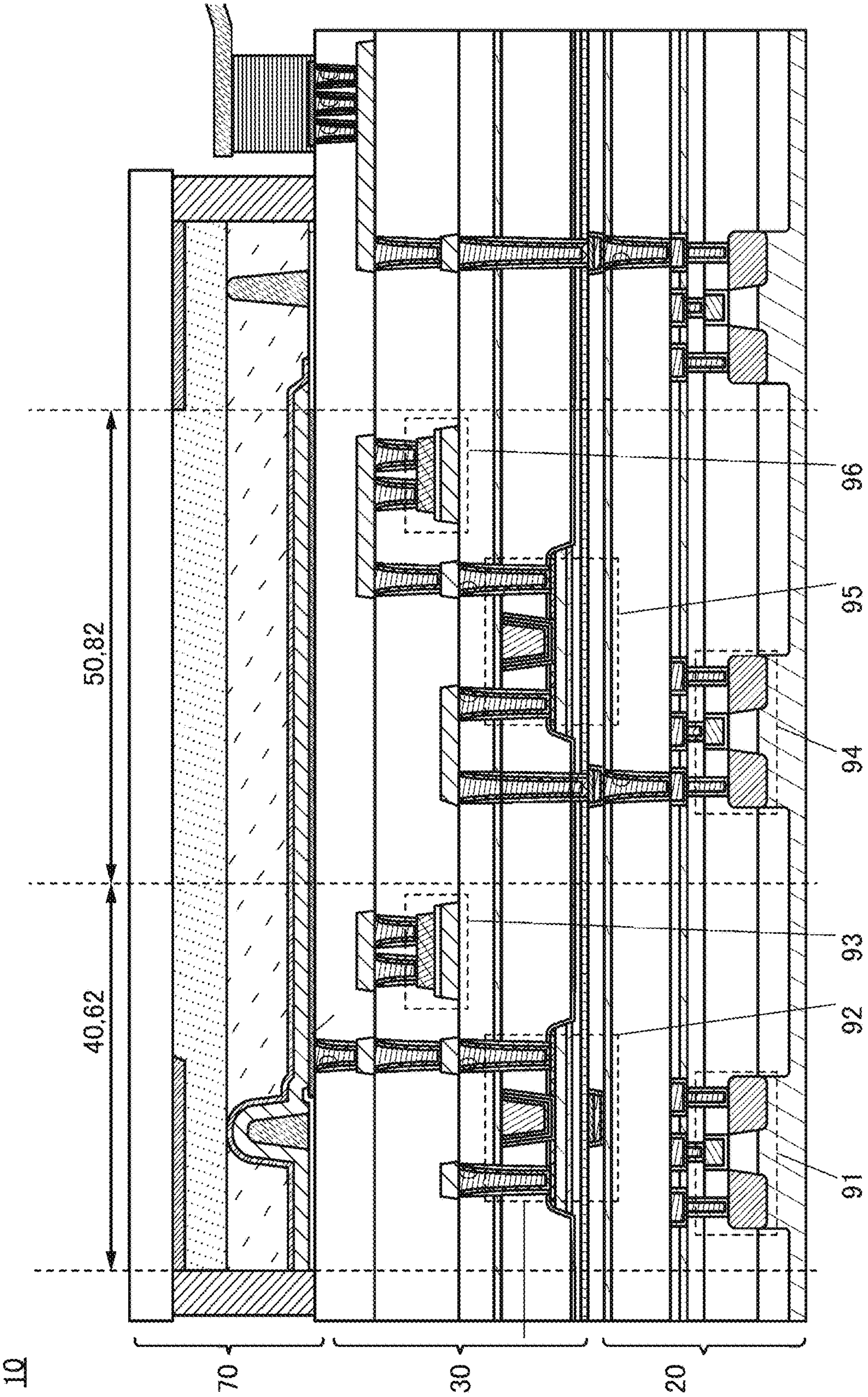
FIG. 16 is a cross-sectional view illustrating a structure example of a display device.

FIG. 16 is a cross-sectional view illustrating a Si transistor in the driver circuit 40 included in the layer 20, an OS transistor included in the pixel circuit 62 included in the layer 30, a Si transistor in the functional circuit 50 included in the layer 20, and an OS transistor included in the backup circuit 82 included in the layer 30. The description of the cross-sectional view illustrated in FIG. 16 is similar to that of the components in the cross-sectional view illustrated in FIG. 15.

As illustrated in FIG. 16, a Si transistor 91 in the driver circuit 40 and a Si transistor 94 in the functional circuit 50 can be provided in the layer 20. As illustrated in FIG. 16, an OS transistor 92 and a capacitor 93 in the pixel circuit 62 and an OS transistor 95 and a capacitor 96 in the backup circuit 82 can be provided in the layer 30. The light-emitting element 70 can be provided in a layer above the layer 30.

Figure 17:
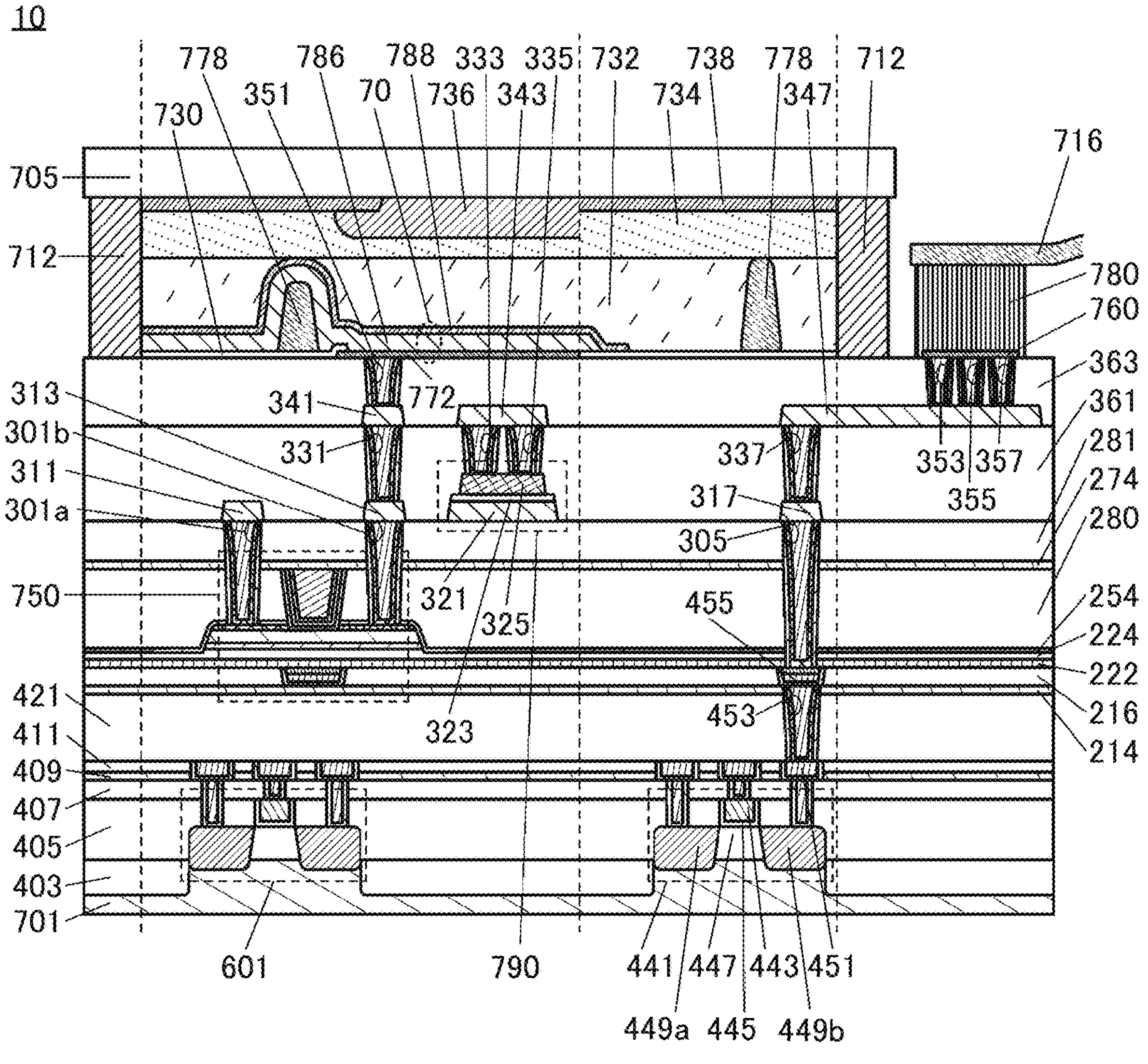
FIG. 17 is a cross-sectional view illustrating a structure example of a display device.

FIG. 17 illustrates a modification example of the display device 10 illustrated in FIG. 15. The display device 10 illustrated in FIG. 17 is different from the display device 10 illustrated in FIG. 15 in that a coloring layer 736 is provided. Note that the coloring layer 736 is provided to have a region overlapping with the light-emitting element 70. Providing the coloring layer 736 can improve the color purity of light extracted from the light-emitting element 70. Thus, the display device 10 can display high-quality images. Furthermore, all the light-emitting elements 70, for example, in the display device 10 can be light-emitting elements that emit white light; hence, the EL layers 786 are not necessarily formed separately for each color, leading to higher resolution of the display device 10.

The light-emitting element 70 can have a micro optical resonator (microcavity) structure. Thus, light of predetermined colors (e.g., RGB) can be extracted without a coloring layer, and the display device 10 can perform color display. The structure without a coloring layer can prevent light absorption by the coloring layer. As a result, the display device 10 can display high-luminance images, and the power consumption of the display device 10 can be reduced. The structure without a coloring layer can be employed even when the EL layer 786 is formed into an island shape for each pixel or into a stripe shape for each pixel column, i.e., the EL layers 786 are formed separately for each color. Note that the luminance of the display device 10 can be, for example, higher than or equal to 500 cd/$m^2$, preferably higher than or equal to 1000 cd/$m^2$ and lower than or equal to 10000 cd/$m^2$, further preferably higher than or equal to 2000 cd/$m^2$ and lower than or equal to 5000 cd/$m^2$.

Figure 18:
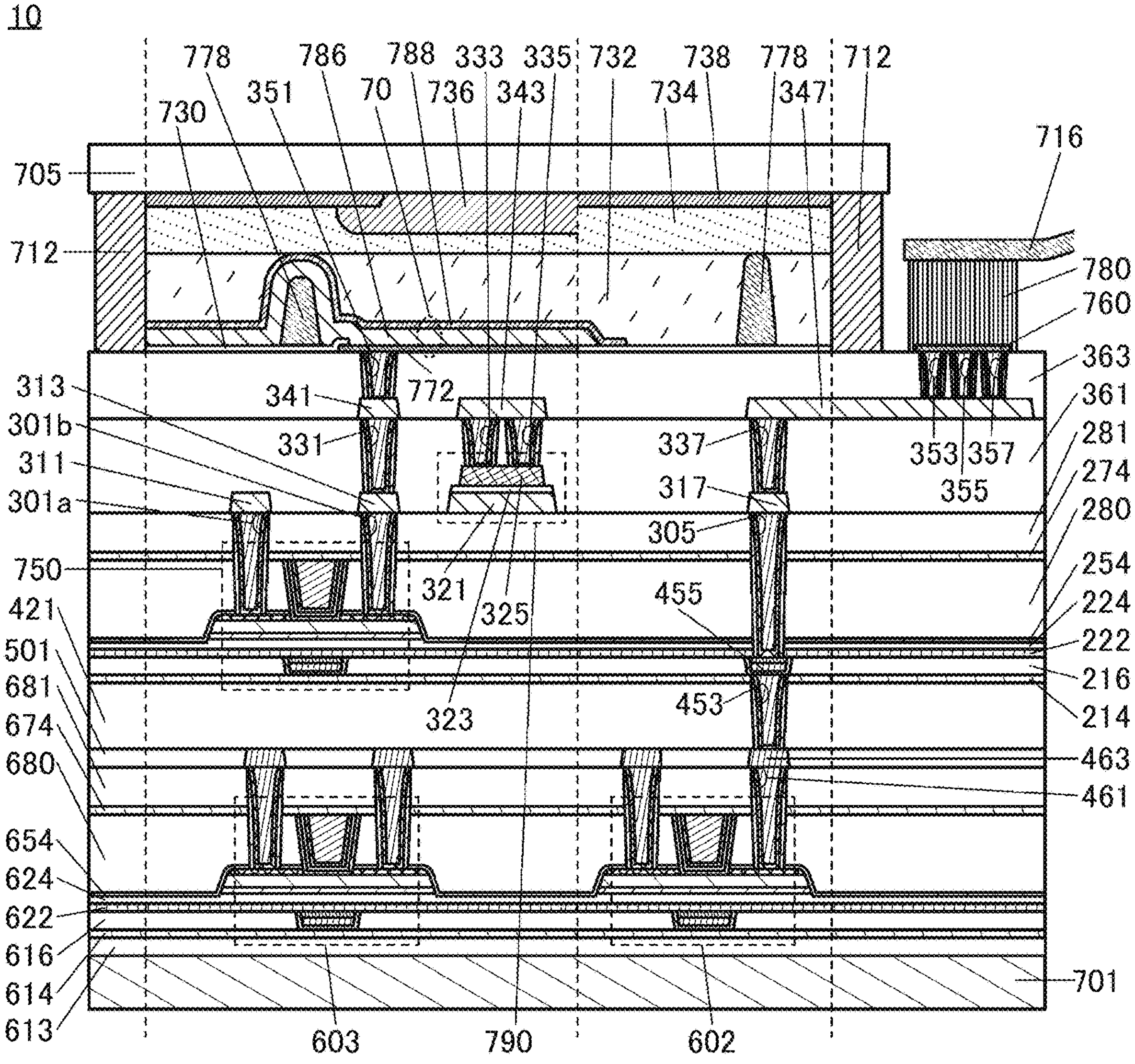
FIG. 18 is a cross-sectional view illustrating a structure example of a display device.

Although FIG. 15 and FIG. 17 each illustrate a structure in which the transistor 441 and the transistor 601 are provided such that their channel formation regions are formed inside the substrate 701 and the OS transistor is stacked over the transistor 441 and the transistor 601, one embodiment of the present invention is not limited thereto. FIG. 18 illustrates a modification example of FIG. 17. The display device 10 illustrated in FIG. 18 is different from the display device 10 illustrated in FIG. 17 mainly in that a transistor 602 and a transistor 603 that are OS transistors are provided in place of the transistor 441 and the transistor 601. An OS transistor can be used as the transistor 750. That is, the display device 10 illustrated in FIG. 18 includes a stack of OS transistors.

An insulator 613 and an insulator 614 are provided over the substrate 701, and the transistor 602 and the transistor 603 are provided over the insulator 614. Note that a transistor or the like may be provided between the substrate 701 and the insulator 613. For example, a transistor having a structure similar to those of the transistor 441 and the transistor 601 illustrated in FIG. 17 may be provided between the substrate 701 and the insulator 613.

The transistor 602 and the transistor 603 can be the transistors provided in the layer 20 described in Embodiment 2.

The transistor 602 and the transistor 603 can be transistors having a structure similar to that of the transistor 750. Note that the transistor 602 and the transistor 603 may be OS transistors having a structure different from that of the transistor 750.

An insulator 616, an insulator 622, an insulator 624, an insulator 654, an insulator 680, an insulator 674, and an insulator 681 are provided over the insulator 614, in addition to the transistor 602 and the transistor 603. A conductor 461 is embedded in the insulator 654, the insulator 680, the insulator 674, and the insulator 681. Here, the top surface of the conductor 461 and the top surface of the insulator 681 can be substantially level with each other.

An insulator 501 is provided over the conductor 461 and the insulator 681. A conductor 463 is embedded in the insulator 501. Here, the top surface of the conductor 463 and the top surface of the insulator 501 can be substantially level with each other.

The insulator 421 and the insulator 214 are provided over the conductor 463 and the insulator 501. The conductor 453 is embedded in the insulator 421 and the insulator 214. Here, the top surface of the conductor 453 and the top surface of the insulator 214 can be substantially level with each other.

As illustrated in FIG. 18, one of a source and a drain of the transistor 602 is electrically connected to the FPC 716 through the conductor 461, the conductor 463, the conductor 453, the conductor 455, the conductor 305, the conductor 317, the conductor 337, the conductor 347, the conductor 353, the conductor 355, the conductor 357, the connection electrode 760, and the anisotropic conductor 780.

The insulator 613, the insulator 614, the insulator 680, the insulator 674, the insulator 681, and the insulator 501 have a function of an interlayer film and may also have a function of a planarization film that covers unevenness thereunder.

When the display device 10 has the structure illustrated in FIG. 18, all the transistors included in the display device 10 can be OS transistors while the bezel and size of the display device 10 are reduced. Accordingly, the transistors provided in the layer 20 and the transistors provided in the layer 30 described in Embodiment 2 can be fabricated using the same apparatus, for example. Consequently, the fabrication cost of the display device 10 can be reduced, making the display device 10 inexpensive.

Figure 19:
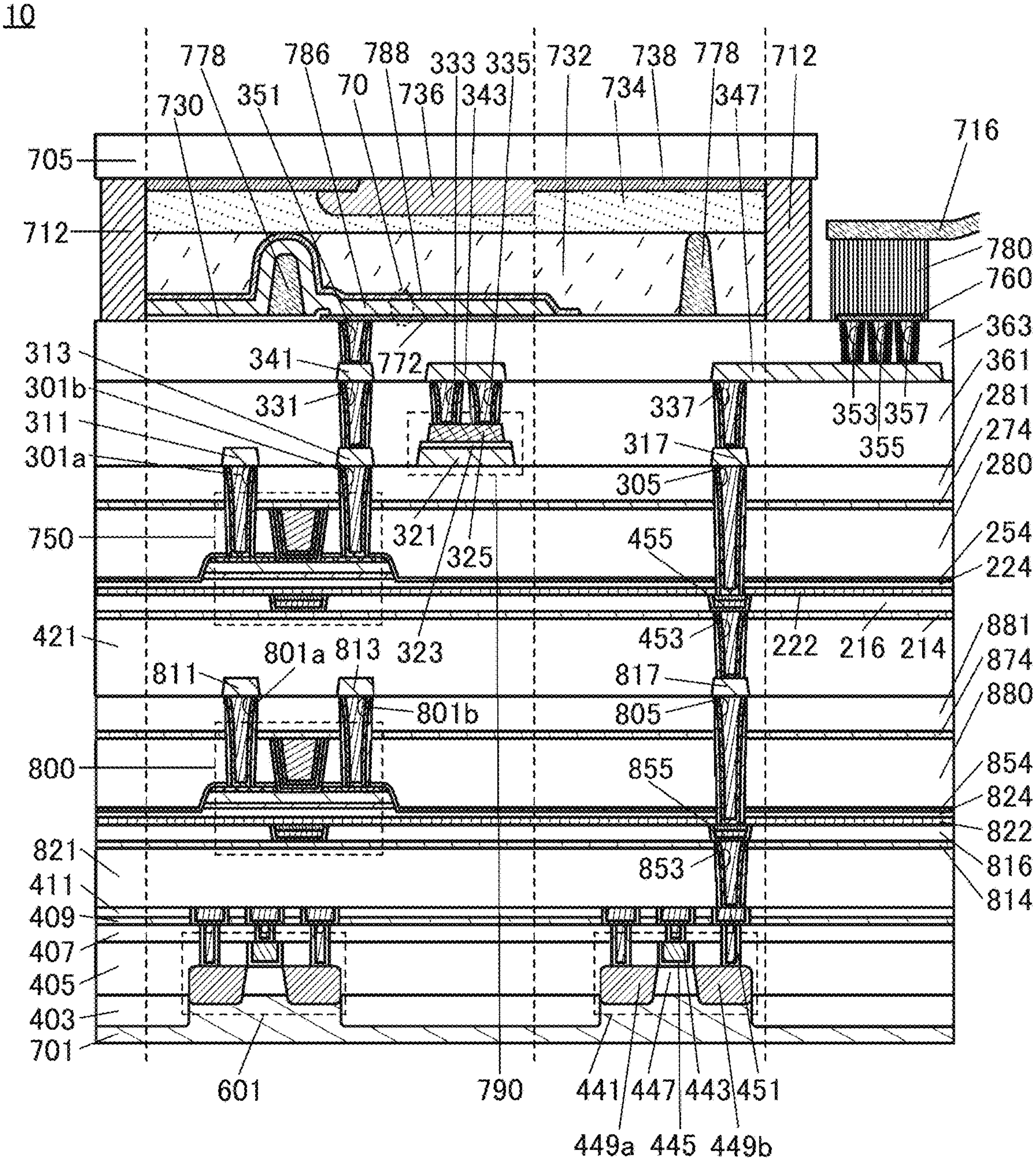
FIG. 19 is a cross-sectional view illustrating a structure example of a display device.

FIG. 19 is a cross-sectional view illustrating a structure example of the display device 10. The display device 10 in FIG. 19 is different from the display device 10 illustrated in FIG. 17 mainly in that a layer including a transistor 800 is provided between the layer including the transistor 750 and the layer including the transistor 601 and the transistor 441.

In the structure of FIG. 19, the layer 20 described in Embodiment 2 can include the layer including the transistor 601 and the transistor 441 and the layer including the transistor 800. The transistor 750 can be the transistor provided in the layer 30 described in Embodiment 2.

An insulator 821 and an insulator 814 are provided over the conductor 451 and the insulator 411. A conductor 853 is embedded in the insulator 821 and the insulator 814. Here, the top surface of the conductor 853 and the top surface of the insulator 814 can be substantially level with each other.

An insulator 816 is provided over the conductor 853 and the insulator 814. A conductor 855 is embedded in the insulator 816. Here, the top surface of the conductor 855 and the top surface of the insulator 816 can be substantially level with each other.

An insulator 822, an insulator 824, an insulator 854, an insulator 880, an insulator 874, and an insulator 881 are provided over the conductor 855 and the insulator 816. A conductor 805 is embedded in the insulator 822, the insulator 824, the insulator 854, the insulator 880, the insulator 874, and the insulator 881. Here, the top surface of the conductor 805 and the top surface of the insulator 881 can be substantially level with each other.

The insulator 421 and the insulator 214 are provided over a conductor 817 and the insulator 881.

As illustrated in FIG. 19, the low-resistance region 449*b* having a function of the other of the source region and the drain region of the transistor 441 is electrically connected to the FPC 716 through the conductor 451, the conductor 853, the conductor 855, the conductor 805, the conductor 817, the conductor 453, the conductor 455, the conductor 305, the conductor 317, the conductor 337, the conductor 347, the conductor 353, the conductor 355, the conductor 357, the connection electrode 760, and the anisotropic conductor 780.

The transistor 800 is provided over the insulator 814. The transistor 800 can be the transistor provided in the layer 20 described in Embodiment 2. The transistor 800 is preferably an OS transistor. For example, the transistor 800 can be the transistor provided in the backup circuit 82.

A conductor 801*a* and a conductor 801*b* are embedded in the insulator 854, the insulator 880, the insulator 874, and the insulator 881. The conductor 801*a* is electrically connected to one of a source and a drain of the transistor 800, and the conductor 801*b* is electrically connected to the other of the source and the drain of the transistor 800. Here, the top surfaces of the conductor 801*a* and the conductor 801*b* and the top surface of the insulator 881 can be substantially level with each other.

The transistor 750 can be the transistor provided in the layer 30 described in Embodiment 2. For example, the transistor 750 can be the transistor provided in the pixel circuit 62. The transistor 750 is preferably an OS transistor.

The insulator 405, the insulator 407, the insulator 409, the insulator 411, the insulator 821, the insulator 814, the insulator 880, the insulator 874, the insulator 881, the insulator 421, the insulator 214, the insulator 280, the insulator 274, the insulator 281, the insulator 361, and the insulator 363 have a function of an interlayer film and may also have a function of a planarization film that covers unevenness thereunder.

In the example illustrated in FIG. 19, the conductor 801*a*, the conductor 801*b*, and the conductor 805 are formed in the same layer. In the illustrated example, the conductor 811, the conductor 813, and the conductor 817 are formed in the same layer.

At least part of this embodiment can be implemented in combination with the other embodiments described in this specification as appropriate.

Embodiment 5

In this embodiment, a transistor that can be used in the display device of one embodiment of the present invention will be described.

<Structure Example of Transistor>

Figure 20A:
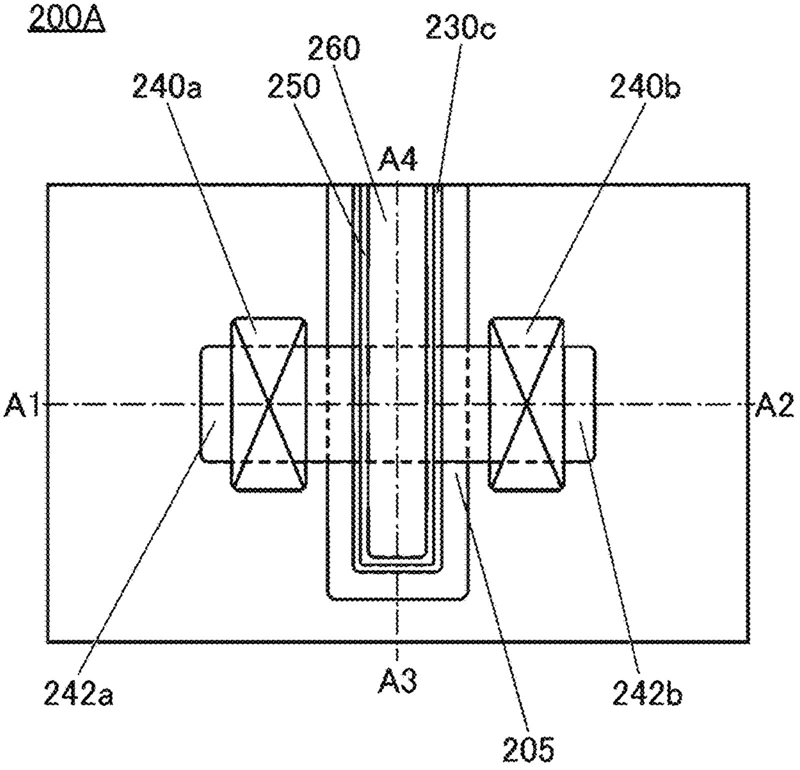
FIG. 20A is a top view illustrating a structure example of a transistor.
Figure 20C:
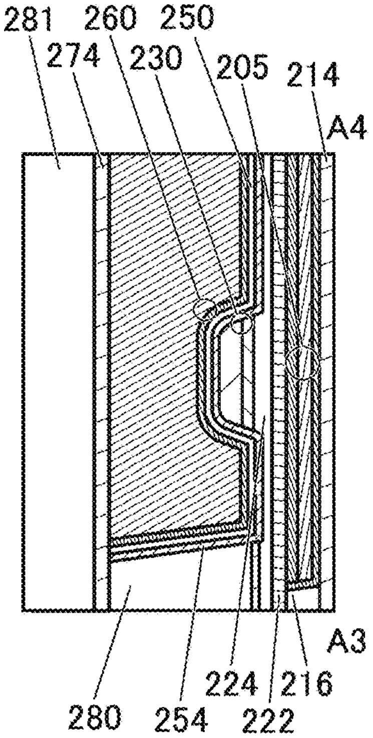
FIG. 20B and FIG. 20C are cross-sectional views illustrating the structure example of the transistor.
Figure 20B:
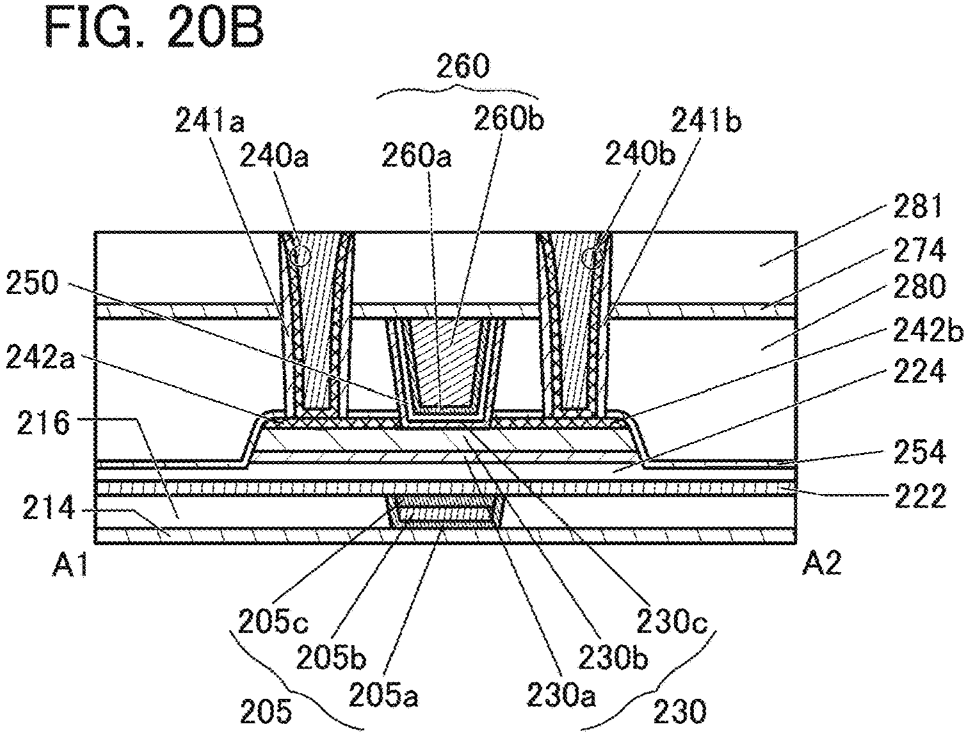

FIG. 20A, FIG. 20B, and FIG. 20C are a top view and cross-sectional views of a transistor 200A that can be used in the display device of one embodiment of the present invention and the periphery of the transistor 200A. The transistor 200A can be used in the display device of one embodiment of the present invention.

FIG. 20A is the top view of the transistor 200A. FIG. 20B and FIG. 20C are the cross-sectional views of the transistor 200A. Here, FIG. 20B is a cross-sectional view of a portion indicated by the dashed-dotted line A1-A2 in FIG. 20A and is a cross-sectional view of the transistor 200A in the channel length direction. FIG. 20C is a cross-sectional view of a portion indicated by the dashed-dotted line A3-A4 in FIG. 20A and is a cross-sectional view of the transistor 200A in the channel width direction. Note that some components are omitted in the top view of FIG. 20A for clarity of the drawing.

As illustrated in FIG. 20B or the like, the transistor 200A includes a metal oxide 230*a* placed over a substrate (not illustrated); a metal oxide 230*b* placed over the metal oxide 230*a*; a conductor 242*a* and a conductor 242*b* that are placed apart from each other over the metal oxide 230*b*; the insulator 280 that is placed over the conductor 242*a* and the conductor 242*b* and has an opening between the conductor 242*a* and the conductor 242*b*; a conductor 260 placed in the opening; an insulator 250 placed between the conductor 260 and each of the metal oxide 230*b*, the conductor 242*a*, the conductor 242*b*, and the insulator 280; and a metal oxide 230*c* placed between the insulator 250 and each of the metal oxide 230*b*, the conductor 242*a*, the conductor 242*b*, and the insulator 280. Here, as illustrated in FIG. 20B and FIG. 20C, preferably, the top surface of the conductor 260 is substantially aligned with the top surfaces of the insulator 250, the insulator 254, the metal oxide 230*c*, and the insulator 280. Hereinafter, the metal oxide 230*a*, the metal oxide 230*b*, and the metal oxide 230*c* may be collectively referred to as a metal oxide 230. The conductor 242*a* and the conductor 242*b* may be collectively referred to as a conductor 242.

In the transistor 200A illustrated in FIG. 20B or the like, the side surfaces of the conductor 242*a* and the conductor 242*b* on the conductor 260 side are substantially perpendicular. Note that the transistor 200A illustrated in FIG. 20B or the like is not limited thereto, and the angle formed between the side surfaces and the bottom surfaces of the conductor 242*a* and the conductor 242*b* may be greater than or equal to 10° and less than or equal to 80°, preferably greater than or equal to 30° and less than or equal to 60°. The side surfaces of the conductor 242*a* and the conductor 242*b* that face each other may have a plurality of surfaces.

As illustrated in FIG. 20B or the like, the insulator 254 is preferably placed between the insulator 280 and each of the insulator 224, the metal oxide 230*a*, the metal oxide 230*b*, the conductor 242*a*, the conductor 242*b*, and the metal oxide 230*c*. Here, as illustrated in FIG. 20B and FIG. 20C, the insulator 254 is preferably in contact with the side surface of the metal oxide 230*c*, the top surface and the side surface of the conductor 242*a*, the top surface and the side surface of the conductor 242*b*, the side surfaces of the metal oxide 230*a* and the metal oxide 230*b*, and the top surface of the insulator 224.

In the transistor 200A, three layers of the metal oxide 230*a*, the metal oxide 230*b*, and the metal oxide 230*c* are stacked in and around the region where the channel is formed (hereinafter, also referred to as a channel formation region); however, the present invention is not limited thereto. For example, a two-layer structure of the metal oxide 230*b* and the metal oxide 230*c* or a stacked-layer structure of four or more layers may be employed. Although the conductor 260 is illustrated to have a stacked-layer structure of two layers in the transistor 200A, the present invention is not limited thereto. For example, the conductor 260 may have a single-layer structure or a stacked-layer structure of three or more layers. Furthermore, each of the metal oxide 230*a*, the metal oxide 230*b*, and the metal oxide 230*c* may have a stacked-layer structure of two or more layers.

For example, in the case where the metal oxide 230*c* has a stacked-layer structure including a first metal oxide and a second metal oxide over the first metal oxide, the first metal oxide preferably has a composition similar to that of the metal oxide 230*b* and the second metal oxide preferably has a composition similar to that of the metal oxide 230*a*.

Here, the conductor 260 functions as a gate electrode of the transistor, and the conductor 242*a* and the conductor 242*b* function as a source electrode and a drain electrode. As described above, the conductor 260 is formed to be embedded in the opening of the insulator 280 and the region interposed between the conductor 242*a* and the conductor 242*b*. Here, the positions of the conductor 260, the conductor 242*a*, and the conductor 242*b* are selected in a self-aligned manner with respect to the opening of the insulator 280. That is, in the transistor 200A, the gate electrode can be placed between the source electrode and the drain electrode in a self-aligned manner. Thus, the conductor 260 can be formed without an alignment margin, resulting in a reduction in the area occupied by the transistor 200A. Accordingly, the display device can have higher resolution. In addition, the display device can have a narrow bezel.

As illustrated in FIG. 20B or the like, the conductor 260 preferably includes a conductor 260*a* provided inside the insulator 250 and a conductor 260*b* provided to be embedded inside the conductor 260*a*.

The transistor 200A preferably includes the insulator 214 placed over the substrate (not illustrated); the insulator 216 placed over the insulator 214; a conductor 205 placed to be embedded in the insulator 216; the insulator 222 placed over the insulator 216 and the conductor 205; and the insulator 224 placed over the insulator 222. The metal oxide 230*a* is preferably placed over the insulator 224.

The insulator 274 and the insulator 281 functioning as interlayer films are preferably placed over the transistor 200A. Here, the insulator 274 is preferably placed in contact with the top surfaces of the conductor 260, the insulator 250, the insulator 254, the metal oxide 230*c*, and the insulator 280.

The insulator 222, the insulator 254, and the insulator 274 preferably have a function of inhibiting diffusion of at least one of hydrogen (e.g., a hydrogen atom and a hydrogen molecule). For example, the insulator 222, the insulator 254, and the insulator 274 preferably have a lower hydrogen permeability than the insulator 224, the insulator 250, and the insulator 280. Moreover, the insulator 222 and the insulator 254 preferably have a function of inhibiting diffusion of oxygen (e.g., at least one of an oxygen atom and an oxygen molecule). For example, the insulator 222 and the insulator 254 preferably have a lower oxygen permeability than the insulator 224, the insulator 250, and the insulator 280.

Here, the insulator 224, the metal oxide 230, and the insulator 250 are separated from the insulator 280 and the insulator 281 by the insulator 254 and the insulator 274. This can inhibit entry of impurities such as hydrogen contained in the insulator 280 and the insulator 281 into the insulator 224, the metal oxide 230, and the insulator 250 or excess oxygen into the insulator 224, the metal oxide 230*a*, the metal oxide 230*b*, and the insulator 250.

A conductor 240 (a conductor 240*a* and a conductor 240*b*) that is electrically connected to the transistor 200A and functions as a plug is preferably provided. Note that an insulator 241 (an insulator 241*a* and an insulator 241*b*) is provided in contact with the side surface of the conductor 240 functioning as a plug. That is, the insulator 241 is provided in contact with the inner wall of an opening in the insulator 254, the insulator 280, the insulator 274, and the insulator 281. In addition, a structure may be employed in which a first conductor of the conductor 240 is provided in contact with the side surface of the insulator 241 and a second conductor of the conductor 240 is provided inside the first conductor. Here, the top surface of the conductor 240 and the top surface of the insulator 281 can be substantially level with each other. Although the transistor 200A has a structure in which the first conductor of the conductor 240 and the second conductor of the conductor 240 are stacked, the present invention is not limited thereto. For example, the conductor 240 may have a single-layer structure or a stacked-layer structure of three or more layers. In the case where a component has a stacked-layer structure, layers may be distinguished by ordinal numbers corresponding to the formation order.

In the transistor 200A, a metal oxide functioning as an oxide semiconductor (hereinafter, also referred to as an oxide semiconductor) is preferably used as the metal oxide 230 including the channel formation region (the metal oxide 230*a*, the metal oxide 230*b*, and the metal oxide 230*c*). For example, the metal oxide to be the channel formation region of the metal oxide 230 preferably has a band gap of 2 eV or more, further preferably 2.5 eV or more.

The metal oxide preferably contains at least indium (In) or zinc (Zn). In particular, indium (In) and zinc (Zn) are preferably contained. In addition to them, an element M is preferably contained. As the element M, one or more of aluminum (Al), gallium (Ga), yttrium (Y), tin (Sn), boron (B), titanium (Ti), iron (Fe), nickel (Ni), germanium (Ge), zirconium (Zr), molybdenum (Mo), lanthanum (La), cerium (Ce), neodymium (Nd), hafnium (Hf), tantalum (Ta), tungsten (W), magnesium (Mg), and cobalt (Co) can be used. In particular, the element M is preferably one or more of aluminum (Al), gallium (Ga), yttrium (Y), and tin (Sn). Furthermore, the element M preferably contains one or both of Ga and Sn.

As illustrated in FIG. 20B, the metal oxide 230*b* in a region not overlapping with the conductor 242 sometimes has a smaller thickness than the metal oxide 230*b* in a region overlapping with the conductor 242. The thin region is formed when part of the top surface of the metal oxide 230*b* is removed at the time of forming the conductor 242*a* and the conductor 242*b*. When a conductive film to be the conductor 242 is formed, a low-resistance region is sometimes formed on the top surface of the metal oxide 230*b* in the vicinity of the interface with the conductive film. Removing the low-resistance region positioned between the conductor 242*a* and the conductor 242*b* on the top surface of the metal oxide 230*b* in the above manner can prevent formation of the channel in the region.

According to one embodiment of the present invention, a display device that includes small-size transistors and has high resolution can be provided. A display device that includes a transistor with a high on-state current and has high luminance can be provided. A display device that includes a transistor operating at high speed and thus operates at high speed can be provided. A display device that includes a transistor having stable electrical characteristics and is highly reliable can be provided. A display device that includes a transistor with a low off-state current and has low power consumption can be provided.

The structure of the transistor 200A that can be used in the display device of one embodiment of the present invention will be described in detail.

The conductor 205 is placed to include a region overlapping with the metal oxide 230 and the conductor 260. Furthermore, the conductor 205 is preferably provided to be embedded in the insulator 216.

The conductor 205 includes a conductor 205*a*, a conductor 205*b*, and a conductor 205*c*. The conductor 205*a* is provided in contact with the bottom surface and the side wall of the opening provided in the insulator 216. The conductor 205*b* is provided to be embedded in a recessed portion formed by the conductor 205*a*. Here, the level of the top surface of the conductor 205*b* is lower than the levels of the top surface of the conductor 205*a* and the top surface of the insulator 216. The conductor 205*c* is provided in contact with the top surface of the conductor 205*b* and the side surface of the conductor 205*a*. Here, the top surface of the conductor 205*c* is substantially level with the top surface of the conductor 205*a* and the top surface of the insulator 216. That is, the conductor 205*b* is surrounded by the conductor 205*a* and the conductor 205*c*.

Here, for the conductor 205*a* and the conductor 205*c*, it is preferable to use a conductive material having a function of inhibiting diffusion of impurities such as a hydrogen atom, a hydrogen molecule, a water molecule, a nitrogen atom, a nitrogen molecule, a nitrogen oxide molecule ($N_2O$, NO, $NO_2$, or the like), and a copper atom. Alternatively, it is preferable to use a conductive material having a function of inhibiting diffusion of oxygen (e.g., at least one of an oxygen atom and an oxygen molecule).

When the conductor 205*a* and the conductor 205*c* are formed using a conductive material having a function of inhibiting diffusion of hydrogen, impurities such as hydrogen contained in the conductor 205*b* can be inhibited from diffusing into the metal oxide 230 through the insulator 224 and the like. When the conductor 205*a* and the conductor 205*c* are formed using a conductive material having a function of inhibiting diffusion of oxygen, the conductivity of the conductor 205*b* can be inhibited from being lowered because of oxidation. As the conductive material having a function of inhibiting diffusion of oxygen, for example, titanium, titanium nitride, tantalum, tantalum nitride, ruthenium, ruthenium oxide, or the like is preferably used. Thus, the conductor 205*a* is a single layer or stacked layers of the above conductive materials. For example, titanium nitride is used for the conductor 205*a*.

For the conductor 205*b*, a conductive material containing tungsten, copper, or aluminum as its main component is preferably used. For example, tungsten is used for the conductor 205*b*.

The conductor 260 sometimes functions as a first gate (also referred to as top gate) electrode. The conductor 205 sometimes functions as a second gate (also referred to as bottom gate) electrode. In that case, by changing a potential applied to the conductor 205 not in synchronization with but independently of a potential applied to the conductor 260, $V_{th}$ of the transistor 200A can be controlled. In particular, by application of a negative potential to the conductor 205, $V_{th}$ of the transistor 200A can be higher than 0 V and the off-state current can be made low. Thus, a drain current at the time when a potential applied to the conductor 260 is 0 V can be lower in the case where a negative potential is applied to the conductor 205 than in the case where the negative potential is not applied to the conductor 205.

The conductor 205 is preferably provided to be larger than the channel formation region in the metal oxide 230. In particular, it is preferable that the conductor 205 extend beyond an end portion of the metal oxide 230 that intersects with the channel width direction, as illustrated in FIG. 20C. In other words, the conductor 205 and the conductor 260 preferably overlap with each other with the insulator placed therebetween, in a region outside the side surface of the metal oxide 230 in the channel width direction.

With the above structure, the channel formation region of the metal oxide 230 can be electrically surrounded by an electric field of the conductor 260 having a function of the first gate electrode and an electric field of the conductor 205 having a function of the second gate electrode.

As illustrated in FIG. 20C, the conductor 205 extends to function as a wiring as well. However, without limitation to this structure, a structure in which a conductor functioning as a wiring is provided below the conductor 205 may be employed.

The insulator 214 preferably functions as a barrier insulating film that inhibits entry of impurities such as water and hydrogen into the transistor 200A from the substrate side. Accordingly, it is preferable to use, for the insulator 214, an insulating material having a function of inhibiting diffusion of impurities such as a hydrogen atom, a hydrogen molecule, a water molecule, a nitrogen atom, a nitrogen molecule, a nitrogen oxide molecule (e.g., $N_2O$, NO, and $NO_2$), and a copper atom (an insulating material through which the impurities are less likely to pass). Alternatively, it is preferable to use an insulating material having a function of inhibiting diffusion of oxygen (e.g., at least one of an oxygen atom and an oxygen molecule) (an insulating material through which the oxygen is less likely to pass).

For example, aluminum oxide or silicon nitride is preferably used for the insulator 214. Accordingly, it is possible to inhibit diffusion of impurities such as water and hydrogen to the transistor 200A side from the substrate side through the insulator 214. Alternatively, it is possible to inhibit diffusion of oxygen contained in the insulator 224 and the like to the substrate side through the insulator 214.

The permittivity of each of the insulator 216, the insulator 280, and the insulator 281 functioning as an interlayer film is preferably lower than that of the insulator 214. When a material with a low permittivity is used for an interlayer film, the parasitic capacitance generated between wirings can be reduced. For the insulator 216, the insulator 280, and the insulator 281, for example, silicon oxide, silicon oxynitride, silicon nitride oxide, silicon nitride, silicon oxide to which fluorine is added, silicon oxide to which carbon is added, silicon oxide to which carbon and nitrogen are added, porous silicon oxide, or the like can be used as appropriate.

The insulator 222 and the insulator 224 have a function of a gate insulator.

Here, the insulator 224 in contact with the metal oxide 230 preferably releases oxygen by heating. In this specification, oxygen that is released by heating is referred to as excess oxygen in some cases. For example, silicon oxide, silicon oxynitride, or the like can be used as appropriate for the insulator 224. When an insulator containing oxygen is provided in contact with the metal oxide 230, oxygen vacancies in the metal oxide 230 can be reduced, leading to improved reliability of the transistor 200A.

Specifically, an oxide material that releases part of oxygen by heating is preferably used for the insulator 224. An oxide that releases oxygen by heating is an oxide film in which the amount of released oxygen converted into oxygen atoms is greater than or equal to $1.0\times 10^{18}$ atoms/cm$^3$, preferably greater than or equal to $1.0\times10^{19}$ atoms/cm$^3$, further preferably greater than or equal to $2.0\times10^{19}$ atoms/cm$^3$ or greater than or equal to $3.0\times10^{20}$ atoms/cm$^3$ in TDS (Thermal Desorption Spectroscopy) analysis. Note that the temperature of the film surface in the TDS analysis is preferably in the range of 100° C. to 700° C., inclusive or 100° C. to 400° C., inclusive.

As illustrated in FIG. 20C, the insulator 224 in a region overlapping with neither the insulator 254 nor the metal oxide 230*b* sometimes has a smaller thickness than that in the other regions. In the insulator 224, the region overlapping with neither the insulator 254 nor the metal oxide 230*b* preferably has a thickness with which the above oxygen can be adequately diffused.

Like the insulator 214 and the like, the insulator 222 preferably functions as a barrier insulating film that inhibits entry of impurities such as water and hydrogen into the transistor 200A from the substrate side. For example, the insulator 222 preferably has a lower hydrogen permeability than the insulator 224. When the insulator 224, the metal oxide 230, the insulator 250, and the like are surrounded by the insulator 222, the insulator 254, and the insulator 274, entry of impurities such as water and hydrogen into the transistor 200A from the outside can be inhibited.

Furthermore, it is preferable that the insulator 222 have a function of inhibiting diffusion of oxygen (e.g., at least one of an oxygen atom and an oxygen molecule) (it is preferable that the oxygen be less likely to pass through the insulator 222). For example, the insulator 222 preferably has a lower oxygen permeability than the insulator 224. The insulator 222 preferably has a function of inhibiting diffusion of oxygen and impurities, in which case oxygen contained in the metal oxide 230 is less likely to diffuse to the substrate side. Moreover, the conductor 205 can be inhibited from reacting with oxygen contained in the insulator 224 or the metal oxide 230.

As the insulator 222, an insulator containing an oxide of one or both of aluminum and hafnium, which is an insulating material, is preferably used. As the insulator containing an oxide of one or both of aluminum and hafnium, aluminum oxide, hafnium oxide, an oxide containing aluminum and hafnium (hafnium aluminate), or the like is preferably used. In the case where the insulator 222 is formed using such a material, the insulator 222 functions as a layer inhibiting release of oxygen from the metal oxide 230 and entry of impurities such as hydrogen into the metal oxide 230 from the periphery of the transistor 200A.

Alternatively, aluminum oxide, bismuth oxide, germanium oxide, niobium oxide, silicon oxide, titanium oxide, tungsten oxide, yttrium oxide, or zirconium oxide may be added to these insulators, for example. Alternatively, these insulators may be subjected to nitriding treatment. Silicon oxide, silicon oxynitride, or silicon nitride may be stacked over any of the above insulators.

The insulator 222 may be a single layer or a stacked layer using an insulator containing what is called a high-k material, such as aluminum oxide, hafnium oxide, tantalum oxide, zirconium oxide, lead zirconate titanate (PZT), strontium titanate ($SrTiO_3$), or $(Ba,Sr)TiO_3$ (BST). With scaling down and higher integration of a transistor, a problem such as leakage current may arise because of a thinned gate insulator. When a high-k material is used for the insulator functioning as a gate insulator, a gate potential at the time of the operation of the transistor can be reduced while the physical thickness is maintained.

Note that the insulator 222 and the insulator 224 may each have a stacked-layer structure of two or more layers. In that case, without limitation to a stacked-layer structure formed of the same material, a stacked-layer structure formed of different materials may be employed. For example, an insulator similar to the insulator 224 may be provided below the insulator 222.

The metal oxide 230 includes the metal oxide 230*a*, the metal oxide 230*b* over the metal oxide 230*a*, and the metal oxide 230*c* over the metal oxide 230*b*. When the metal oxide 230 includes the metal oxide 230*a* under the metal oxide 230*b*, it is possible to inhibit diffusion of impurities into the metal oxide 230*b* from the components formed below the metal oxide 230*a*. Moreover, when the metal oxide 230 includes the metal oxide 230*c* over the metal oxide 230*b*, it is possible to inhibit diffusion of impurities into the metal oxide 230*b* from the components formed above the metal oxide 230*c*.

Note that the metal oxide 230 preferably has a stacked-layer structure of a plurality of oxide layers that differ in the atomic ratio of metal atoms. For example, in the case where the metal oxide 230 contains at least indium (In) and the element M, the proportion of the number of atoms of the element M contained in the metal oxide 230*a* to the number of atoms of all elements that constitute the metal oxide 230*a* is preferably higher than the proportion of the number of atoms of the element M contained in the metal oxide 230*b* to the number of atoms of all elements that constitute the metal oxide 230*b*. In addition, the atomic ratio of the element M to In in the metal oxide 230*a* is preferably greater than the atomic ratio of the element M to In in the metal oxide 230*b*. Here, a metal oxide that can be used as the metal oxide 230*a* or the metal oxide 230*b* can be used as the metal oxide 230*c*.

The energy of the conduction band minimum of each of the metal oxide 230*a* and the metal oxide 230*c* is preferably higher than the energy of the conduction band minimum of the metal oxide 230*b*. In other words, the electron affinity of each of the metal oxide 230*a* and the metal oxide 230*c* is preferably smaller than the electron affinity of the metal oxide 230*b*. In this case, a metal oxide that can be used as the metal oxide 230*a* is preferably used as the metal oxide 230*c*. Specifically, the proportion of the number of atoms of the element M contained in the metal oxide 230*c* to the number of atoms of all elements that constitute the metal oxide 230*c* is preferably higher than the proportion of the number of atoms of the element M contained in the metal oxide 230*b* to the number of atoms of all elements that constitute the metal oxide 230*b*. In addition, the atomic ratio of the element M to In in the metal oxide 230*c* is preferably greater than the atomic ratio of the element M to In in the metal oxide 230*b*.

Here, the energy level of the conduction band minimum gently changes at junction portions between the metal oxide 230*a*, the metal oxide 230*b*, and the metal oxide 230*c*. In other words, at the junction portions between the metal oxide 230*a*, the metal oxide 230*b*, and the metal oxide 230*c*, the energy level of the conduction band minimum continuously changes or the energy levels are continuously connected. This can be achieved by decreasing the densities of defect states in mixed layers formed at the interface between the metal oxide 230*a* and the metal oxide 230*b* and the interface between the metal oxide 230*b* and the metal oxide 230*c*.

Specifically, when the metal oxide 230*a* and the metal oxide 230*b* or the metal oxide 230*b* and the metal oxide 230*c* contain the same element (as a main component) in addition to oxygen, a mixed layer with a low density of defect states can be formed. For example, an In—Ga—Zn oxide, a Ga—Zn oxide, gallium oxide, or the like may be used as the metal oxide 230*a* and the metal oxide 230*c*, in the case where the metal oxide 230*b* is an In—Ga—Zn oxide. The metal oxide 230*c* may have a stacked-layer structure. For example, a stacked-layer structure of an In—Ga—Zn oxide and a Ga—Zn oxide over the In—Ga—Zn oxide or a stacked-layer structure of an In—Ga—Zn oxide and gallium oxide over the In—Ga—Zn oxide can be employed. In other words, the metal oxide 230*c* may have a stacked-layer structure of an In—Ga—Zn oxide and an oxide that does not contain In.

Specifically, as the metal oxide 230*a*, a metal oxide with In:Ga:Zn=1:3:4 [atomic ratio] or 1:1:0.5 [atomic ratio] can be used. As the metal oxide 230*b*, a metal oxide with In:Ga:Zn=4:2:3 [atomic ratio] or 3:1:2 [atomic ratio] can be used. As the metal oxide 230*c*, a metal oxide with In:Ga:Zn=1:3:4 [atomic ratio], In:Ga:Zn=4:2:3 [atomic ratio], Ga:Zn=2:1 [atomic ratio], or Ga:Zn=2:5 [atomic ratio] can be used. Specific examples of a stacked-layer structure of the metal oxide 230*c* include a stacked-layer structure of a layer with In:Ga:Zn=4:2:3 [atomic ratio] and a layer with Ga:Zn=2:1 [atomic ratio], a stacked-layer structure of a layer with In:Ga:Zn=4:2:3 [atomic ratio] and a layer with Ga:Zn=2:5 [atomic ratio], and a stacked-layer structure of a layer with In:Ga:Zn=4:2:3 [atomic ratio] and a layer of gallium oxide.

At this time, the metal oxide 230*b* serves as a main carrier path. When the metal oxide 230*a* and the metal oxide 230*c* have the above structure, the densities of defect states at the interface between the metal oxide 230*a* and the metal oxide 230*b* and the interface between the metal oxide 230*b* and the metal oxide 230*c* can be made low. This reduces the influence of interface scattering on carrier conduction, and the transistor 200A can have a high on-state current and high frequency characteristics. Note that in the case where the metal oxide 230*c* has a stacked-layer structure, not only the effect of reducing the density of defect states at the interface between the metal oxide 230*b* and the metal oxide 230*c*, but also the effect of inhibiting diffusion of the constituent elements contained in the metal oxide 230*c* to the insulator 250 side can be expected. Specifically, the metal oxide 230*c* has a stacked-layer structure in which an oxide not containing In is positioned in the upper layer of the stacked-layer structure, whereby the diffusion of In to the insulator 250 side can be inhibited. Since the insulator 250 functions as a gate insulator, the transistor has defects in characteristics when In diffuses. Thus, the metal oxide 230*c* having a stacked-layer structure allows a highly reliable display device to be provided.

The conductor 242 (the conductor 242*a* and the conductor 242*b*) functioning as the source electrode and the drain electrode is provided over the metal oxide 230*b*. For the conductor 242, it is preferable to use a metal element selected from aluminum, chromium, copper, silver, gold, platinum, tantalum, nickel, titanium, molybdenum, tungsten, hafnium, vanadium, niobium, manganese, magnesium, zirconium, beryllium, indium, ruthenium, iridium, strontium, and lanthanum; an alloy containing any of the above metal elements; an alloy containing a combination of the above metal elements; or the like. For example, it is preferable to use tantalum nitride, titanium nitride, tungsten, a nitride containing titanium and aluminum, a nitride containing tantalum and aluminum, ruthenium oxide, ruthenium nitride, an oxide containing strontium and ruthenium, an oxide containing lanthanum and nickel, or the like. Tantalum nitride, titanium nitride, a nitride containing titanium and aluminum, a nitride containing tantalum and aluminum, ruthenium oxide, ruthenium nitride, an oxide containing strontium and ruthenium, and an oxide containing lanthanum and nickel are preferable because they are oxidation-resistant conductive materials or materials that maintain their conductivity even after absorbing oxygen.

When the conductor 242 is provided in contact with the metal oxide 230, the oxygen concentration of the metal oxide 230 in the vicinity of the conductor 242 sometimes decreases. In addition, a metal compound layer that contains the metal contained in the conductor 242 and the component of the metal oxide 230 is sometimes formed in the metal oxide 230 in the vicinity of the conductor 242. In such cases, the carrier density of the region in the metal oxide 230 in the vicinity of the conductor 242 increases, and the region becomes a low-resistance region.

Here, the region between the conductor 242*a* and the conductor 242*b* is formed to overlap with the opening of the insulator 280. Accordingly, the conductor 260 can be placed in a self-aligned manner between the conductor 242*a* and the conductor 242*b*.

The insulator 250 functions as a gate insulator. The insulator 250 is preferably placed in contact with the top surface of the metal oxide 230*c*. For the insulator 250, silicon oxide, silicon oxynitride, silicon nitride oxide, silicon nitride, silicon oxide to which fluorine is added, silicon oxide to which carbon is added, silicon oxide to which carbon and nitrogen are added, or porous silicon oxide can be used. In particular, silicon oxide and silicon oxynitride, which are thermally stable, are preferable.

As in the insulator 224, the concentration of impurities such as water and hydrogen in the insulator 250 is preferably reduced. The thickness of the insulator 250 is preferably greater than or equal to 1 nm and less than or equal to 20 nm.

A metal oxide may be provided between the insulator 250 and the conductor 260. The metal oxide preferably inhibits oxygen diffusion from the insulator 250 into the conductor 260. Accordingly, oxidation of the conductor 260 due to oxygen in the insulator 250 can be inhibited.

The metal oxide functions as part of the gate insulator in some cases. Therefore, when silicon oxide, silicon oxynitride, or the like is used for the insulator 250, a metal oxide that is a high-k material with a high dielectric constant is preferably used as the metal oxide. When the gate insulator has a stacked-layer structure of the insulator 250 and the metal oxide, the stacked-layer structure can be thermally stable and have a high dielectric constant. Accordingly, a gate potential applied during the operation of the transistor can be reduced while the physical thickness of the gate insulator is maintained. In addition, the equivalent oxide thickness (EOT) of the insulator functioning as the gate insulator can be reduced.

Specifically, a metal oxide containing one kind or two or more kinds selected from hafnium, aluminum, gallium, yttrium, zirconium, tungsten, titanium, tantalum, nickel, germanium, magnesium, and the like can be used. It is particularly preferable to use an insulator containing an oxide of one or both of aluminum and hafnium, such as aluminum oxide, hafnium oxide, or an oxide containing aluminum and hafnium (hafnium aluminate).

Although the conductor 260 is illustrated to have a two-layer structure in FIG. 20B or the like, the conductor 260 may have a single-layer structure or a stacked-layer structure of three or more layers.

The conductor 260*a* is preferably formed using the aforementioned conductor having a function of inhibiting diffusion of impurities such as a hydrogen atom, a hydrogen molecule, a water molecule, a nitrogen atom, a nitrogen molecule, a nitrogen oxide molecule (e.g., $N_2O$, NO, and $NO_2$), and a copper atom. Alternatively, it is preferable to use a conductive material having a function of inhibiting diffusion of oxygen (e.g., at least one of an oxygen atom and an oxygen molecule).

When the conductor 260*a* has a function of inhibiting diffusion of oxygen, the conductivity of the conductor 260*b* can be inhibited from being lowered by oxidation due to oxygen contained in the insulator 250. As a conductive material having a function of inhibiting oxygen diffusion, for example, tantalum, tantalum nitride, ruthenium, ruthenium oxide, or the like is preferably used.

A conductive material containing tungsten, copper, or aluminum as its main component is preferably used for the conductor 260*b*. The conductor 260 also functions as a wiring and thus is preferably formed using a conductor having high conductivity. For example, a conductive material containing tungsten, copper, or aluminum as its main component can be used. The conductor 260*b* may have a stacked-layer structure, for example, a stacked-layer structure of titanium or titanium nitride and the above conductive material.

As illustrated in FIG. 20A and FIG. 20C, the side surface of the metal oxide 230 is covered with the conductor 260 in a region where the metal oxide 230*b* does not overlap with the conductor 242, that is, the channel formation region of the metal oxide 230. Accordingly, an electric field of the conductor 260 functioning as the first gate electrode is likely to act on the side surface of the metal oxide 230. Thus, the on-state current of the transistor 200A can be increased and the frequency characteristics can be improved.

The insulator 254, like the insulator 214 and the like, preferably functions as a barrier insulating film that inhibits entry of impurities such as water and hydrogen into the transistor 200A from the insulator 280 side. The insulator 254 preferably has a lower hydrogen permeability than the insulator 224, for example. Furthermore, as illustrated in FIG. 20B and FIG. 20C, the insulator 254 is preferably in contact with the side surface of the metal oxide 230*c*, the top and side surfaces of the conductor 242*a*, the top and side surfaces of the conductor 242*b*, the side surfaces of the metal oxide 230*a* and the metal oxide 230*b*, and the top surface of the insulator 224. Such a structure can inhibit entry of hydrogen contained in the insulator 280 into the metal oxide 230 through the top surfaces or side surfaces of the conductor 242*a*, the conductor 242*b*, the metal oxide 230*a*, the metal oxide 230*b*, and the insulator 224.

Furthermore, it is preferable that the insulator 254 have a function of inhibiting diffusion of oxygen (e.g., at least one of an oxygen atom and an oxygen molecule) (it is preferable that the oxygen be less likely to pass through the insulator 254). For example, the insulator 254 preferably has a lower oxygen permeability than the insulator 280 or the insulator 224.

The insulator 254 is preferably formed by a sputtering method. When the insulator 254 is formed by a sputtering method in an oxygen-containing atmosphere, oxygen can be added to the vicinity of a region of the insulator 224 that is in contact with the insulator 254. Thus, oxygen can be supplied from the region to the metal oxide 230 through the insulator 224. Here, with the insulator 254 having a function of inhibiting upward diffusion of oxygen, oxygen can be prevented from diffusing from the metal oxide 230 into the insulator 280. Moreover, with the insulator 222 having a function of inhibiting downward diffusion of oxygen, oxygen can be prevented from diffusing from the metal oxide 230 to the substrate side. In the above manner, oxygen is supplied to the channel formation region of the metal oxide 230. Accordingly, oxygen vacancies in the metal oxide 230 can be reduced, so that the transistor can be inhibited from having normally-on characteristics.

As the insulator 254, an insulator containing an oxide of one or both of aluminum and hafnium is preferably formed, for example. Note that as the insulator containing an oxide of one or both of aluminum and hafnium, aluminum oxide, hafnium oxide, an oxide containing aluminum and hafnium (hafnium aluminate), or the like is preferably used.

The insulator 224, the insulator 250, and the metal oxide 230 are covered with the insulator 254 having a barrier property against hydrogen, whereby the insulator 280 is isolated from the insulator 224, the metal oxide 230, and the insulator 250 by the insulator 254. This can inhibit entry of impurities such as hydrogen from the outside of the transistor 200A, resulting in excellent electrical characteristics and high reliability of the transistor 200A.

The insulator 280 is provided over the insulator 224, the metal oxide 230, and the conductor 242 with the insulator 254 therebetween. The insulator 280 preferably includes, for example, silicon oxide, silicon oxynitride, silicon nitride oxide, silicon oxide to which fluorine is added, silicon oxide to which carbon is added, silicon oxide to which carbon and nitrogen are added, or porous silicon oxide. In particular, silicon oxide and silicon oxynitride are preferable because they are thermally stable. In particular, materials such as silicon oxide, silicon oxynitride, and porous silicon oxide are preferably used, in which case a region containing oxygen to be released by heating can be easily formed.

The concentration of impurities such as water and hydrogen in the insulator 280 is preferably reduced. In addition, the top surface of the insulator 280 may be planarized.

Like the insulator 214 and the like, the insulator 274 preferably functions as a barrier insulating film that inhibits entry of impurities such as water and hydrogen into the insulator 280 from the above. As the insulator 274, for example, the insulator that can be used as the insulator 214, the insulator 254, and the like can be used.

The insulator 281 functioning as an interlayer film is preferably provided over the insulator 274. As in the insulator 224 or the like, the concentration of impurities such as water and hydrogen in the insulator 281 is preferably reduced.

The conductor 240*a* and the conductor 240*b* are placed in openings formed in the insulator 281, the insulator 274, the insulator 280, and the insulator 254. The conductor 240*a* and the conductor 240*b* are provided to face each other with the conductor 260 therebetween. Note that the top surfaces of the conductor 240*a* and the conductor 240*b* may be level with the top surface of the insulator 281.

The insulator 241*a* is provided in contact with the inner wall of the opening in the insulator 281, the insulator 274, the insulator 280, and the insulator 254, and the first conductor of the conductor 240*a* is formed in contact with the side surface of the insulator 241*a*. The conductor 242*a* is positioned on at least part of the bottom portion of the opening, and the conductor 240*a* is in contact with the conductor 242*a*. Similarly, the insulator 241*b* is provided in contact with the inner wall of the opening in the insulator 281, the insulator 274, the insulator 280, and the insulator 254, and the first conductor of the conductor 240*b* is formed in contact with the side surface of the insulator 241*b*. The conductor 242*b* is positioned on at least part of the bottom portion of the opening, and the conductor 240*b* is in contact with the conductor 242*b*.

The conductor 240*a* and the conductor 240*b* are preferably formed using a conductive material containing tungsten, copper, or aluminum as its main component. The conductor 240*a* and the conductor 240*b* may each have a stacked-layer structure.

In the case where the conductor 240 has a stacked-layer structure, the aforementioned conductor having a function of inhibiting diffusion of impurities such as water and hydrogen is preferably used as the conductor in contact with the metal oxide 230*a*, the metal oxide 230*b*, the conductor 242, the insulator 254, the insulator 280, the insulator 274, and the insulator 281. For example, tantalum, tantalum nitride, titanium, titanium nitride, ruthenium, ruthenium oxide, or the like is preferably used. The conductive material having a function of inhibiting diffusion of impurities such as water and hydrogen can be used as a single layer or stacked layers. The use of the conductive material can inhibit oxygen added to the insulator 280 from being absorbed by the conductor 240*a* and the conductor 240*b*. Moreover, impurities such as water and hydrogen can be inhibited from entering the metal oxide 230 through the conductor 240*a* and the conductor 240*b* from a layer above the insulator 281.

As the insulator 241*a* and the insulator 241*b*, for example, the insulator that can be used as the insulator 254 or the like can be used. Since the insulator 241*a* and the insulator 241*b* are provided in contact with the insulator 254, impurities such as water and hydrogen in the insulator 280 or the like can be inhibited from entering the metal oxide 230 through the conductor 240*a* and the conductor 240*b*. Furthermore, oxygen contained in the insulator 280 can be inhibited from being absorbed by the conductor 240*a* and the conductor 240*b*.

Although not illustrated, a conductor functioning as a wiring may be placed in contact with the top surface of the conductor 240*a* and the top surface of the conductor 240*b*. For the conductor functioning as a wiring, a conductive material containing tungsten, copper, or aluminum as its main component is preferably used. Furthermore, the conductor may have a stacked-layer structure and may be a stack of titanium or titanium nitride and the above conductive material, for example. Note that the conductor may be formed to be embedded in an opening provided in an insulator.

<Materials for Transistor>

Materials that can be used for the transistor will be described.

[Substrate]

As a substrate where the transistor 200A is formed, an insulator substrate, a semiconductor substrate, or a conductor substrate can be used, for example. Examples of the insulator substrate include a glass substrate, a quartz substrate, a sapphire substrate, a stabilized zirconia substrate (e.g., an yttria-stabilized zirconia substrate), and a resin substrate. Examples of the semiconductor substrate include a semiconductor substrate of silicon, germanium, or the like and a compound semiconductor substrate of silicon carbide, silicon germanium, gallium arsenide, indium phosphide, zinc oxide, or gallium oxide. Another example is a semiconductor substrate in which an insulator region is included in the semiconductor substrate, e.g., an SOI (Silicon On Insulator) substrate. Examples of the conductor substrate include a graphite substrate, a metal substrate, an alloy substrate, and a conductive resin substrate. Other examples include a substrate including a metal nitride and a substrate including a metal oxide. Other examples include an insulator substrate provided with a conductor or a semiconductor, a semiconductor substrate provided with a conductor or an insulator, and a conductor substrate provided with a semiconductor or an insulator. Alternatively, these substrates provided with elements may be used. Examples of the elements provided for the substrates include a capacitor, a resistor, a switching element, a light-emitting element, and a memory element.

[Insulator]

Examples of an insulator include an oxide, a nitride, an oxynitride, a nitride oxide, a metal oxide, a metal oxynitride, and a metal nitride oxide, each of which has an insulating property.

With scaling down and higher integration of a transistor, for example, a problem such as leakage current may arise because of a thinned gate insulator. When a high-k material is used for the insulator functioning as a gate insulator, the voltage at the time of the operation of the transistor can be reduced while the physical thickness is maintained. By contrast, when a material with a low dielectric constant is used for the insulator functioning as an interlayer film, the parasitic capacitance generated between wirings can be reduced. Thus, a material is preferably selected depending on the function of an insulator.

Examples of the insulator having a high dielectric constant include gallium oxide, hafnium oxide, zirconium oxide, an oxide containing aluminum and hafnium, an oxynitride containing aluminum and hafnium, an oxide containing silicon and hafnium, an oxynitride containing silicon and hafnium, and a nitride containing silicon and hafnium.

Examples of the insulator having a low dielectric constant include silicon oxide, silicon oxynitride, silicon nitride oxide, silicon nitride, silicon oxide to which fluorine is added, silicon oxide to which carbon is added, silicon oxide to which carbon and nitrogen are added, porous silicon oxide, and a resin.

When a transistor using an oxide semiconductor is surrounded by insulators having a function of inhibiting the passage of oxygen and impurities such as hydrogen (e.g., the insulator 214, the insulator 222, the insulator 254, and the insulator 274), the electrical characteristics of the transistor can be stable. An insulator having a function of inhibiting the passage of oxygen and impurities such as hydrogen can be formed to have a single layer or a stacked layer including an insulator containing, for example, boron, carbon, nitrogen, oxygen, fluorine, magnesium, aluminum, silicon, phosphorus, chlorine, argon, gallium, germanium, yttrium, zirconium, lanthanum, neodymium, hafnium, or tantalum. Specifically, as the insulator having a function of inhibiting the passage of oxygen and impurities such as hydrogen, a metal oxide such as aluminum oxide, magnesium oxide, gallium oxide, germanium oxide, yttrium oxide, zirconium oxide, lanthanum oxide, neodymium oxide, hafnium oxide, or tantalum oxide or a metal nitride such as aluminum nitride, aluminum titanium nitride, titanium nitride, silicon nitride oxide, or silicon nitride can be used.

An insulator functioning as a gate insulator is preferably an insulator including a region containing oxygen to be released by heating. For example, when a structure is employed in which silicon oxide or silicon oxynitride that includes a region containing oxygen to be released by heating is provided in contact with the metal oxide 230, oxygen vacancies included in the metal oxide 230 can be filled.

[Conductor]

For a conductor, it is preferable to use a metal element selected from aluminum, chromium, copper, silver, gold, platinum, tantalum, nickel, titanium, molybdenum, tungsten, hafnium, vanadium, niobium, manganese, magnesium, zirconium, beryllium, indium, ruthenium, iridium, strontium, lanthanum, and the like; an alloy containing any of the above metal elements; an alloy containing a combination of the above metal elements; or the like. For example, it is preferable to use tantalum nitride, titanium nitride, tungsten, a nitride containing titanium and aluminum, a nitride containing tantalum and aluminum, ruthenium oxide, ruthenium nitride, an oxide containing strontium and ruthenium, an oxide containing lanthanum and nickel, or the like. Tantalum nitride, titanium nitride, a nitride containing titanium and aluminum, a nitride containing tantalum and aluminum, ruthenium oxide, ruthenium nitride, an oxide containing strontium and ruthenium, and an oxide containing lanthanum and nickel are preferable because they are oxidation-resistant conductive materials or materials that maintain their conductivity even after absorbing oxygen. A semiconductor having high electrical conductivity, typified by polycrystalline silicon containing an impurity element such as phosphorus, or silicide such as nickel silicide may be used.

A plurality of conductors formed using any of the above materials may be stacked. For example, a stacked-layer structure combining a material containing the above metal element and a conductive material containing oxygen may be employed. In addition, a stacked-layer structure combining a material containing the above metal element and a conductive material containing nitrogen may be employed. Furthermore, a stacked-layer structure combining a material containing the above metal element, a conductive material containing oxygen, and a conductive material containing nitrogen may be employed.

In the case where a metal oxide is used for the channel formation region of the transistor, the conductor functioning as the gate electrode preferably has a stacked-layer structure combining a material containing the above metal element and a conductive material containing oxygen. In that case, the conductive material containing oxygen is preferably provided on the channel formation region side. When the conductive material containing oxygen is provided on the channel formation region side, oxygen released from the conductive material is easily supplied to the channel formation region.

It is particularly preferable to use, for the conductor functioning as the gate electrode, a conductive material containing oxygen and a metal element contained in the metal oxide where the channel is formed. A conductive material containing the above metal element and nitrogen may be used. For example, a conductive material containing nitrogen, such as titanium nitride or tantalum nitride, may be used. Indium tin oxide, indium oxide containing tungsten oxide, indium zinc oxide containing tungsten oxide, indium oxide containing titanium oxide, indium tin oxide containing titanium oxide, indium zinc oxide, or indium tin oxide to which silicon is added may be used. Indium gallium zinc oxide containing nitrogen may be used. With the use of such a material, hydrogen contained in the metal oxide where the channel is formed can be captured in some cases. Alternatively, hydrogen entering from an external insulator or the like can be captured in some cases.

At least part of this embodiment can be implemented in combination with the other embodiments described in this specification as appropriate.

Embodiment 6

Described in this embodiment is a metal oxide (hereinafter, also referred to as an oxide semiconductor) that can be used in the OS transistor described in the above embodiment.

<Classification of Crystal Structures>

First, the classification of the crystal structures of an oxide semiconductor will be described with reference to FIG. 21A. FIG. 21A is a diagram showing the classification of the crystal structures of an oxide semiconductor, typically IGZO (a metal oxide containing In, Ga, and Zn).

As shown in FIG. 21A, an oxide semiconductor is roughly classified into "Amorphous", "Crystalline", and "Crystal". The term "Amorphous" includes completely amorphous. The term "Crystalline" includes CAAC (c-axis-aligned crystalline), nc (nanocrystalline), and CAC (cloud-aligned composite). Note that the term "Crystalline" excludes single crystal, poly crystal, and completely amorphous (excluding single crystal and poly crystal). The term "Crystal" includes single crystal and poly crystal.

Note that the structures in the thick frame shown in FIG. 21A are in an intermediate state between "Amorphous" and "Crystal", and belong to a new crystalline phase. That is, these structures are completely different from "Amorphous", which is energetically unstable, and "Crystal".

A crystal structure of a film or a substrate can be evaluated with an X-ray diffraction (XRD) spectrum. FIG. 21B shows an XRD spectrum, which is obtained by GIXD (Grazing-Incidence XRD) measurement, of a CAAC-IGZO film classified into "Crystalline". Note that a GIXD method is also referred to as a thin film method or a Seemann-Bohlin method. The XRD spectrum that is shown in FIG. 21B and obtained by GIXD measurement is hereinafter simply referred to as an XRD spectrum. The CAAC-IGZO film in FIG. 21B has a composition in the neighborhood of In:Ga:Zn=4:2:3 [atomic ratio]. The CAAC-IGZO film in FIG. 21B has a thickness of 500 nm.

As shown in FIG. 21B, a clear peak indicating crystallinity is observed in the XRD spectrum of the CAAC-IGZO film. In FIG. 21B, the horizontal axis represents 20 [deg.] and the vertical axis represents intensity (Intensity) [a.u.]. Specifically, a peak indicating c-axis alignment is detected at 20 of around 31° in the XRD spectrum of the CAAC-IGZO film. As shown in FIG. 21B, the peak at 20 of around 31° is asymmetric with the angle at which the peak intensity is detected as the axis.

A crystal structure of a film or a substrate can also be evaluated with a diffraction pattern obtained by a nanobeam electron diffraction method (NBED) (such a pattern is also referred to as a nanobeam electron diffraction pattern). FIG. 21C shows a diffraction pattern of the CAAC-IGZO film. FIG. 21C shows a diffraction pattern obtained by the NBED method in which an electron beam is incident in the direction parallel to the substrate. The CAAC-IGZO film in FIG. 21C has a composition in the neighborhood of In:Ga:Zn=4:2:3 [atomic ratio]. In the nanobeam electron diffraction method, electron diffraction is performed with a probe diameter of 1 nm.

As shown in FIG. 21C, a plurality of spots indicating c-axis alignment are observed in the diffraction pattern of the CAAC-IGZO film.

[Structure of Oxide Semiconductor]

Oxide semiconductors might be classified in a manner different from that in FIG. 21A when classified in terms of the crystal structure. Oxide semiconductors are classified into a single crystal oxide semiconductor and a non-single-crystal oxide semiconductor, for example. Examples of the non-single-crystal oxide semiconductor include the above-described CAAC-OS and nc-OS. Other examples of the non-single-crystal oxide semiconductor include a polycrystalline oxide semiconductor, an amorphous-like oxide semiconductor (a-like OS), and an amorphous oxide semiconductor.

Here, the above-described CAAC-OS, nc-OS, and a-like OS will be described in detail.

[CAAC-OS]

The CAAC-OS is an oxide semiconductor that has a plurality of crystal regions each of which has c-axis alignment in a particular direction. Note that the particular direction refers to the film thickness direction of a CAAC-OS film, the normal direction of the surface where the CAAC-OS film is formed, or the normal direction of the surface of the CAAC-OS film. The crystal region refers to a region having a periodic atomic arrangement. When an atomic arrangement is regarded as a lattice arrangement, the crystal region also refers to a region with a uniform lattice arrangement. The CAAC-OS has a region where a plurality of crystal regions are connected in the a-b plane direction, and the region has distortion in some cases. Note that the distortion refers to a portion where the direction of a lattice arrangement changes between a region with a uniform lattice arrangement and another region with a uniform lattice arrangement in a region where a plurality of crystal regions are connected. That is, the CAAC-OS is an oxide semiconductor having c-axis alignment and having no clear alignment in the a-b plane direction.

Note that each of the plurality of crystal regions is formed of one or more minute crystals (crystals each of which has a maximum diameter of less than 10 nm). In the case where the crystal region is formed of one minute crystal, the maximum diameter of the crystal region is less than 10 nm. In the case where the crystal region is formed of a large number of minute crystals, the size of the crystal region may be approximately several tens of nanometers.

In the case of an In-M-Zn oxide (the element M is one or more kinds selected from aluminum, gallium, yttrium, tin, titanium, and the like), the CAAC-OS tends to have a layered crystal structure (also referred to as a layered structure) in which a layer containing indium (In) and oxygen (hereinafter, an In layer) and a layer containing the element M, zinc (Zn), and oxygen (hereinafter, an (M,Zn) layer) are stacked. Indium and the element M can be replaced with each other. Therefore, indium may be contained in the (M,Zn) layer. In addition, the element M may be contained in the In layer. Note that Zn may be contained in the In layer. Such a layered structure is observed as a lattice image in a high-resolution TEM image, for example.

When the CAAC-OS film is subjected to structural analysis by out-of-plane XRD measurement with an XRD apparatus using $\theta/2\theta$ scanning, for example, a peak indicating c-axis alignment is detected at or around $2\theta$ of 31°. Note that the position of the peak indicating c-axis alignment (the value of $2\theta$) may change depending on the kind, composition, or the like of the metal elements contained in the CAAC-OS.

For example, a plurality of bright spots are observed in the electron diffraction pattern of the CAAC-OS film. Note that one spot and another spot are observed point-symmetrically with a spot of the incident electron beam passing through a sample (also referred to as a direct spot) as the symmetric center.

When the crystal region is observed from the particular direction, a lattice arrangement in the crystal region is basically a hexagonal lattice arrangement; however, a unit lattice is not always a regular hexagon and is a non-regular hexagon in some cases. A pentagonal lattice arrangement, a heptagonal lattice arrangement, or the like is included in the distortion in some cases. Note that a clear grain boundary cannot be observed even in the vicinity of the distortion in the CAAC-OS. That is, formation of a grain boundary is inhibited by the distortion of a lattice arrangement. This is probably because the CAAC-OS can tolerate distortion owing to a low density of arrangement of oxygen atoms in the a-b plane direction, an interatomic bond distance changed by substitution of a metal atom, and the like.

A crystal structure in which a clear grain boundary is observed is what is called polycrystal. It is highly probable that the grain boundary becomes a recombination center and traps carriers and thus decreases the on-state current and field-effect mobility of a transistor, for example. Thus, the CAAC-OS in which no clear grain boundary is observed is one of crystalline oxides having a crystal structure suitable for a semiconductor layer of a transistor. Note that Zn is preferably contained to form the CAAC-OS. For example, an In—Zn oxide and an In—Ga—Zn oxide are suitable because they can inhibit generation of a grain boundary as compared with an In oxide.

The CAAC-OS is an oxide semiconductor with high crystallinity in which no clear grain boundary is observed. Thus, in the CAAC-OS, a reduction in electron mobility due to the grain boundary is less likely to occur. Moreover, since the crystallinity of an oxide semiconductor might be decreased by entry of impurities, formation of defects, or the like, the CAAC-OS can be regarded as an oxide semiconductor that has small amounts of impurities and defects (e.g., oxygen vacancies). Therefore, an oxide semiconductor including the CAAC-OS is physically stable. Accordingly, the oxide semiconductor including the CAAC-OS is resistant to heat and has high reliability. In addition, the CAAC-OS is stable with respect to high temperatures in the manufacturing process (what is called thermal budget). Accordingly, the use of the CAAC-OS for the OS transistor can extend the degree of freedom of the manufacturing process.

[nc-OS]

In the nc-OS, a microscopic region (e.g., a region with a size greater than or equal to 1 nm and less than or equal to 10 nm, in particular, a region with a size greater than or equal to 1 nm and less than or equal to 3 nm) has a periodic atomic arrangement. In other words, the nc-OS includes a minute crystal. Note that the size of the minute crystal is, for example, greater than or equal to 1 nm and less than or equal to 10 nm, particularly greater than or equal to 1 nm and less than or equal to 3 nm; thus, the minute crystal is also referred to as a nanocrystal. There is no regularity of crystal orientation between different nanocrystals in the nc-OS. Hence, the orientation in the whole film is not observed. Accordingly, in some cases, the nc-OS cannot be distinguished from an a-like OS or an amorphous oxide semiconductor, depending on an analysis method. For example, when an nc-OS film is subjected to structural analysis by out-of-plane XRD measurement with an XRD apparatus using $\theta/2\theta$ scanning, a peak indicating crystallinity is not observed. Furthermore, a diffraction pattern like a halo pattern is observed when the nc-OS film is subjected to electron diffraction (also referred to as selected-area electron diffraction) using an electron beam with a probe diameter larger than the diameter of a nanocrystal (e.g., larger than or equal to 50 nm). Meanwhile, in some cases, a plurality of spots in a ring-like region with a direct spot as the center are observed in the obtained electron diffraction pattern when the nc-OS film is subjected to electron diffraction (also referred to as nanobeam electron diffraction) using an electron beam with a probe diameter nearly equal to or smaller than the diameter of a nanocrystal (e.g., larger than or equal to 1 nm and smaller than or equal to 30 nm).

[a-like OS]

The a-like OS is an oxide semiconductor having a structure between those of the nc-OS and the amorphous oxide semiconductor. The a-like OS has a void or a low-density region. That is, the a-like OS has lower crystallinity than the nc-OS and the CAAC-OS. Moreover, the a-like OS has a higher hydrogen concentration in the film than the nc-OS and the CAAC-OS.

[Composition of Oxide Semiconductor]

Next, the CAC-OS will be described in detail. Note that the CAC-OS relates to the material composition.

[CAC-OS]

The CAC-OS refers to one composition of a material in which elements constituting a metal oxide are unevenly distributed with a size greater than or equal to 0.5 nm and less than or equal to 10 nm, preferably greater than or equal to 1 nm and less than or equal to 3 nm, or a similar size, for example. Note that a state in which one or more metal elements are unevenly distributed and regions including the metal element(s) are mixed with a size greater than or equal to 0.5 nm and less than or equal to 10 nm, preferably greater than or equal to 1 nm and less than or equal to 3 nm, or a similar size in a metal oxide is hereinafter referred to as a mosaic pattern or a patch-like pattern.

In addition, the CAC-OS has a composition in which materials are separated into a first region and a second region to form a mosaic pattern, and the first regions are distributed in the film (this composition is hereinafter also referred to as a cloud-like composition). That is, the CAC-OS is a composite metal oxide having a composition in which the first regions and the second regions are mixed.

Note that the atomic ratios of In, Ga, and Zn to the metal elements contained in the CAC-OS in an In—Ga—Zn oxide are denoted by [In], [Ga], and [Zn], respectively. For example, the first region in the CAC-OS in the In—Ga—Zn oxide has [In] higher than [In] in the composition of the CAC-OS film. Moreover, the second region has [Ga] higher than [Ga] in the composition of the CAC-OS film. Alternatively, for example, the first region has [In] higher than [In] in the second region and [Ga] lower than [Ga] in the second region. Moreover, the second region has [Ga] higher than [Ga] in the first region and [In] lower than [In] in the first region.

Specifically, the first region includes indium oxide, indium zinc oxide, or the like as its main component. The second region includes gallium oxide, gallium zinc oxide, or the like as its main component. That is, the first region can be referred to as a region containing In as its main component. The second region can be referred to as a region containing Ga as its main component.

Note that a clear boundary between the first region and the second region cannot be observed in some cases.

For example, in EDX mapping obtained by energy dispersive X-ray spectroscopy (EDX), it is confirmed that the CAC-OS in the In—Ga—Zn oxide has a structure in which the region containing In as its main component (the first region) and the region containing Ga as its main component (the second region) are unevenly distributed and mixed.

In the case where the CAC-OS is used for a transistor, a switching function (on/off switching function) can be given to the CAC-OS owing to the complementary action of the conductivity derived from the first region and the insulating property derived from the second region. That is, the CAC-OS has a conducting function in part of the material and has an insulating function in another part of the material; as a whole, the CAC-OS has a function of a semiconductor. Separation of the conducting function and the insulating function can maximize each function. Accordingly, when the CAC-OS is used for a transistor, a high on-state current ($I_{on}$), high field-effect mobility (μ), and excellent switching operation can be achieved.

An oxide semiconductor can have any of various structures that show different properties. Two or more of the amorphous oxide semiconductor, the polycrystalline oxide semiconductor, the a-like OS, the CAC-OS, the nc-OS, and the CAAC-OS may be included in an oxide semiconductor of one embodiment of the present invention.

<Transistor Including Oxide Semiconductor>

Next, a case where the oxide semiconductor is used for a transistor will be described.

When the oxide semiconductor is used for a transistor, the transistor can have high field-effect mobility. In addition, the transistor can have high reliability.

An oxide semiconductor having a low carrier concentration is preferably used for the transistor. For example, the carrier concentration of an oxide semiconductor is lower than or equal to $1\times10^{17}$ $cm^{-3}$, preferably lower than or equal to $1\times10^{15}$ $cm^{-3}$, further preferably lower than or equal to $1\times10^{13}$ $cm^{-3}$, still further preferably lower than or equal to $1\times10^{11}$ $cm^{-3}$, yet further preferably lower than $1\times10^{10}$ $cm^{-3}$ and higher than or equal to $1\times10^{-9}$ $cm^{-3}$. In order to reduce the carrier concentration of an oxide semiconductor film, the impurity concentration in the oxide semiconductor film is reduced so that the density of defect states can be reduced. In this specification and the like, a state with a low impurity concentration and a low density of defect states is referred to as a highly purified intrinsic or substantially highly purified intrinsic state. Note that an oxide semiconductor having a low carrier concentration may be referred to as a highly purified intrinsic or substantially highly purified intrinsic oxide semiconductor.

A highly purified intrinsic or substantially highly purified intrinsic oxide semiconductor film has a low density of defect states and accordingly has a low density of trap states in some cases.

Charges trapped by the trap states in an oxide semiconductor take a long time to be released and may behave like fixed charges. A transistor whose channel formation region is formed in an oxide semiconductor having a high density of trap states has unstable electrical characteristics in some cases.

Accordingly, in order to obtain stable electrical characteristics of a transistor, reducing the impurity concentration in an oxide semiconductor is effective. In order to reduce the impurity concentration in the oxide semiconductor, the impurity concentration in an adjacent film is also preferably reduced. Examples of impurities include hydrogen, nitrogen, alkali metal, alkaline earth metal, iron, nickel, and silicon.

<Impurity>

Here, the influence of impurities in the oxide semiconductor will be described.

When silicon, carbon, or the like, which is a Group 14 element, is contained in an oxide semiconductor, defect states are formed in the oxide semiconductor. Thus, the concentration of silicon or carbon in the oxide semiconductor and the concentration of silicon or carbon in the vicinity of an interface with the oxide semiconductor (the concentration obtained by SIMS) are each set lower than or equal to $2\times10^{18}$ atoms/$cm^3$, preferably lower than or equal to $2\times10^{17}$ atoms/$cm^3$.

When the oxide semiconductor contains alkali metal or alkaline earth metal, defect states are formed and carriers are generated in some cases. Accordingly, a transistor using an oxide semiconductor that contains alkali metal or alkaline earth metal tends to have normally-on characteristics. Thus, the concentration of alkali metal or alkaline earth metal in the oxide semiconductor, which is obtained by SIMS, is lower than or equal to $1\times10^{18}$ atoms/$cm^3$, preferably lower than or equal to $2\times10^{16}$ atoms/$cm^3$.

An oxide semiconductor containing nitrogen easily becomes n-type by generation of electrons serving as carriers and an increase in carrier concentration. A transistor using, as a semiconductor, an oxide semiconductor containing nitrogen tends to have normally-on characteristics. When nitrogen is contained in the oxide semiconductor, a trap state is sometimes formed. This might make the electrical characteristics of the transistor unstable. Thus, the nitrogen concentration in the oxide semiconductor, which is obtained by SIMS, is lower than $5\times10^{19}$ atoms/$cm^3$, preferably lower than or equal to $5\times10^{18}$ atoms/$cm^3$, further preferably lower than or equal to $1\times10^{18}$ atoms/$cm^3$, still further preferably lower than or equal to $5\times10^{17}$ atoms/$cm^3$.

Hydrogen contained in an oxide semiconductor reacts with oxygen bonded to a metal atom to be water, and thus forms an oxygen vacancy in some cases. Entry of hydrogen into the oxygen vacancy generates an electron serving as a carrier in some cases. Furthermore, bonding of part of hydrogen to oxygen bonded to a metal atom causes generation of an electron serving as a carrier in some cases. Thus, a transistor using an oxide semiconductor containing hydrogen tends to have normally-on characteristics. For this reason, hydrogen in the oxide semiconductor is preferably reduced as much as possible. Specifically, the hydrogen concentration in the oxide semiconductor, which is obtained by SIMS, is lower than $1\times10^{20}$ atoms/$cm^3$, preferably lower than $1\times10^{19}$ atoms/$cm^3$, further preferably lower than $5\times10^{18}$ atoms/$cm^3$, still further preferably lower than $1\times10^{18}$ atoms/$cm^3$.

When an oxide semiconductor with sufficiently reduced impurities is used for a channel formation region in a transistor, stable electrical characteristics can be given.

At least part of this embodiment can be implemented in combination with the other embodiments described in this specification as appropriate.

Embodiment 7

In this embodiment, electronic devices each including the display device and the display system of one embodiment of the present invention will be described.

Figure 22A:
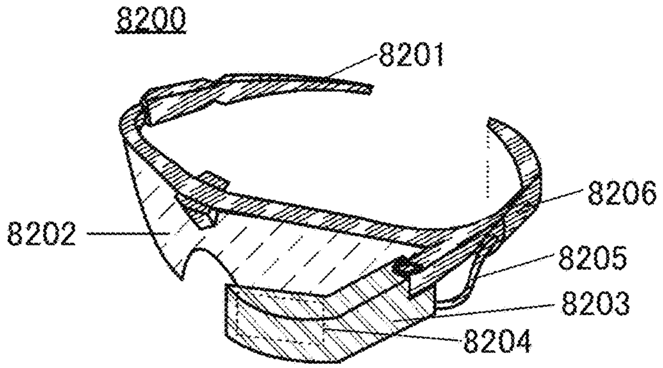
FIG. 22A to FIG. 22D are diagrams illustrating examples of electronic devices.

FIG. 22A is a diagram illustrating an external view of a head-mounted display 8200. The head-mounted display 8200 includes a wearing portion 8201, a lens 8202, a main body 8203, a display portion 8204, a cable 8205, and the like. A battery 8206 is incorporated in the wearing portion 8201.

The cable 8205 supplies electric power from the battery 8206 to the main body 8203. The main body 8203 includes a wireless receiver or the like and can display an image corresponding to the received image data or the like on the display portion 8204. The movement of the eyeball or the eyelid of the user can be captured by a camera provided in the main body 8203 and then coordinates of the sight line of the user can be calculated using the information to utilize the sight line of the user as an input means.

A plurality of electrodes may be provided in the wearing portion 8201 at a position in contact with the user. The main body 8203 may have a function of sensing current flowing through the electrodes along with the movement of the user's eyeball to recognize the user's sight line. The main body 8203 may have a function of sensing current flowing through the electrodes to monitor the user's pulse. The wearing portion 8201 may include various sensors such as a temperature sensor, a pressure sensor, and an acceleration sensor to have a function of displaying the user's biological information on the display portion 8204. The main body 8203 may sense the movement of the user's head or the like to change an image displayed on the display portion 8204 in synchronization with the movement.

The display device of one embodiment of the present invention can be used in the display portion 8204. Thus, the power consumption of the head-mounted display 8200 can be reduced, so that the head-mounted display 8200 can be used continuously for a long time. The power consumption of the head-mounted display 8200 can be reduced, which allows the battery 8206 to be downsized and lighter and accordingly allows the head-mounted display 8200 to be downsized and lighter. Thus, a burden of the user of the head-mounted display 8200 can be reduced, and the user is less likely to feel fatigue.

Figure 22B:
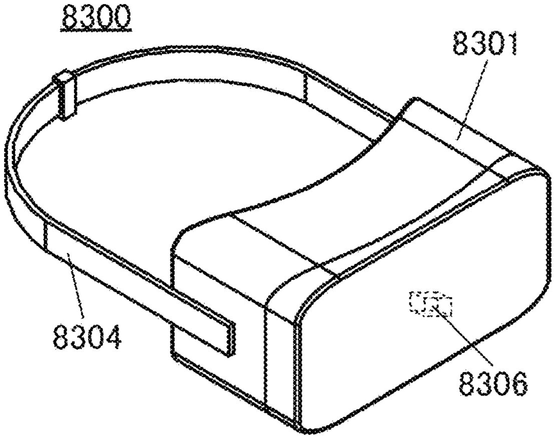
Figure 22C:
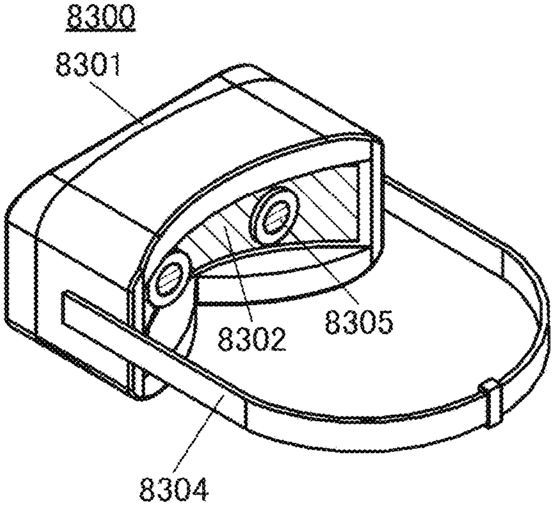
Figure 22D:
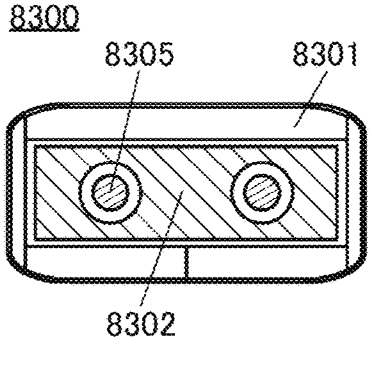

FIG. 22B, FIG. 22C, and FIG. 22D are external views of a head-mounted display 8300. The head-mounted display 8300 includes a housing 8301, a display portion 8302, a fixing band 8304, and a pair of lenses 8305. A battery 8306 is incorporated in the housing 8301, and electric power can be supplied from the battery 8306 to the display portion 8302 and the like.

A user can see display on the display portion 8302 through the lenses 8305. It is suitable that the display portion 8302 be curved and placed. When the display portion 8302 is curved and placed, a user can feel a high realistic sensation. Note that although the structure in which one display portion 8302 is provided is described in this embodiment as an example, the structure is not limited thereto, and a structure in which two display portions 8302 are provided may also be employed. In that case, one display portion is placed for one eye of the user, so that three-dimensional display using parallax or the like is possible.

The display device of one embodiment of the present invention can be used in the display portion 8302. Thus, the power consumption of the head-mounted display 8300 can be reduced, so that the head-mounted display 8300 can be used continuously for a long time. The power consumption of the head-mounted display 8300 can be reduced, which allows the battery 8306 to be downsized and lighter and accordingly allows the head-mounted display 8300 to be downsized and lighter. Thus, a burden of the user of the head-mounted display 8300 can be reduced, and the user is less likely to feel fatigue.

Figure 23A:
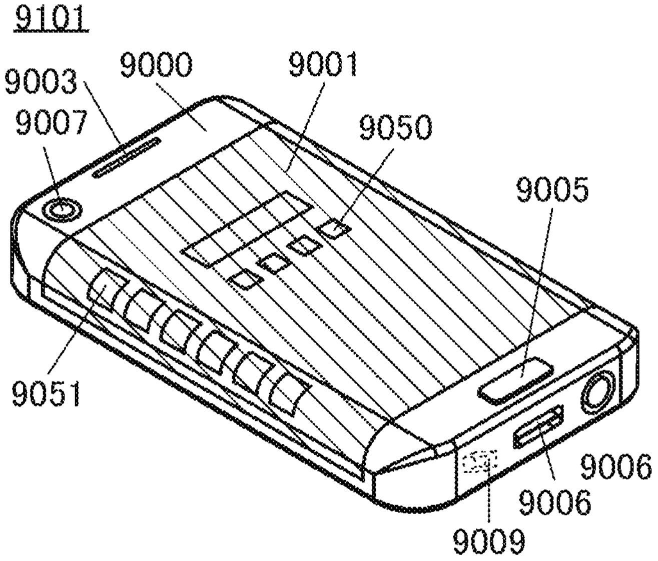
FIG. 23A and FIG. 23B are diagrams illustrating examples of electronic devices.
Figure 23B:
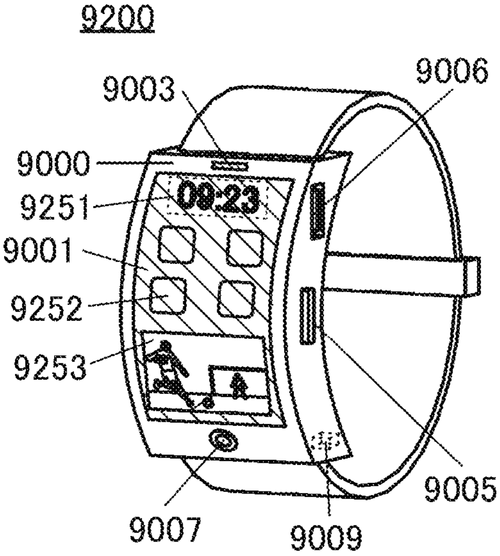

Next, FIG. 23A and FIG. 23B illustrate examples of electronic devices that are different from the electronic devices illustrated in FIG. 22A to FIG. 22D.

Electronic devices illustrated in FIG. 23A and FIG. 23B include a housing 9000, a display portion 9001, a speaker 9003, an operation key 9005 (including a power switch or an operation switch), a connection terminal 9006, a sensor 9007 (having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays), a battery 9009, and the like.

The electronic devices illustrated in FIG. 23A and FIG. 23B have a variety of functions. Examples of the functions include a function of displaying a variety of information (a still image, a moving image, a text image, and the like) on the display portion, a touch panel function, a function of displaying a calendar, date, time, and the like, a function of controlling processing with a variety of software (programs), a wireless communication function, a function of being connected to a variety of computer networks with a wireless communication function, a function of transmitting and receiving a variety of data with a wireless communication function, and a function of reading out a program or data stored in a memory medium and displaying it on the display portion. Note that functions of the electronic devices illustrated in FIG. 23A and FIG. 23B are not limited thereto, and the electronic devices can have a variety of functions. Although not illustrated in FIG. 23A and FIG. 23B, the electronic devices may each include a plurality of display portions. The electronic devices may each include a camera and the like and have a function of taking a still image, a function of taking a moving image, a function of storing the taken image in a memory medium (externally attached or incorporated in the camera), a function of displaying the taken image on the display portion, and the like.

The details of the electronic devices illustrated in FIG. 23A and FIG. 23B will be described below.

FIG. 23A is a perspective view illustrating a portable information terminal 9101. The portable information terminal 9101 has a function of, for example, one or more selected from a telephone set, a notebook, an information browsing system, and the like. Specifically, the portable information terminal can be used as a smartphone. The portable information terminal 9101 can display text, an image, or the like on its plurality of surfaces. For example, five operation buttons 9050 (also referred to as operation icons, or simply, icons) can be displayed on one surface of the display portion 9001. Information 9051 can be displayed on another surface of the display portion 9001. Examples of the information 9051 include display indicating reception of an e-mail, an SNS (social networking service), a telephone call, or the like; the title of an e-mail, an SNS, or the like; the sender of an e-mail, an SNS, or the like; the date; the time; remaining battery; and the reception strength of an antenna. Alternatively, the operation buttons 9050 or the like may be displayed on the position where the information 9051 is displayed, in place of the information 9051.

The display device of one embodiment of the present invention can be used for the portable information terminal 9101. Thus, the power consumption of the portable information terminal 9101 can be reduced, so that the portable information terminal 9101 can be used continuously for a long time. The power consumption of the portable information terminal 9101 can be reduced, which allows the battery 9009 to be downsized and lighter and accordingly allows the portable information terminal 9101 to be downsized and lighter. Thus, the portability of the portable information terminal 9101 can be increased.

FIG. 23B is a perspective view of a watch-type portable information terminal 9200. The portable information terminal 9200 can execute a variety of applications such as mobile phone calls, e-mailing, viewing and editing texts, music reproduction, Internet communication, and computer games. The display surface of the display portion 9001 is curved, and display can be performed on the curved display surface. FIG. 23B illustrates an example in which time 9251, operation buttons 9252 (also referred to as operation icons, or simply, icons), and a content 9253 are displayed on the display portion 9001. The content 9253 can be a moving image, for example.

The portable information terminal 9200 is capable of executing near field communication conformable to a communication standard. For example, mutual communication with a headset capable of wireless communication enables hands-free calling. The portable information terminal 9200 includes the connection terminal 9006, and data can be directly transmitted to and received from another information terminal via a connector. Power charging through the connection terminal 9006 is also possible. Note that the charging operation may be performed by wireless power feeding without through the connection terminal 9006.

The display device of one embodiment of the present invention can be used for the portable information terminal 9200. Thus, the power consumption of the portable information terminal 9200 can be reduced, so that the portable information terminal 9200 can be continuously used for a long time. The power consumption of the portable information terminal 9200 can be reduced, which allows the battery 9009 to be downsized and lighter and accordingly allows the portable information terminal 9200 to be downsized and lighter. Thus, the portability of the portable information terminal 9200 can be increased.

At least part of this embodiment can be implemented in combination with the other embodiments described in this specification as appropriate.

<Supplementary Notes on Description in this Specification and the Like>

The following are notes on the description of the foregoing embodiments and the structures in the embodiments.

One embodiment of the present invention can be constituted by appropriately combining the structure described in an embodiment with any of the structures described in the other embodiments. In addition, in the case where a plurality of structure examples are described in one embodiment, some of the structure examples can be combined as appropriate.

Note that a content (or part thereof) described in one embodiment can be applied to, combined with, or replaced with another content (or part thereof) in the same embodiment and/or a content (or part thereof) described in another embodiment or other embodiments, for example.

Note that in each embodiment, a content described in the embodiment is a content described with reference to a variety of diagrams or a content described with text disclosed in the specification.

Note that by combining a diagram (or part thereof) described in one embodiment with another part of the diagram, a different diagram (or part thereof) described in the embodiment, and/or a diagram (or part thereof) described in another embodiment or other embodiments, much more diagrams can be formed.

In this specification and the like, components are classified on the basis of the functions, and shown as blocks independent of one another in block diagrams. However, in an actual circuit and the like, such components are sometimes hard to classify functionally, and there is a case where one circuit is associated with a plurality of functions and a case where a plurality of circuits are associated with one function. Therefore, the blocks in the block diagrams are not limited by the components described in the specification, and the description can be changed appropriately depending on the situation.

In drawings, the size, the layer thickness, or the region is shown arbitrarily for description convenience. Therefore, the size, the layer thickness, or the region is not limited to the illustrated scale. Note that the drawings are schematically shown for clarity, and embodiments of the present invention are not limited to shapes, values, or the like shown in the drawings. For example, variation in signal, voltage, or current due to noise or variation in signal, voltage, or current due to difference in timing can be included.

In this specification and the like, the terms "one of a source and a drain" (or a first electrode or a first terminal) and "the other of the source and the drain" (or a second electrode or a second terminal) are used to describe the connection relationship of a transistor. This is because a source and a drain of a transistor are interchangeable depending on the structure, operation conditions, or the like of the transistor. Note that the source or the drain of the transistor can also be referred to as a source (or drain) terminal, a source (or drain) electrode, or the like as appropriate depending on the situation.

In this specification and the like, the terms such as "electrode" and "wiring" do not limit the functions of the components. For example, an "electrode" is used as part of a "wiring" in some cases, and vice versa. Furthermore, the term such as "electrode" or "wiring" also includes the case where a plurality of "electrodes" or "wirings" are formed in an integrated manner, for example.

In this specification and the like, voltage and potential can be replaced with each other as appropriate. The term voltage refers to a potential difference from a reference potential, and when the reference potential is a ground potential, for example, voltage can be replaced with potential. The ground potential does not necessarily mean 0 V. Potentials are relative values, and a potential supplied to a wiring or the like is sometimes changed depending on the reference potential.

In this specification and the like, the terms "film" and "layer" can be interchanged with each other depending on the case or circumstances. For example, the term "conductive layer" can be changed into the term "conductive film" in some cases. Also, for example, the term "insulating film" can be changed into the term "insulating layer" in some cases.

In this specification and the like, a switch is in a conduction state (on state) or in a non-conduction state (off state) to determine whether current flows therethrough or not. Alternatively, a switch has a function of selecting and changing a current path.

In this specification and the like, the channel length refers to, for example, the distance between a source and a drain in a region where a semiconductor (or a portion where current flows in a semiconductor when a transistor is on) and a gate overlap with each other or a region where a channel is formed in a top view of the transistor.

In this specification and the like, the channel width refers to, for example, the length of a portion where a source and a drain face each other in a region where a semiconductor (or a portion where current flows in a semiconductor when a transistor is on) and a gate electrode overlap with each other or a region where a channel is formed.

In this specification and the like, the expression "A and B are connected" means the case where A and B are electrically connected to each other as well as the case where A and B are directly connected to each other. Here, the expression "A and B are electrically connected" means the case where electric signals can be transmitted and received between A and B when an object having any electric action exists between A and B.

REFERENCE NUMERALS

100: display device, 100A: display device, 100B: display device, 102: display device, 102A: display device, 110: display portion, 111: housing, 112: communication portion, 113: band, 114: control portion, 115: camera portion, 116: power supply portion, 118: sensor portion, 119: communication portion, 120: display portion, 121: housing, 122: communication portion, 123: wearing portion, 124: control portion, 125: camera portion, 126: power supply portion, 128: sensor portion, 129: headphone portion, 130: user, 130L: left hand, 130R: right hand, 140: image, 141: image information

The invention claimed is:

1. A method for operating a display system, the display system comprising a first display device and a second display device comprising a sensing portion, the method comprising:

a first step of connecting the first display device and the second display device by wireless communication;

a second step of transmitting first image data displayed on the first display device to the second display device;

a third step of displaying second image data on the second display device, the second image data obtained by up-converting or down-converting the first image data so that a user of the first display device and the second display device does not have to look at a display portion of the first display device;

a fourth step of stopping display on the display portion of the first display device on the basis of information received from the second display device while maintaining a touch sensor function of the display portion of the first display device as an input means for the second display device, the information showing completion of display of the second image data;

a fifth step of sensing a gesture operation of the user with the sensing portion and obtaining gesture information on the basis of information output from the sensing portion while the display on the display portion is stopped; and a sixth step of processing the second image data on the basis of the gesture information and displaying a processed second image data on the second display device, wherein, when the user performs a movement where the second image data is shown with a hand, the second display device recognizes the movement as the gesture operation and downsizes, enlarges, moves, or rotates the second image data depending on the movement.

2. The method for operating a display system, according to claim 1, wherein the first display device is configured to be a portable information terminal, wherein the first display device is configured to be one or both of a telephone and a time display, and wherein the second display device is configured to be one or both of an augmented reality display and a virtual reality display.

3. The method for operating a display system, according to claim 1, wherein the first display device is configured to be a watch-type portable information terminal, wherein the first display device is configured to be one or both of a telephone and a time display, and wherein the second display device is configured to be one or both of an augmented reality display and a virtual reality display.

4. The method for operating a display system, according to claim 1, wherein the second display device comprises a plurality of sensing portions, wherein the fifth step is performed in accordance with a manipulation with the plurality of sensing portions, wherein the sixth step is performed in accordance with three-dimensional positional information on a plurality of objects as a gesture, and wherein the three-dimensional positional information is detected by the plurality of sensing portions.

5. The method for operating a display system, according to claim 1, wherein the second display device is configured to obtain information on any one or more of a sense of sight, a sense of hearing, a sense of touch, a sense of taste, a sense of smell, and a brain wave of a user.

6. The method for operating a display system, according to claim 1, wherein the sensing portion is configured to measure a distance from an object, wherein the sensing portion comprises a camera portion, and wherein the camera portion is configured to obtain data and to output the data to a display portion of the second display device.

7. The method for operating a display system, according to claim 1, wherein the second display device is a head-mounted display comprising:

a pair of lenses; and a display portion, wherein the display portion is curved, and wherein a user can see display of the display portion through the pair of lenses.

8. The method for operating a display system, according to claim 7, wherein the display portion comprises two display portions which are configured to be placed for the respective eyes of the user to enable three-dimensional display using parallax.

9. A method for operating a display system, the display system comprising a first display device and a second display device comprising a sensing portion, the method comprising:

a first step of connecting the first display device and the second display device by wireless communication;

a second step of transmitting first image data displayed on the first display device to the second display device;

a third step of displaying second image data on the second display device, the second image data obtained by up-converting or down-converting the first image data;

a fourth step of stopping display on a display portion of the first display device on the basis of information received from the second display device while maintaining a touch sensor function of the display portion of the first display device as an input means for the second display device, the information showing completion of display of the second image data;

a fifth step of sensing a gesture operation of a user with the sensing portion and obtaining gesture information on the basis of information output from the sensing portion; and a sixth step of processing the second image data on the basis of the gesture information and displaying a processed second image data on the second display device, wherein, when the user performs a movement where the second image data is shown with a hand, the second display device recognizes the movement as the gesture operation and downsizes, enlarges, moves, or rotates the second image data.

10. The method for operating a display system, according to claim 9, wherein image information is superimposed on a captured image of a real-word scenery to create a superimposed image.

11. The method for operating a display system, according to claim 10, wherein the image information is part of an image displayed on the display portion of the first display device, and wherein the user can operate the first display device paired to the second display device with gestures directed to the superimposed image while the first display device is not held by the user.

* * * * *